US007689105B2

(12) United States Patent
Kondo

(10) Patent No.: US 7,689,105 B2
(45) Date of Patent: Mar. 30, 2010

(54) RECORD MEDIUM AND ITS REPRODUCER, REPRODUCING METHOD, RECORD MEDIUM MANUFACTURING APPARATUS, RECORD MEDIUM MANUFACTURING METHOD, AND RECORDER

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1252 days.

(21) Appl. No.: 10/477,331

(22) PCT Filed: Mar. 7, 2003

(86) PCT No.: PCT/JP03/02746

§ 371 (c)(1),
(2), (4) Date: Nov. 6, 2003

(87) PCT Pub. No.: WO03/077250

PCT Pub. Date: Sep. 18, 2003

(65) Prior Publication Data

US 2004/0234243 A1    Nov. 25, 2004

(30) Foreign Application Priority Data

| Mar. 8, 2002 | (JP) | ............................. 2002-064576 |
| Mar. 8, 2002 | (JP) | ............................. 2002-064577 |
| Mar. 8, 2002 | (JP) | ............................. 2002-064578 |
| Mar. 8, 2002 | (JP) | ............................. 2002-064579 |
| Mar. 8, 2002 | (JP) | ............................. 2002-064580 |

(51) Int. Cl.
*H04N 5/91* (2006.01)
*G11B 13/00* (2006.01)
*G11B 7/20* (2006.01)
*G11B 7/24* (2006.01)

(52) U.S. Cl. .................. 386/131; 369/14; 369/275; 369/94

(58) Field of Classification Search .............. 369/47.24, 369/14, 15, 275, 94
See application file for complete search history.

(56) References Cited

U.S. PATENT DOCUMENTS

| 3,654,385 | A | * | 4/1972 | Flagle .......................... 348/490 |
| 4,148,082 | A | * | 4/1979 | Okada et al. .............. 360/77.15 |
| 4,438,456 | A | * | 3/1984 | Yoshinaka ................... 348/513 |
| 5,455,179 | A | * | 10/1995 | Eyre ........................... 436/536 |
| 5,706,269 | A | * | 1/1998 | Ogura et al. ............. 369/47.24 |
| 6,246,644 | B1 | * | 6/2001 | Seo .......................... 369/44.23 |

(Continued)

FOREIGN PATENT DOCUMENTS

JP    59-82646    5/1984

(Continued)

*Primary Examiner*—Thai Tran
*Assistant Examiner*—Anner Holder
(74) *Attorney, Agent, or Firm*—Frommer Lawrence & Haug LLP; William S. Frommer; Thomas F. Presson

(57) ABSTRACT

A system and method in which read information is calculated with additional information as a coefficient and has superior in quality to basic information. The read information contains a larger amount of information than the basic information. So, even if an attempt is made to record the read information as it is to any other recording medium, the recording medium having a sufficiently large capacity for storage of the read information. Thus, copy of recorded data in the recording medium to any other recording medium is difficult.

60 Claims, 43 Drawing Sheets

U.S. PATENT DOCUMENTS

| | | | |
|---|---|---|---|
| 6,771,587 B2 * | 8/2004 | Nishiuchi et al. | 369/283 |
| 7,203,155 B2 * | 4/2007 | Nakamura et al. | 369/283 |
| 2002/0048225 A1 * | 4/2002 | Shinoda | 369/13.05 |
| 2004/0033061 A1 * | 2/2004 | Hughes et al. | 386/124 |

FOREIGN PATENT DOCUMENTS

| | | |
|---|---|---|
| JP | 60-129954 | 7/1985 |
| JP | 2-91841 | 3/1990 |
| JP | 2 244445 | 9/1990 |
| JP | 5-274679 | 10/1993 |
| JP | 6 150624 | 5/1994 |
| JP | 8 7385 | 1/1996 |
| JP | 8-275118 | 10/1996 |
| JP | 8 307896 | 11/1996 |
| JP | 8 329614 | 12/1996 |
| JP | 11-144322 | 5/1999 |
| JP | 11-191895 | 7/1999 |
| JP | 2000-069435 | 3/2000 |
| JP | 2000-347696 | 12/2000 |
| JP | 2000-353364 | 12/2000 |
| JP | 2000-357196 | 12/2000 |
| JP | 2001-23172 | 1/2001 |
| JP | 2001-185881 | 7/2001 |
| JP | 2001-285881 | 10/2001 |
| JP | 2001-326898 | 11/2001 |
| JP | 2002-15468 | 1/2002 |

* cited by examiner

```
┌─────────────────────────────────────────────────┐
│ DOWNLOADING, FOR RECORDING, OF "BASIC DATA" AND │
│    "ADDITIONAL DATA" IN RECORDING MEDIUM        │──st104
│ ARCHITECTURE ACCORDING TO PRESENT INVENTION     │
└─────────────────────────────────────────────────┘
                        ⇩
┌─────────────────────────────────────────────────┐
│       OUTPUT HAVING VALUE ADDED THERETO         │
│         BY READING BOTH "BASIC DATA" AND        │──st105
│    "ADDITIONAL DATA" FROM RECORDING MEDIUM      │
└─────────────────────────────────────────────────┘
                        ⇩
┌─────────────────────────────────────────────────┐
│         AROUSING OF CUSTOMER INTEREST           │──st106
└─────────────────────────────────────────────────┘
```

FIG. 4

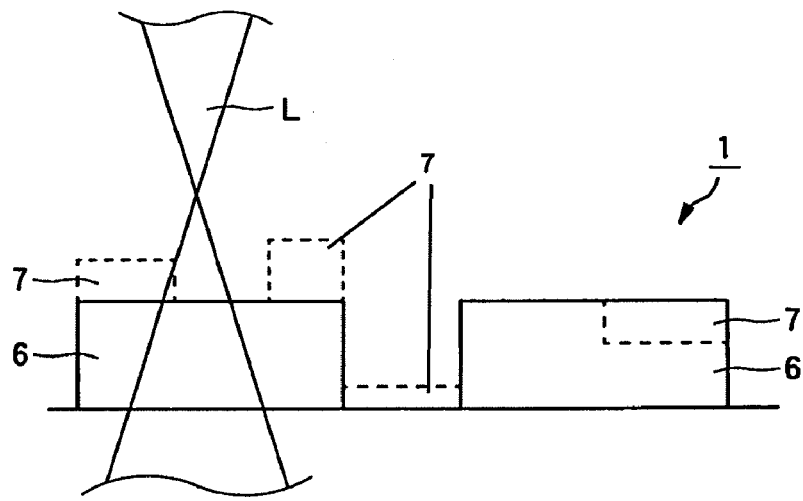

FIG. 5

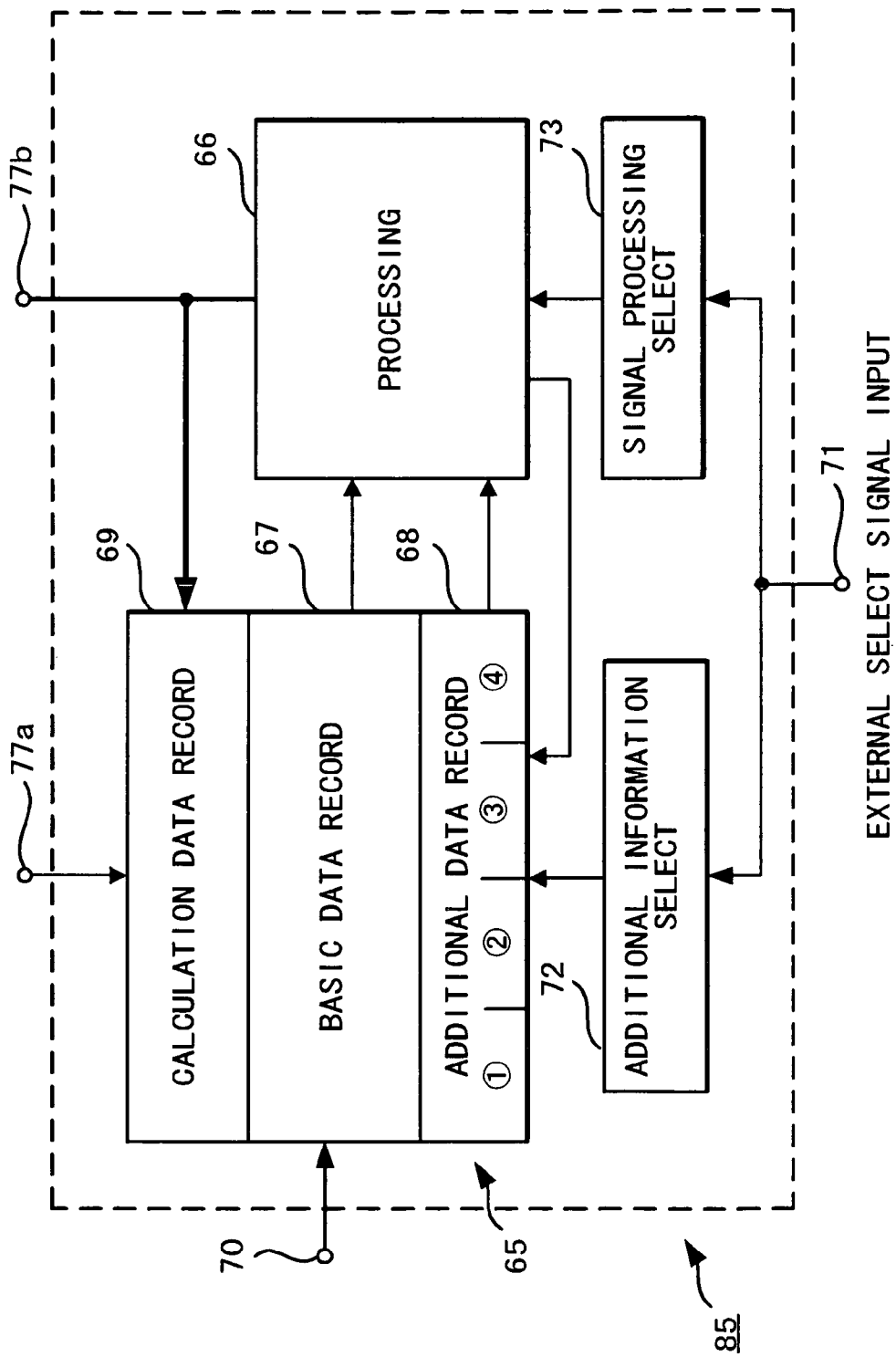
F I G. 22

RECORD MEDIUM AND ITS REPRODUCER, REPRODUCING METHOD, RECORD MEDIUM MANUFACTURING APPARATUS, RECORD MEDIUM MANUFACTURING METHOD, AND RECORDER

TECHNICAL FIELD

The present invention relates to a recording medium for recording various kinds of information signals such as video signals, music signals, etc., and a playback apparatus and method, production apparatus and method, and a recording apparatus, for the recording medium.

This application claims the priority of the Japanese Patent Application Nos. 2002-064576, 2002-064577, 2002-064578, 2002-064579 and 2002-064580, all filed on Mar. 8, 2002, the entirety of which is incorporated by reference herein.

BACKGROUND ART

Heretofore, there have been proposed various types of recording media for recording various kinds of information signals such as video signals, music signals, computer programs or the like. Such recording media are used in the form of a so-called magnetic disk, optical disk or semiconductor memory. Also, information signals to be recorded to these recording medium are digital and analog.

For example, an optical disk having digital data recorded therein includes a disc substrate formed from a transparent material and on which there are formed very tiny holes corresponding to information signals as digital data, that is, pits, and a reflective layer formed on the pits. In this optical disk, a light beam is irradiated to the pits through the disk substrate and a reflected light from the pits is detected, to thereby read information signals recorded by the pits.

Information signals recorded on the recording medium such as the above-mentioned optical disk can easily be copied as they are, namely, in the digital form, to another recording medium. For example, use of the method and apparatus for forming pits on an original optical disk permits to form the same bits as those on the original optical disk onto another optical disk on the basis of digital data read from the original optical disk. Also, the digital data read from the optical disk can be recorded to a recording medium of any other type such as a magneto-optical disk or the like.

Different from analog data, the digital data thus copied are quite the same in quality of images and sounds demodulated from the copied digital data and in computer operation based on the digital data as the original digital data. That is, the copied digital data can be said to have the same value and quality as the original digital data.

However, if data can be copied as above without any degradation in value and quality, the copyright for the digital data will not possibly be protected adequately.

More specifically, a price of a recoding medium having digital data normally recorded therein and which is to be normally sold includes a so-called copyright royalty as a charge for use of the digital data recorded in the recording medium. Payment of the charge for use to the copyrighter for the digital data is the protection of the copyright. If the digital data copied without permission of the copyrighter is the same in value and quality as the original digital data, however, a person going to use the digital data will not use a low-price recording medium having the digital data copied thereto without buying the regular recording medium at the regular price including the royalty. Thus, the copyrighter for the digital data will not be paid appropriately for a number of persons actually having the digital data as well as for a number of times the digital data has been used.

Recently, to prevent digital data of a copyrighter from being illegally copied, there has been demanded a recording medium from which data cannot easily be copied.

DISCLOSURE OF THE INVENTION

Accordingly, the present invention has an object to overcome the above-mentioned drawbacks of the related art by providing a recording medium from which data can hardly be copied, a playback apparatus and method for the recording medium, a production apparatus and method for the recording medium, and a recording apparatus for the recording medium.

The above object can be attained by providing a recording medium having according to the present invention:

a first recording area where basic data is to be recorded; and a second recording area where there is to be recorded additional data which is information to be added to the basic data recorded in the first recording area, read information generated by a predetermined processing based on the basic data recorded in the first recording area and additional data recorded in the second recording area being superior in quality to basic information generated from the basic data recorded in the first recording area.

Also the above object can be attained by providing a recording medium formed as an optical disk from which data is read by an optical pickup head, the recording medium having according to the present invention:

a first recording area where basic data is to be recorded; and a second recording area where additional data to be added to the basic data recorded in the first recording area is recorded in a format different from that in the first recording area, read information generated by a predetermined processing based on the basic data recorded in the first recording area and additional data recorded in the second recording area being superior in quality to basic information generated from the basic data recorded in the first recording area.

Also the above object can be attained by providing a playback apparatus for reading information from a recording medium having a first recording area where basic data is to be recorded, and a second recording area where there is to be recorded additional data which is information to be added to the basic data recorded in the first recording area, read information generated by a predetermined processing based on the basic data recorded in the first recording area and additional data recorded in the second recording area being superior in quality to basic information generated from the basic data recorded in the first recording area, the apparatus including according to the present invention:

a first data acquisition means for acquiring the basic data from the first recording area of the recording medium;

a second data acquisition means for acquiring the additional data from the second recording area of the recording medium; and a playback means for generating the read information on the basis of the basic data and additional data acquired by the first and second data acquisition means, respectively.

Also the above object can be attained by providing a recording medium having according to the present invention:

a recording layer where basic data is recorded by pits; and a step-like portion formed in a part of each pit in the recording layer, laser light which is to be focused in a position not in the recording layer being irradiated from the step-like portion and additional data to be added to the basic data being read by detecting a reflected light of the laser light; and read information generated by a predetermined processing based on the basic data and additional data being superior in quality to basic information generated from the basic data.

Also the above object can be attained by providing a playback apparatus in which there is to be loaded a recording medium having a recording layer where basic data is recorded by pits; and a step-like portion formed in a part of each pit in the recording layer, laser light which is to be focused in a position not included in the recording layer being irradiated from the step-like portion and additional data to be added to the basic data being read by detecting a reflected light of the laser light, and read information generated by a predetermined processing based on the basic data and additional data being superior in quality to basic information generated from the basic data, the apparatus including according to the present invention:

a laser light irradiating means for irradiating laser light to the recording medium;

a reflected light detecting means for detecting a reflected light of the laser light irradiated from the laser light irradiating means from the recording medium;

a focus control means for selecting, based on the result of reflected light detection from the reflected light detecting means, either a first mode in which the laser light irradiated from the laser light irradiating means is focused on the recording layer of the recording medium or a second mode in which the laser light is focused in a position not included in the recording layer of the recording medium;

a tracking control means for guiding the laser light irradiated from the laser light irradiating means to a recording track on the recording medium on the basis of the result of reflected light detection from the reflected light detecting means;

a first decoding means for decoding the basic information from the basic data on the basis of the result of reflected light detection from the reflected light detecting means;

a second decoding means for decoding the additional information from the additional data on the basis of the result of reflected light detection from the reflected light detecting means when the focus control means has selected the second mode; and a playback means for reading the read information on the basis of the basic and additional data decoded by the first and second decoding means, respectively.

Also the above object can be attained by providing a playback method for reading information from a recording medium having a recording layer where basic data is recorded by pits; and a step-like portion formed in a part of each pit in the recording layer, laser light which is to be focused in a position not included in the recording layer being irradiated from the step-like portion and additional data to be added to the basic data being read by detecting a reflected light of the laser light, and read information generated by a predetermined processing based on the basic data and additional data being superior in quality to basic information generated from the basic data, the method including, according to the present invention, the steps of:

irradiating laser light to the recording medium;

detecting a reflected light of the laser light from the recording medium;

selecting, based on the result of reflected light detection, either a first mode in which the laser light is focused on the recording layer of the recording medium or a second mode in which the laser light is focused in a position not included in the recording layer of the recording medium;

decoding the basic information from the basic data on the basis of the result of reflected light detection;

decoding the additional information from the additional data on the basis of the result of reflected light detection when the second mode is selected.

Also the above object can be attained by providing a recording medium production apparatus including according to the present invention:

an encoding means for encoding basic information to provide basic data while encoding additional information to be added to the basic data to provide additional data;

a reflected light calculation means for calculating the shape of pits by which the basic data is recorded to a recording layer of a recording medium, calculating the shape of the step-like portions formed in the recording layer and by which the additional data is recorded and calculating, on the basis of the results of calculation of pit and step-like portion shapes, a reflected light resulted from a laser beam to be focused in a position not included in the recording layer in which the pits and step-like portions are formed is irradiated to the recording layer;

a comparison means for making a comparison between data read from the reflected light calculated by the reflected light calculation means and the additional data;

an additional data control means for controlling the additional data on the basis of the comparison result from the comparison means to correct the step-like portion shape and provide coincidence between the data read from the reflected light calculated by the reflected light calculation means and the additional data;

a synthetic data generating means for generating synthetic data by combining the basic data and the additional data controlled by the additional data control means; and a recording means for forming the pits and step-like portions in a recording layer of a master disk on the basis of the synthetic data generated by the synthetic data generating means.

Also the above object can be attained by providing a recording medium production method including, according to the present invention, the steps of:

encoding basic information to provide basic data while encoding additional information to be added to the basic data to provide additional data;

calculating the shape of pits by which the basic data is recorded to a recording layer of a recording medium, calculating the shape of step-like portions formed in the recording layer and by which the additional data is recorded and calculating, on the basis of the results of calculation of pit and step-like portion shapes, a reflected light resulted from a laser beam to be focused in a position not included in the recording layer in which the pits and step-like portions are formed is irradiated to the recording layer;

making a comparison between data read from the calculated reflected light and the additional data;

controlling the additional data on the basis of the comparison result from the comparison means to correct the step-like portion shape and provide coincidence between the data read from the reflected light calculated in the reflected light calculation step and the additional data;

generating synthetic data by combining the basic data and the controlled additional data; and forming the pits and step-like portions in a recording layer of a master disk on the basis of the generated synthetic data.

Also the above object can be attained by providing a recording medium including according to the present invention:

a first recording layer having formed thereon pits corresponding to basic data, where the basic data is recorded by the pits and from which the basic data is read as a change in amount of a reflected light of a light beam irradiated to the first recording layer; and a second recording layer formed on the first recording layer, where additional data to be added to the basic data is recorded as a change in transmittance of the second recording layer and from which the additional data is read as a change in amount of reflected light resulted from the irradiated light beam passing through the second recording layer, being reflected by the first recording layer and passing again through the second recording layer, read information generated by a predetermined processing based on the basic data and additional data being superior in quality to basic information generated based on the basic data.

Also the above object can be attained by providing a playback apparatus for a recording medium including a first recording layer where basic data is recorded and a second recording layer formed on the first recording layer and where information to be added to the basic data is recorded, read information generated by a predetermined processing based on the basic data and additional data being superior in quality to basic information generated from the basic data, the apparatus including according to the present invention:

a laser light irradiating means for irradiating laser light to the recording medium;

a reflected light detecting means for detecting a reflected light of the laser light irradiated from the laser light irradiating means from the recording medium;

a first decoding means for reading the basic data on the basis of the result of reflected light detection from the reflected light detecting means to decode the basic information from the basic data;

a second decoding means for decoding the additional data on the basis of the result of reflected light detection from the reflected light detecting means to decode the additional information from the additional data; and a playback means for reading the read information on the basis of the basic and additional data decoded by the first and second decoding means, respectively.

Also the above object can be attained by providing a recording apparatus for a recording medium including a first recording layer where basic data is recorded and a second recording layer formed on the first recording layer and where information to be added to the basic data is to be recorded, read information generated by a predetermined processing based on the basic data and additional data being superior in quality to basic information generated based on the basic data, the apparatus including according to the present invention:

an encoding means for encoding the basic information to provide the basic data while encoding the additional information to be added to the basic data to provide the additional data;

a first recording means for recording the basic data to the first recording layer of the recording medium by irradiating a light beam to the first recording layer; and a second recording means for recording the additional data to the second recording layer of the recording medium by irradiating a light beam to the second recording layer, the first recording means recording the basic data as digital data having a predetermined length of channel bits along a recording track formed on the first recording layer.

Also the above object can be attained by providing a playback apparatus for a recording medium having a recording track where basic data is recorded by pits and additional data to be added to the basic data is to be recorded as a change in direction of magnetization, read information generated by a predetermined processing based on the basic data and additional data being superior in quality to basic information generated from the basic data, the apparatus including according to the present invention:

a rotation drive means for rotating the recording medium;

a laser light irradiating means for irradiating laser light to the recording medium;

a reflected light detecting means for detecting the intensity and polarized direction of a reflected light of the laser light irradiated from the laser light irradiation means from the recording medium;

a first decoding means for reading the basic data on the basis of the result of reflected light intensity detection from the reflected light detecting means to detect the basic information from the basic data;

a second decoding means for reading the additional data on the basis of the result of reflected light deflected direction from the reflected light detecting means to decode the additional information from the additional data; and a playback means for generating the read information on the basis of the basic information and additional information decoded by the first and second decoding means, respectively.

Also the above object can be attained by providing a recording apparatus for a recording medium having a recording track where basic data is recorded as pits and additional data to be added to the basic data is to be recorded as a change in direction of magnetization, read information generated by a predetermined processing based on the basic data and additional data being superior in quality to basic information generated from the basic data, the apparatus including according to the present invention:

an encoding means for encoding the basic information to provide the basic data while encoding the additional information to be added to the basic data to provide the additional data;

a first recording means for recording the basic data as pits to the recording track on the recording medium by irradiating a light beam to the recording track; and a second recording means for recording the additional data by magneto-optical spots to the recording track on the recording medium by irradiating a light beam to the recording track.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 4 shows a flow of steps when downloading data to the recording medium.

FIG. 5 is a side elevation of a disk-shaped recording medium according to the present invention, showing pits formed in the disk.

FIG. 22 is a block diagram of a second embodiment of the semiconductor device according to the present inanition.

BEST MODE FOR CARRYING OUT THE INVENTION

The embodiments of the present invention will be described in detail herebelow with reference to the accompanying drawings.

Overview of the Recording Medium

The recording medium according to the present invention includes a first recording area where basic data is to be recorded, and a second recording area where there is to be recorded additional data to be added to the basic data recorded in the first recording area. Read information can be generated by a predetermined processing based on the basic data read from the first recording area of the recording medium and additional data read from the second recording area.

The read information is superior in quality to basis information generated from only the basic data recorded in the first recording area. Therefore, the read information more copious than the basic information. Also, the read information is more copious than the total of the basic and additional information. Therefore, for recording, as data, read information generated by reading one recording medium 1 as shown in FIGS. 1 and 2 (as in step st101 in FIG. 2), a greater number of recording media is required than the number of original recording media (as in step st102 in FIG. 2), namely, more than one recording medium is required.

Figure 1:
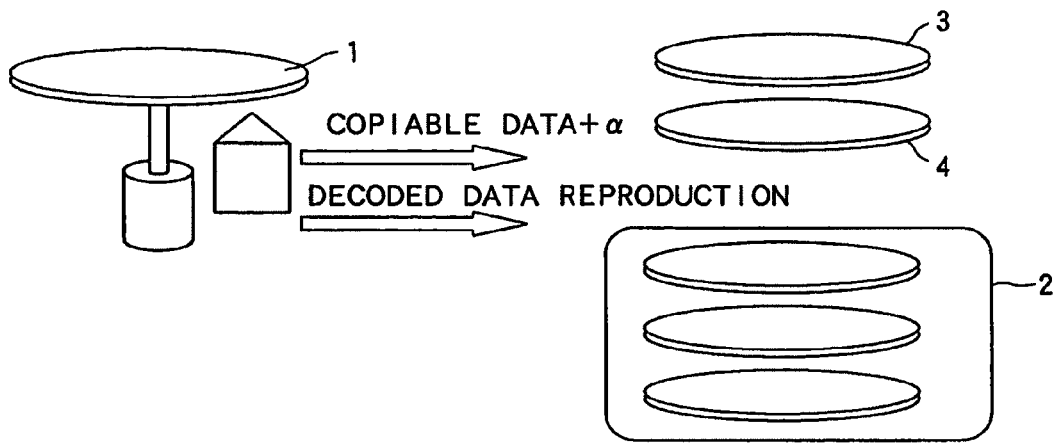
FIG. 1 is a perspective view of the recording medium according to the present invention, schematically showing the construction of the recording medium.
Figure 2:
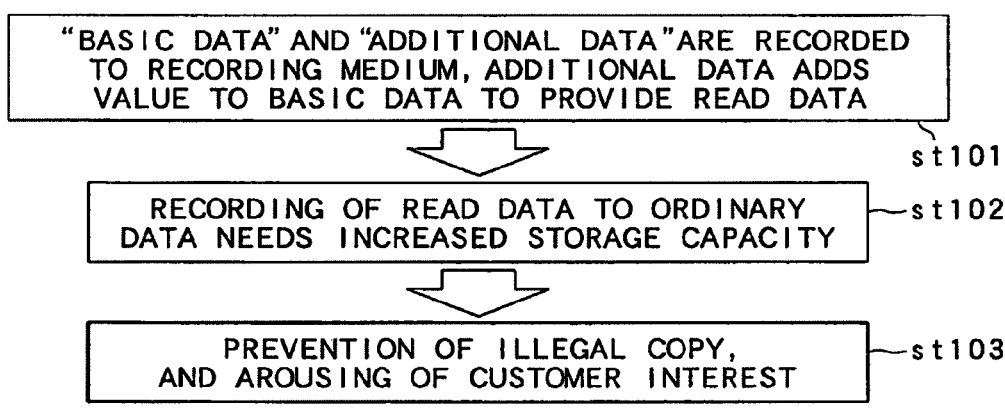
FIG. 2 shows a flow of steps for replication of the recording medium.

Also, only in case the basic data and additional data are recorded in a predetermined relation with each other in the recording medium by a predetermined recording method, they can be read in states in which they can be processed in predetermined manners", respectively:

As shown in FIG. 1, the basic data (data which can be copied) and additional data (meaningless data) a can be read from the recoding medium 1, and it is possible to copy only the basic data from the recording medium 1 to a recording medium 3 having a storage capacity nearly equal to that of the original recording medium 1. However, the basic information reproduced from the basic data alone is inferior in quality to the read information generated on the basis of both the basic and additional data. Also, it is possible to copy only the additional data from the recording medium 1 to a recording medium 4 having a storage capacity nearly equal to that of the original recording medium 1. Therefore, no meaningful information can be reproduced from the additional data.

Accordingly, making, secret and difficult to analyze, the "predetermined processing" for generation of read information on the basis of the basic and additional data permits to make information recorded in the recording medium 1 extremely difficult to copy in a complete form to another recording medium. Also, recording the read information obtained by reading the recording medium 1 as above needs a plurality of recording medium 2, and it is bothering and inconvenient.

By making it difficult to copy information recorded in one recording medium to another recording medium as above, it is possible to provide a recording medium which cannot "illegally" be copied (as in step st103 in FIG. 2).

In this recording medium, the basic information may include for example video information, audio information, computer program, etc., and the additional information is to improve the quality of the video information, audio information, etc. reproduced on the basis of the basic data, that is, the image quality, sound quality, etc. The additional information may include coefficient data generated by a "classification and adaptation" operation which will further be described later or coefficient type data used to generate the coefficient data. The "classification and adaptation" operation can be done by a circuit like a processing unit which will further be described later. In the "classification and adaptation" operation, the additional information may be regarded as preset coefficient information intended for computation of basic data being video data, etc.

Also, the difference between read information and basic information, namely, the higher quality of the read information; is assured by a high spatial resolution and addition of various additional information in case the basic information is video information.

Figure 3:
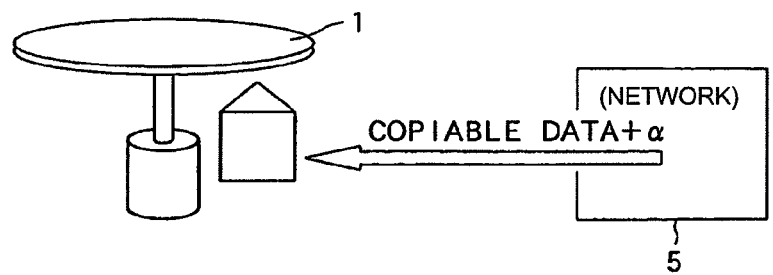
FIG. 3 is a perspective view showing downloading of data to the recording medium.

Note that as shown in FIGS. 3 and 4, the recording medium according to the present invention may be adapted to record the basic data and additional data downloaded from an information network 5 using a public telephone network such as the sol-called Internet (as in step st104 in FIG. 4). Also in this case, the basic data and additional data are recorded to the recording medium 1 in a predetermined relation with each other by a predetermined recording method so that they can be read from the recording medium 1 in a state in which they can undergo the "predetermined processing" (as in step st105 in FIG. 4).

As shown in FIG. 3, the recording medium according to the present invention has such a disc architecture that the basic data (copiable data) and additional data (data α which is meaningless by itself) can be reproducible only when they are recorded in the recording medium architecture. Any "illegal copy", even if tried, of the recording medium takes much labor and long time for analysis and production of the recording medium.

Thus, the fact that the recording medium according to the present invention cannot "illegally" be copied will drive the users' willingness to buy the recording medium sold at a regular retail price (as in step st106 in FIG. 4).

The above-mentioned features of the recording medium according to the present invention are common to the embodiments of the present invention which will be described herebelow:

Disk-Shaped Recording Medium

The recording medium according to the present invention can be formed flat like a disk or card. Also, the flat recording medium can be formed as a disk-shaped recording medium, a so-called "optical disk", from which data can be read by an optical pickup head.

The disk-shaped recording medium has a first recording area and second recording area. Basic data is recorded to the first recording area, and additional data to be added to the basic data is recorded to the second recording area.

When irradiated with a light beam from the optical pickup head, the first recording area reflects the light beam with the nature, such as light amount, polarized direction, etc., of the light beam being changed adaptively to the basic data recorded therein. Also, when irradiated with a light beam from the optical pickup head, the second recording area reflects the light beam with the nature, such as light amount, polarized direction, etc., of the light beam being changed adaptively to the additional data recorded therein. The additional data in the second recording area may be recorded in a recording architecture similar to, or different from, that in the first recording area.

Note that although the recording medium according to the present invention will be described below concerning a disk-shaped one, the recording medium is not limited to such a disk-shaped one but may be formed in various shapes.

First Embodiment of the Disk-Shaped Recording Medium

In this embodiment of the present invention, the disk-shaped recording medium is formed as an optical disk having a single recording layer. As shown in FIG. 5, the disk-shaped recording medium 1 as an optical disk has a recording layer having basic data recorded as pits 6 therein. The basic data is recorded as digital data. When demodulated, the basic data becomes basic information such as video information as in the foregoing. When irradiated with a focused laser beam L from the optical pickup head, the pits 6 scatters the leader beam L. The optical pickup head detects a reflected light from the disk-shaped recording medium 1 to check whether the reflected light contains any signals. The height of the pits 6 is a quarter of the wavelength of the laser beam L irradiated from the optical pickup head.

In the disk-shaped recording medium 1 formed as an optical disk, a step-like portion 7 is formed in a part of each pit 6 to record additional data. The step-like portion 7 is formed to overlap the pit 6 and lower than the pit 6. The step-like portion 7 has such a height as will not interfere with reading of data recorded as the pit 6. The additional data may be either digital or analog. The step-like portion 7 is irradiated with a laser beam focused on other than the recording layer, or in a position different from a focused position of the laser beam, for reading basic data recorded as the pits 6, and the additional data is read as a reflected light of the laser beam thus irradiated to the recording medium 1.

Note that in case a photodetector 16 as a so-called tetrameric photosensor provided in an optical pickup head 25 in a playback apparatus which will further be described later is used to detect the magnitude and direction of an astigmatism of a reflected light from the disk-shaped recording medium 1, the leaser beam can be focused on other than the recording layer by applying a focus servo so that a focus error signal based on an output from the photodetector 16 will be a constant value other than zero.

Thus, the basic data and additional data are read by the optical pickup head 25 from the disk-shaped recording medium 1 as an optical disk. Then, signals are processed in a predetermined manner on the basis of the basic and additional data to generate read information. The read information is superior in quality to the basic information generated from only the basic data.

Figure 7:
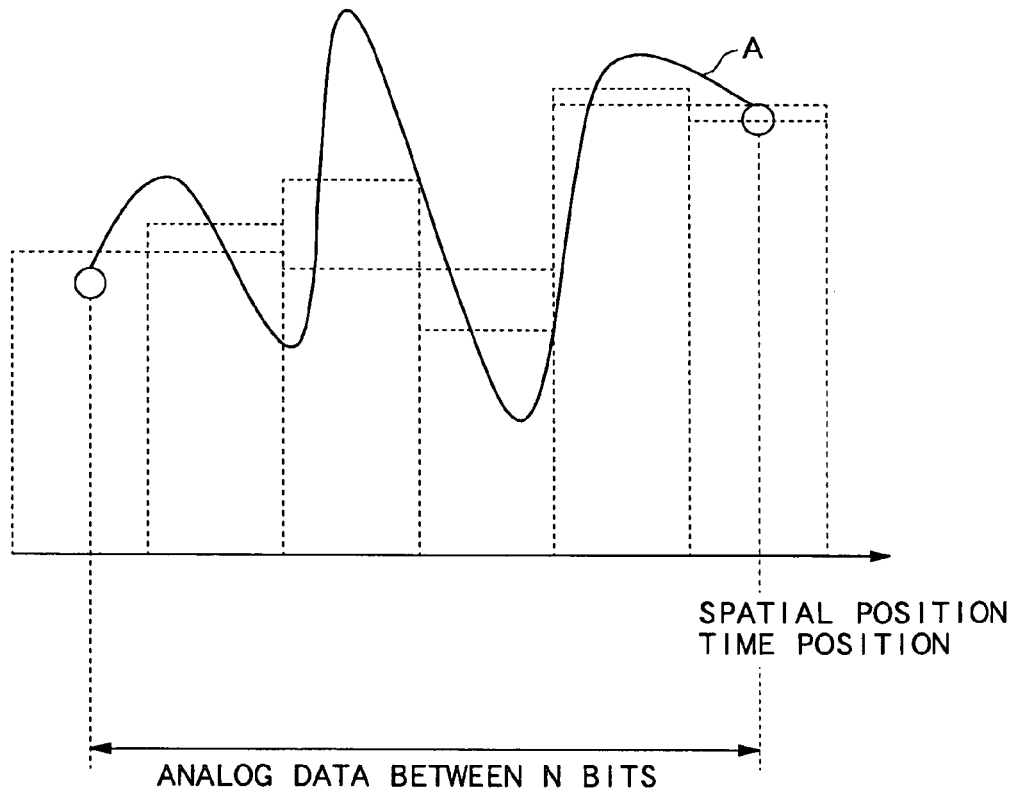
FIG. 7 is also a side elevation of the disk-shaped recording medium according to the present invention, showing additional data.

Note that the basic data may be digital data while the additional data may be analog data. In this case, it is possible that signals forming analog data A will be higher in frequency than digital data as shown in FIG. 7 showing the variation in frequency of signals in spatial or time direction, but it is assumed herein that in the optical pickup head 25, the numerical aperture (NA) of an objective lens which focuses a laser beam and wavelength of the laser beam are so set that the analog data can be read.

Note that the step-like portion 7 may be formed on any other land (where no pits are formed) than the pits, not in any part of each pit, to record the additional data.

The basic data can be modulated and compressed by any of various techniques having heretofore been proposed such as "EFM", "CIRC", "one-to-seven modulation", "Viterbi coding", etc.

Second Embodiment of the Disk-Shaped Recording Medium

Figure 6:
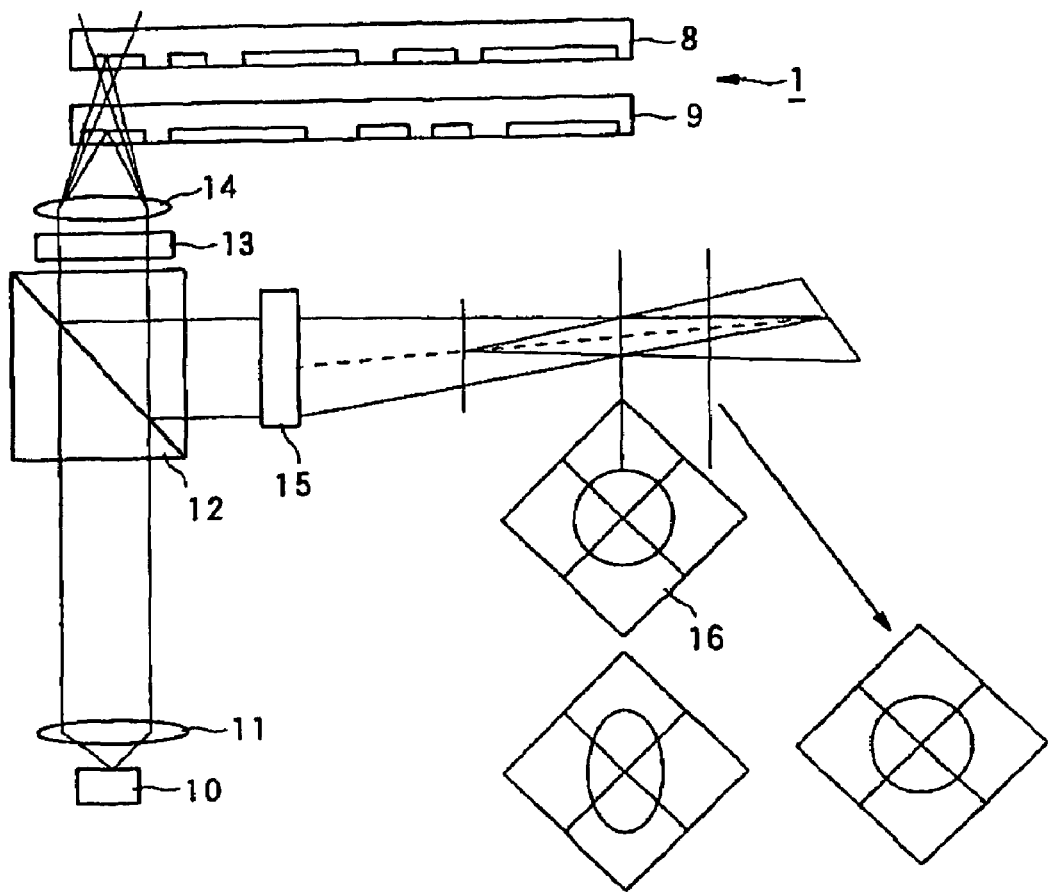
FIG. 6 is a side elevation of a disk-shaped recording medium according to the present invention, which has two recording layers, and an optical pickup head.

Also, the disk-shaped recording medium 1 according to the present invention may be formed as a so-called two-layer disk including two similar recording layers 8 and 9 as shown in FIG. 6. In this case, at least the first and second recording layers 8 and 9 are stacked one on the other.

To record the additional data as the step-like portions, the step-like portion is formed in a part of each pit in the first and second recording layers 8 and 9. From such step-like portions, there is read the additional data as a reflected light of the laser beam focused in a position between the first and second recording layers 8 and 9. To focus the laser beam between the first and second recording layers 8 and 9, an astigmatism has only to be caused by the optical pickup head 25 in the playback apparatus which will further be described later to take place in the reflected light of the laser beam from the disk-shaped recording medium 1 as shown in FIG. 6. By applying a focus servo so that a focus error signal based on an output from the photodetector 16 as the so-called quarter photosensor will be a constant non-zero value, it is possible to detect the magnitude and direction of the astigmatism of the reflected light and read the additional data. In this case, by displacing the quarter photosensor as shown in FIG. 6, the laser beam can be focused in an out-of-focus position rather nearer to the second recording layer 9 than to the first recording layer 8

Third Embodiment of the Disk-Shaped Recording Medium

Figure 8:
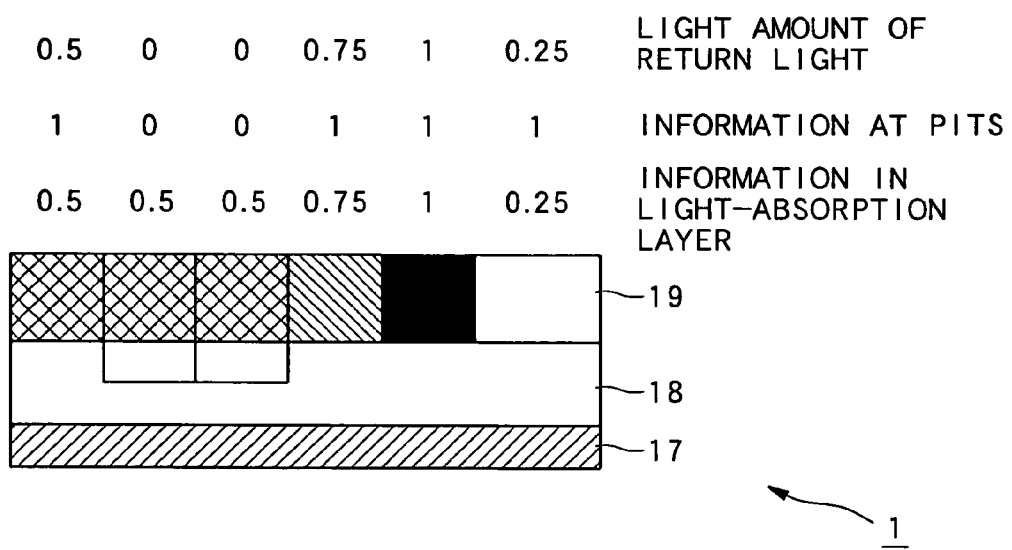
FIG. 8 is an axial-sectional view of the disk-shaped recording medium according to the present invention, showing pits and optical absorption layer in the recording medium.

Also, the disk-shaped recording medium according to the present invention may be formed as a two-layer disk including a first recording layer 18 formed on a disk substrate 17 and where basic data is recorded as pits, and a second recording layer 19 formed in a stacked relation on the first recording layer 18 and where additional data is recorded as a change in transmittance of the second recording layer 19, as shown in FIG. 8.

Basic data is recorded as pits in the first recording layer 18. From this first recording layer 18, there is read the basic data as a change in light amount of a reflected light of a laser beam irradiated from the optical pickup head.

In case the pits are formed in the first recording layer 18, the light amount of the reflected light of the laser beam irradiated from the optical pickup head is nearly zero. Such basic data is defined as "0" (or "1") herein. In case no pits are formed in the first recording layer 18, the amount of light of the reflected light of the laser beam irradiated from the optical pickup head will be nearly equal to that of the irradiated laser beam when almost all the reflected light is transmitted through the second recording layer 19. This basic data is defined as "1" (or "0") herein.

The laser beam irradiated from the optical pickup head is transmitted through the second recording layer 19, reflected by the first recording layer 18 and transmitted again through the second recording layer 19. The reflected light from the recording medium is thus changed in amount of light. The additional data is read as a change in light amount of the reflected light from the recording medium.

More specifically, from a portion of the recording medium where no pits are formed in the first recording layer 18, there are detected the additional data corresponding to the transmittance of the second recording layer 19 and the basic data ("1" or "0") corresponding to a state in which no pits are formed in the first recording layer 18. From a portion of the recording medium where the pits are formed in the first recording layer 18, there are detected the light amount of the reflected light is nearly zero independently of the transmittance of the second recording layer 19 and there are detected the basic data ("0" or "1") corresponding to a state in which the pits are formed in the first recording layer 18.

The second recording layer 19 contains an organic dye, for example, and has a bright part (with a high transmittance) and a dark part (with a low transmittance) corresponding to the additional data, respectively, recorded in the layer 19. Data recorded to the first recording layer 18 is one-bit data which is "1" or "0", while multiple-bit data can be recorded to the second recording layer 19 by setting the transmittance of the latter to multiple steps. Also, the data to be thus recorded may be analog data.

Also, the second recording layer 19 may contain crystals which will scatter the laser beam irradiated to the recording medium. The light transmitted through the second recording layer 19 is changed in amount correspondingly to the density of the crystals.

Also from the recording medium 1, the basic and additional data are read by the optical pickup head 25 which will further be described later. Signals are processed in a predetermined manner on the basis of the basic and additional data to generate read information. The read information is superior in quality to basic information generated from only the basic data.

Fourth Embodiment of the Disk-Shaped Recording Medium

Figure 9:
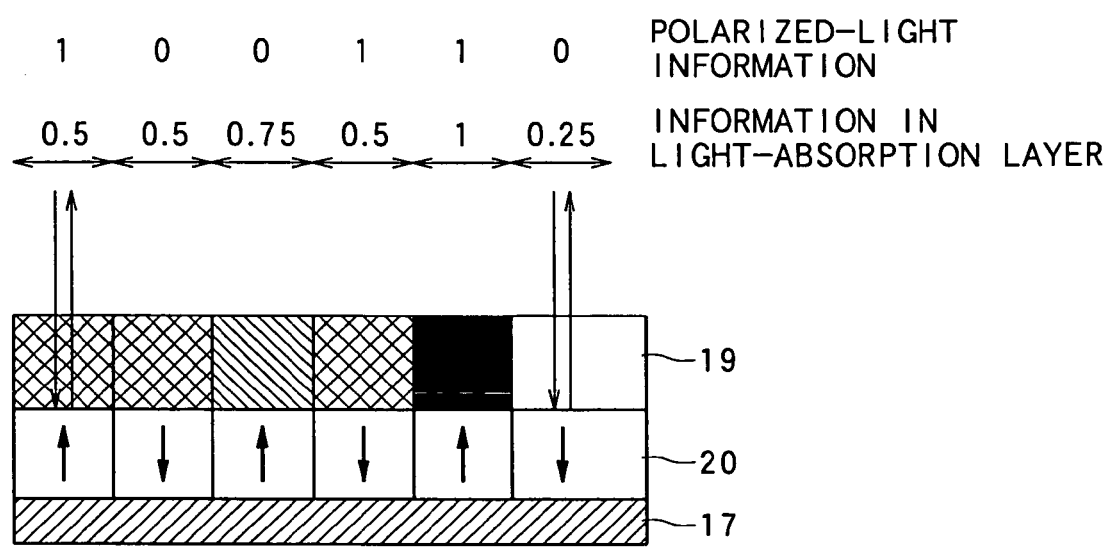
FIG. 9 is an axial-sectional view of the disk-shaped recording medium according to the present invention, showing a magneto-optical layer and optical absorption layer in the recording medium.

Also, the disk-shaped recording medium 1 according to the present invention may be formed as a magneto-optical disk including a first recording layer 20 where basic data is recorded as a change in magnetized direction of the layer 20, and a second recording layer 19 formed in a stacked relation on the first recording layer 20 and where additional data is recorded as a change in transmittance of the layer 20, as shown in FIG. 9.

The above first recording layer 20 is formed from a magnetic material, namely, it is a so-called magneto-optical recording layer, where the basic data is recorded as a change in magnetized direction of the layer 20. From the first recording layer 20, there is read the basic data by irradiating a linearly polarized laser beam from the optical pickup head and detecting a change in polarized direction of a reflected light of the laser beam from the recording medium 1.

The second recording layer 19 is formed in a stacked relation on the first recording layer 20, and the additional data to be added to the basic data is recorded as a change in transmittance of the layer 20 to the layer 19. A linearly polarized laser beam irradiated from the optical pickup head to the second recording layer 19 is transmitted through the layer 19, reflected by the first recording layer 20 and transmitted again through the second recording layer 19. The reflected light from the recording medium is thus changed in amount of light. The additional data is read by detecting the change in light amount of the reflected light from the recording medium. The second recording layer 19 contains an organic dye, for example, and has a bright part (high in transmittance) and a dark part (low in transmittance) corresponding to the additional data, respectively, recorded therein. Also, the second recording layer 19 may contain crystals which will scatter the laser beam irradiated to the recording medium. The light transmitted through the second recording layer 19 is changed in amount correspondingly to the density of the crystals.

From the recording medium 1 thus formed as a magneto-optical disk, the basic and additional data are read by the optical pickup head 25 which will further be described later. Then, signals are processed in a predetermined manner on the basis of the basic and additional data to generate read information. The read information is superior in quality to basic information generated from only the basic data.

Fifth Embodiment of the Disk-Shaped Recording Medium

Figure 10:
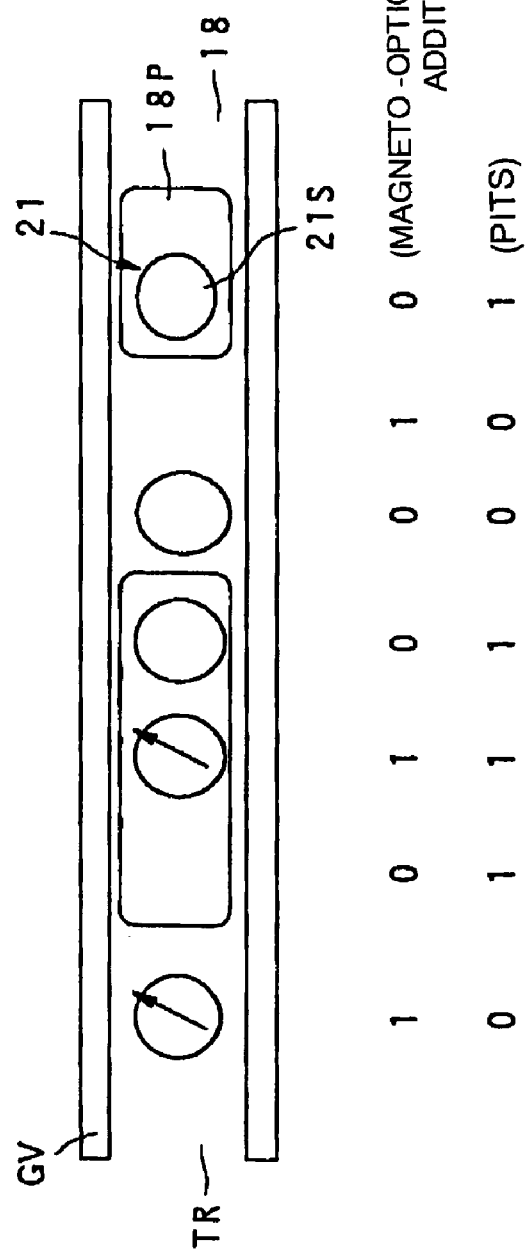
FIG. 10 is a plan view of the disk-shaped recording medium according to the present invention, showing pits and magneto-optical layer in the recording medium.

Also, the disk-shaped recording medium 1 according to the present invention may be formed as a magneto-optical disk including, as shown in FIG. 10, a first recording medium 18 taking, as a recording track TR, land portions between grooves GV and where basic data is recorded as pits 18P, and a second recording layer 21 formed in a stacked relation on the first recording layer 18 and where additional data is recorded as a change in magnetized direction of the layer 21.

The first recording layer 18 has formed therein the pits 18P corresponding to the basic data, namely, it has the basic data recorded therein as the pits 18P. From this first recording layer 18, there is read the basic data as a change in light amount of a reflected light of a laser beam irradiated from the optical pickup head.

The above first recording layer 21 is formed from a magnetic material, namely, it is a so-called magneto-optical recording layer, where the additional data is recorded as a change in magnetized direction of the layer 21. From the first recording layer 21, there is read the additional data by irradiating a linearly polarized laser beam from the optical pickup head and detecting a change in polarized direction of a reflected light of the laser beam from the recording medium 1.

Figure 11:
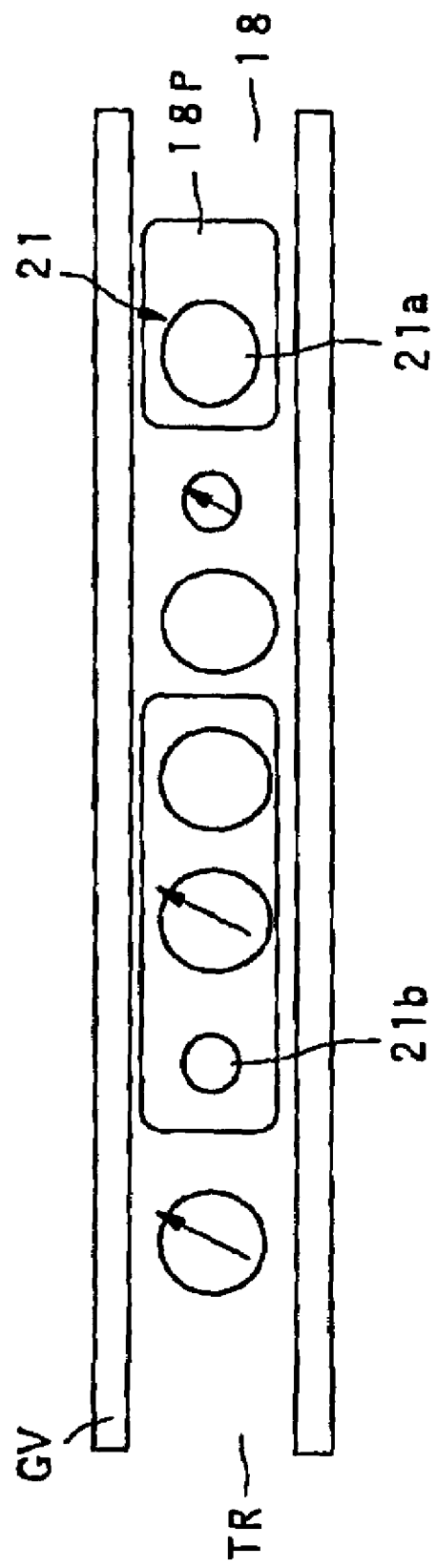
FIG. 11 is also a plan view of another embodiment of the disk-shaped recording medium according to the present invention, showing pits and magneto-optical layer in the recording medium.

In the second recording layer 21, the additional data is recorded as generally circular magneto-optical points 21S formed on the recording track TR, that is, on the pit trains in the first recording layer 18. All the magneto-optical spots 21S may have the same circular shapes equal in diameter to each other or they may be different in diameter and shape from each other. Further, the magneto-optical spots 21S may include alt least two types, that is, magneto-optical spots 21*a* each having a first area and those 21*b* each having a second area which is smaller than the first area, as shown in FIG. 11. In case the magneto-optical spots include multiple types different in diameter (area), different additional data can be recorded as differences in diameter (area) to the recording medium or analog data corresponding to such differences in diameter (area) can be recorded to the recording medium.

Also from the recording medium 1 thus formed as a magneto-optical disk, the basic and additional data are read by the optical pickup head 25 which will further be described later. Then, signals are processed in a predetermined manner on the basis of the basic and additional data to generate read information. The read information is superior in quality to basic information generated from only the basic data.

Sixth Embodiment of the Disk-Shaped Recording Medium

Figure 12A:
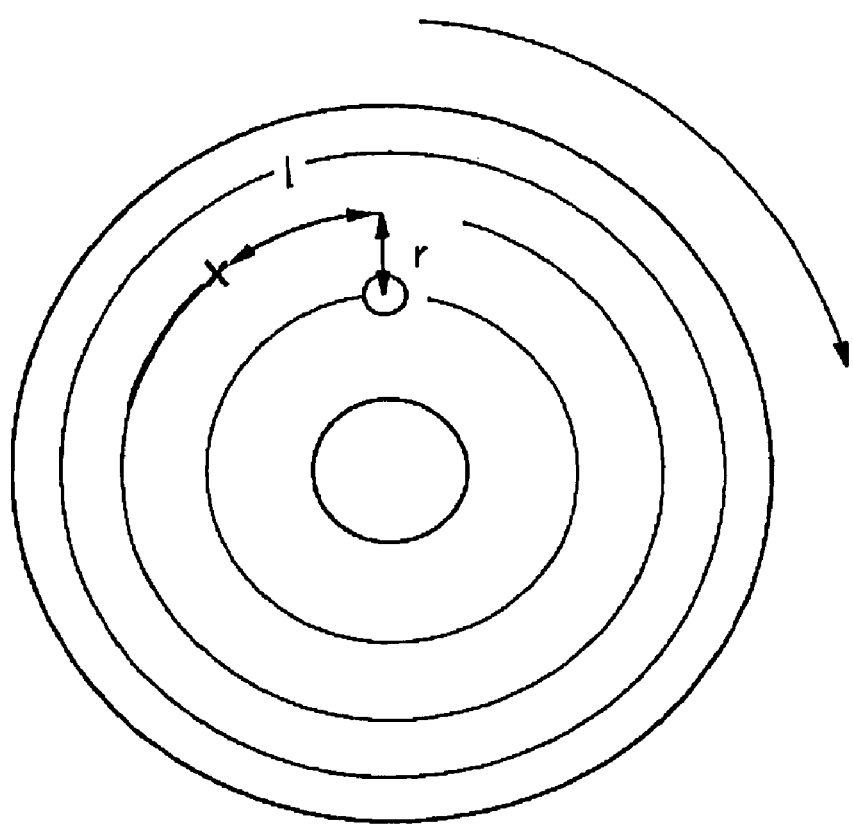
FIG. 12A is a plan view of the disk-shaped recording medium in which basic data and additional data are apart a predetermined relative address from each other and FIG. 12B schematically illustrates the relation between the basic data and additional data.

For the sixth embodiment of the disk-shaped recording medium, basic data DB recorded in a position a predetermine relative address (r, l) apart from where specific basic data DB is recorded is used as additional data DA corresponding to the specific basic data DB as shown in FIG. 12A.

Figure 12B:
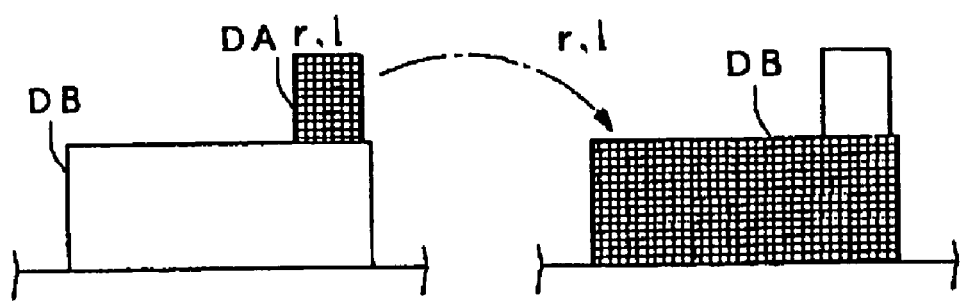

That is, in this case, a value of the predetermined address (r, l) as a relative address is recorded in the position where the specific basic data DB is recorded similarly to the above-mentioned additional data DA as shown in FIG. 12B. In this disk-shaped recording medium, the basic data DB recorded in a position a read predetermined relative address (r, l) from where the specific basic data is recorded corresponds to the additional data DA inherently corresponding to the specific basic data.

Overview of the Playback Apparatus and Method

The playback apparatus according to the present invention reads basic data and additional data from the aforementioned recording medium and disk-shaped recording medium and generates read information from these basic and additional data. Also, the playback method according to the present invention is executed to read the basic and additional data from the recording medium and disk-shaped recording medium and generate read information from the basic and additional data.

Namely, a recording medium having the first recording area where basic data is to be recorded and a second recording area where additional data is to be recorded, as having previously been described, is loaded into the playback apparatus or player. In this player, a first data acquisition means reads the basic data from the recording medium while a second data acquisition means reads the additional data, and the basic and additional data are processed in a predetermined manner to generate read information. The player includes a playback means for generating read information on basic information obtained by demodulating the basic data and additional information obtained by demodulating the additional data.

The basic data includes video data, audio data or the like as having previously been described. On the other hand, the additional data is intended for improve the quality of information reproduced based on the video data, that is, the image quality, sound quality, etc.

Also, in the player, data supplied from outside can be used as the additional data in addition to the additional data read from the recording medium. In this case, the player is provided with an external information input means to which external information is supplied. The external information input means is a bodily information acquisition apparatus to acquire bodily information on the user as external information, environmental information acquisition apparatus to acquire environmental information as external information or the like, for example. Each of these bodily information acquisition apparatus and environmental information acquisition apparatus, etc. includes a light sensor, temperature sensor, humidity sensor and the like.

Also, a time measurement unit which measures a time to provide time-length information or time-of-day data may be used as the external information input means and time-length data and time-of-day data be used as additional data.

In the above cases, the player will generate read information on the basis of the basic information and additional information as well as of the external information or time-length information and time-of-day information supplied from the external information input means.

Note that for the disk-shaped recording medium, the basic and additional data may be either digital or analog.

Common Elements in the Embodiments of Playback Apparatus and Method

Figure 13:
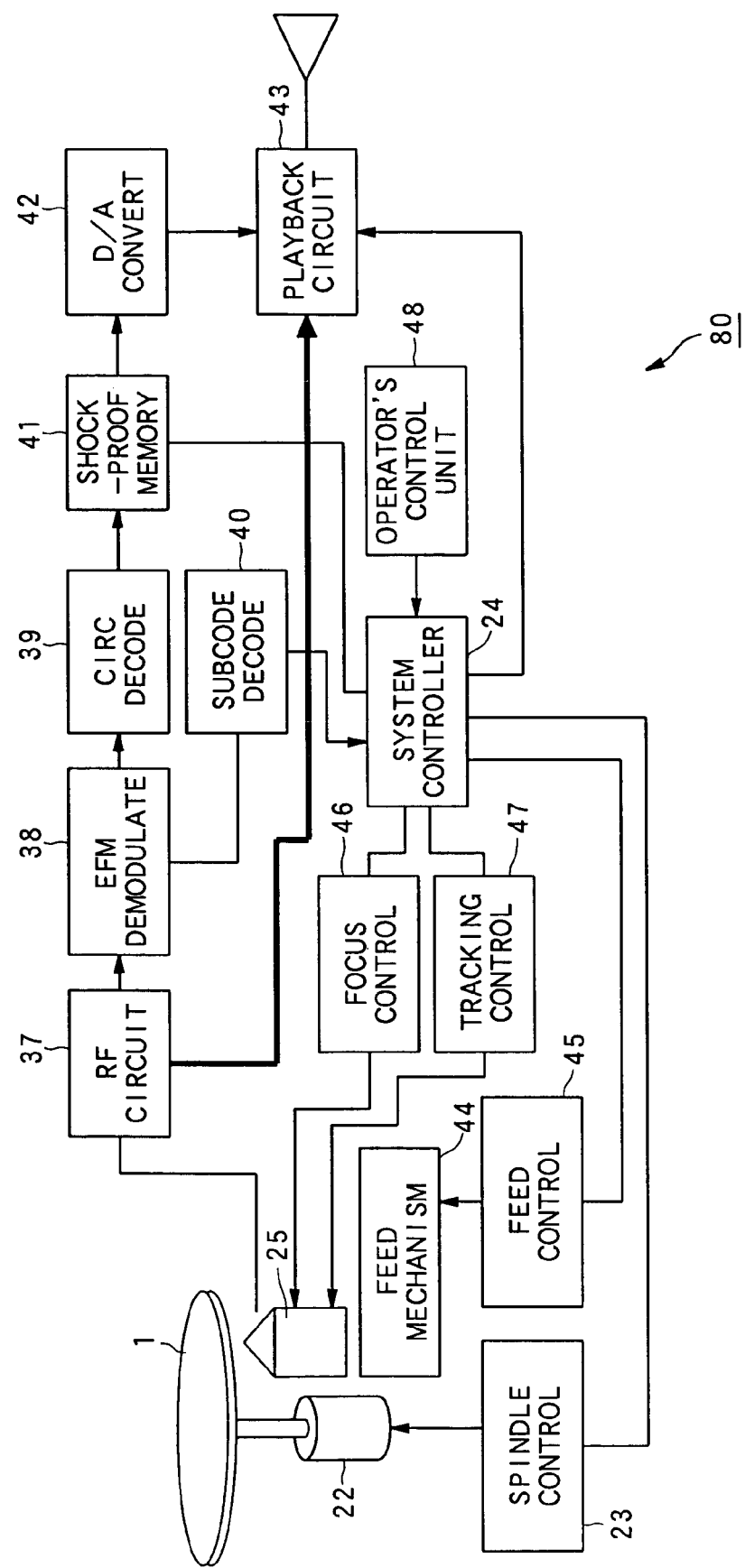
FIG. 13 is a block diagram of the playback apparatus according to the present invention.

The player according to the present invention, generally indicated with a reference 80, includes a rotation drive 22 which supports and rotates the disk-shaped recording medium 1 as shown in FIG. 13 for example. The rotation drive 22 has a spindle motor which rotates the disk-shaped recording medium 1, and it is controlled by a system controller 24 via a spindle control circuit 23.

Figure 14:
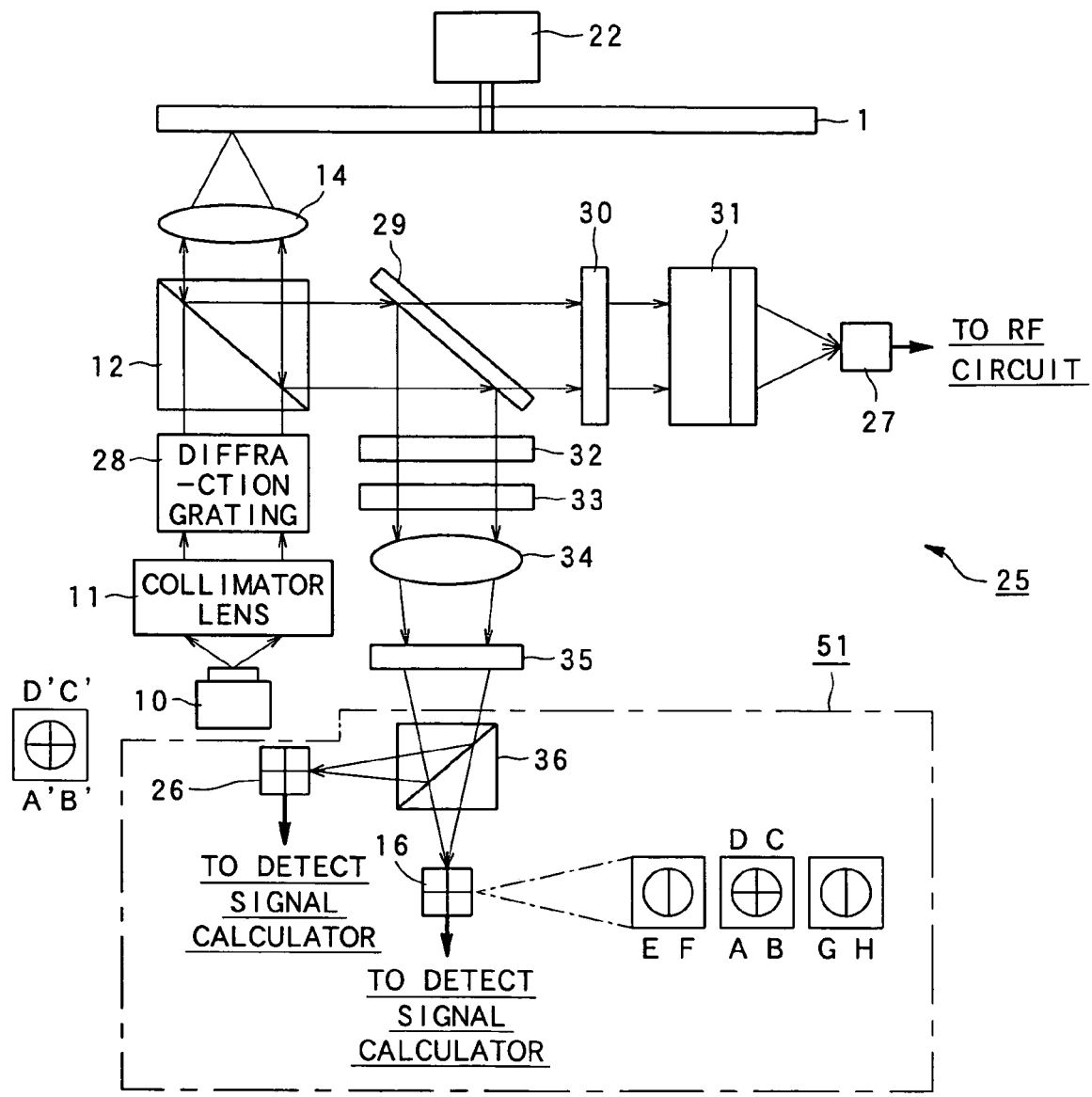
FIG. 14 is a side elevation of an optical pickup head provided in the playback apparatus.

Also, the player 80 includes the optical pickup head 25 which irradiates laser light to the disk-shaped recording medium 1. As shown in FIG. 14, the optical pickup head 25 includes an optical system by which a laser beam emitted from a light source 10 is irradiated to the disk-shaped recording medium 1, and first to third photodetectors 16, 26 and 27 which detect a reflected light, from the disk-shaped recording medium 1, of the laser beam irradiated to the disk-shaped recording medium 1.

The laser beam emitted from the light source 10 is formed by a collimator lens 11 into a parallel beam. The parallel beam is split by a diffraction grating 28 into three or more beams. These beams are incident upon a beam splitter 12 and then focused by an objective lens 14 on the signal recording layer of the disk-shaped recording medium 1. Then, a reflected light from the disk-shaped recording medium 1 comes back through the objective lens 14 to the beam splitter 12 and is deflected from the optical path to the light source 10, namely, reflected toward a half mirror 29. The half mirror 29 allows a portion of the reflected beam to pass through and go to the first photodetector 27 through a λ/2 (half of wavelength) plate 30 and collimator lens 31. The first photodetector 27 thus detects the light amount of the reflected light from the disk-shaped recording medium 1. The first photodetector 27 provides an RF signal. Thus, data recorded as pits or data recorded as difference in light transmittance or reflectance in the disk-shaped recording medium 1 can be read based on the output from the first photodetector 27.

Also, the half mirror 29 reflects the rest of the reflected beam (not allowed to pass through). This reflected light goes through a compensation plate 32, λ/2 (half of wavelength) plate 33, condenser lens 34 and cylindrical lens 35 to a polarizing beam splitter 36. It is branched by the polarizing beam splitter 36 toward the second and third photodetectors 16 and 26, namely, detected by the latter. A magneto-optical signal and various error signals can be generated from outputs from the second and third photodetectors 16 and 26. That is, the difference between the outputs from the second and third photodetectors 16 and 26 is a magneto-optical signal. Thus, data recorded by magneto-optical spots in the disk-shaped recording medium 1 can be read based on the outputs from the second and third photodetectors 16 and 26.

Each of the second and third photodetectors 16 and 26 has a light-incident surface thereof divided radially into four sections from the center thereof, and each of the quadrant light-incident surfaces provides an output independently. By adding together outputs from each pair of the quadrant light-incident surfaces symmetrical to each other with respect to the center of the light-incident surface and calculating a difference is calculated between the output sums from the two pairs, an astigmatism difference caused by the cylindrical lens 35 can be detected and the signal thus obtained is a focus error signal (which is the so-called astigmatism method). Also, by calculating a difference in intensity between the reflected beams, from the disk-shaped recording medium 1, of the laser beam branched by the diffraction grating 28, a tracking error signal can be detected (which is the so-called 3-beam method).

The output signal from the first photodetector 27 indicates the light amount of the reflected light from the disk-shaped recording medium 1, and this signal is sent to an RF circuit 37 as shown in FIG. 13.

The output signal amplified by the RF circuit 37 is passed to an EFM demodulation circuit 38 where it will undergo EFM demodulation. Output from the EFM demodulation circuit 38 is passed to a "CIRC" decoding circuit 39 and subcode decoding circuit 40. The signal subjected to "CIRC" decoding (expansion) in the "CIRC" decoding circuit 39 is supplied to a playback circuit 43 through a shockproof memory 41 and D-A converter 42. The subcode decoding circuit 40 decodes a subcode and sends it to the system controller 24.

The optical pickup head 25 is moved between the inner and outer circumferences of the disk-shaped recording medium 1 by a feeding mechanism 44. The feeding mechanism 44 is controlled by the system controller 24 via a feeding control circuit 45.

Further, the player 80 includes a focus control circuit 46. The focus control circuit 46 is controlled by the system controller 24 on the basis of the result of reflected light detection by the photodetectors in the optical pickup head 25 to adjust the focus in the optical pickup head 25. The focus adjustment is attained by moving the focused position of the laser beam emitted from the optical pickup head 25 to a predetermined position relative to the signal recording layer in the disk-shaped recording medium 1 by moving the objective lens of the optical pickup head 25 optical-axially of the objective lens.

Also, the player 80 includes a tracking control circuit 47. The tracking control circuit 47 is controlled by the system controller 24 on the basis of the result of reflected light detection by the photodetectors in the optical pickup head 25 to adjust the tracking in the optical pickup head 25. The tracking adjustment is attained by moving the focused position of the laser beam emitted from the optical pickup head 25 to the recording track in the disk-shaped recording medium 1 by moving the objective lens of the optical pickup head 25 in a direction perpendicular to the optical axis of the objective lens (radially of the disk-shaped recording medium 1).

Note that the system controller 24 has an operator's control unit 48 connected thereto. The operator's control unit 48 is manually operated to supply operation signals to the system controller 24.

The EFM demodulation circuit 38 functions as first and second decoding means. That is to say, the EFM demodulation circuit 38 works as the first decoding means for decoding basic information from the basic data on the basis of the result of reflected light detection by the photodetectors when the focus control circuit 46 has selected a first mode, while working as the second decoding means for decoding additional information from additional data on the basis of the reflected light detection by the photodetectors when the focus control circuit 46 has selected a second mode.

The playback circuit 43 generates read information on the basis of the basic information and additional data decoded by the EFM demodulation circuit 38. The read information is superior in quality to the basic information reproduced from the basic data.

First Embodiments of the Playback Apparatus and Method

The player according to the present invention can be designed to have the aforementioned disk-shaped recording medium loaded therein to read information from the disk-shaped recording medium. FIG. 13 shows the first embodiment of the player 80 according to the present invention. In this player 80, there is loaded a disk-shaped recording medium 1 including a recording layer having basic data recorded as pits therein and a step-like portion formed in a part of each pit in of the recording layer and having additional data recorded thereon. The additional data is read based on a reflected light of laser light focused in a position on the step-like portion and not included in the recording layer. Then, the read information superior in quality to any basic information generated from the basic data can be generated by a predetermined processing on the basis of the basic data and additional data.

According to this embodiment, the focus control circuit 46 can make a selection between the first mode in which a laser beam emitted from the optical pickup head 25 is focused on the recording layer of the disk-shaped recording medium 1 and the second mode in which the laser beam is focused in a position not included in the recording layer of the disk-shaped recording medium 1. The second mode can be performed by making such a focus servo control that the focus error signal based on the output from the second photodetector 16 will take a constant value which is not zero.

As shown in FIG. 6, the reflected beam from the disk-shaped recording medium 1 is caused to have an astigmatism, the magnitude and direction of the astigmatism by the second photodetector 16 and such a focus servo control is made for the focus error signal based on the output from the second photodetector 16 to have a constant value not being zero, thereby permitting to read the additional data with the laser beam being focused in a position between the recording layers of the disk-shaped recording medium to read the additional data.

Second Embodiments of the Playback Apparatus and Method

Figure 15:
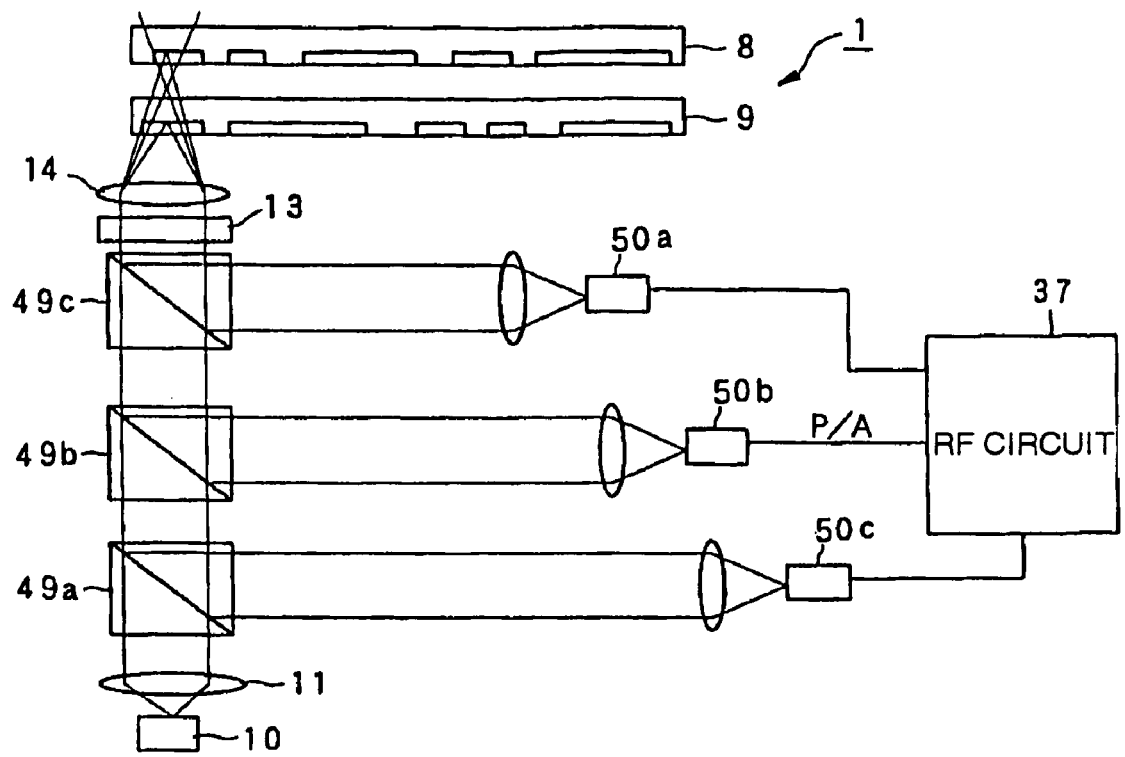
FIG. 15 is a block diagram of the optical pickup head.

The player 80 according to the present invention can be designed to read information from a so-called two-layer disk including similar recording layers stacked one on the other, as shown in FIG. 15. The signal recording layer of the disk-shaped recording medium 1 includes at least a first recording layer 8 and second recording layer 9 stacked one on the other. A step-like portion is formed in a part of each pit in the first and second recording layers 8 and 9. Additional data is read from the step-like portions by focusing laser light in a position between the first and second recording layers 8 and 9. The player 80 includes also the rotation drive 22, optical pickup head 25, etc. as shown in FIG. 13.

According to this second embodiment, the focus control circuit 46 can make a selection between the first mode in which a laser beam emitted from the optical pickup head 25 is focused on any of the recording layers of the disk-shaped recording medium 1 and the second mode in which the laser beam is focused in a position between the first and second recording layers 8 and 9 of the disk-shaped recording medium 1. The second mode can be performed by making such a focus servo control that the focus error signal based on the output from the second photodetector 16 will take a constant value which is not zero.

The EFM demodulation circuit 38 functions as first and second decoding means. That is, the EFM demodulation circuit 38 works as the first decoding means for decoding basic information from basic data on the basis of the result of reflected light detection by the photodetectors when the focus control circuit 46 has selected a first mode, while working as the second decoding means for decoding additional information from additional data on the basis of the reflected light detection by the photodetectors when the focus control circuit 46 has selected a second mode.

The playback circuit 43 generates read information on the basis of the basic information and additional data decoded by the EFM demodulation circuit 38. The read information is superior in quality to the basic information reproduced from the basic data.

Note that the optical pickup head 25 in the player 80 may be designed such that light beams emitted from the light source 10 formed from a laser diode will sequentially be transmitted through first, second and third beam splitters 49a, 49b and 49c and incident upon the disk-shaped recording medium 1 through a λ/4 plate 13 and tri-focus objective lens 14, as shown in FIG. 15. In the optical pickup head 25, the reflected light from the first recording layer 8 of the disk-shaped recording medium 1 is split by the third beam splitter 49c and detected by a photodetector 50a. The reflected light of the light beam focused in a position between the first and second recording layers 8 and 9 is split by the second beam splitter 49b and detected by a photodetector 50b. The reflected light from the second recording layer 9 is split by the first beam splitter 49a and detected by a photodetector 50c.

Third Embodiments of the Playback Apparatus and Method

Also, the player 80 according to the present invention may be designed to be compatible with a disk-shaped recording medium 1 including a first recording layer which is the aforementioned first recording part where basic data is recorded, and a second recording part which is the second recording part where additional data is recorded.

As above, the disk-shaped recording medium 1 includes the first recording layer where basic data is recorded and the second recording layer stacked on the first recording layer and where additional data to be added to the basic data is recorded. Read information generated by a predetermined processing on the basis of the basic and additional data is superior in quality to basic information generated from the basic data.

In the disk-shaped recording medium 1, the first recording layer has formed therein pits corresponding to the basic data and by which the basic data is recorded. From the first recording layer, there can be read the basic data as a change in light amount of the reflected light of the light beam irradiated to the first recording layer. Also, the second recording layer in the disk-shaped recording medium has recorded therein the additional data as a change in transmittance of the recording layer. From the second recording layer, there can be read the additional data as a change in light amount of the light beam having been irradiated to the second recording layer, transmitted through the second recording layer, reflected by the first recording layer and transmitted again through the second recording layer.

The player 80 includes also the rotation drive 22, optical pickup head 25, etc. as shown in FIG. 13.

In this embodiment, the optical pickup head 25 works as a first data acquisition means for acquiring the basic data on the basis of the result of the detection by the photodetector of reflected light from the first recording layer of the disk-shaped recording medium 1, while working as: a second data acquisition means for acquiring the additional data on the basis of the result of the detection by the photodetector of reflected light from the second recording layer of the disk-shaped recording medium 1.

Also in this embodiment, the EFM demodulation circuit 38 works as a first decoding means for decoding basic information from the basic data acquired by the first data acquisition means, while working as a second decoding means for decoding additional information from the additional data acquired by the second data acquisition means.

The playback circuit 43 generates read information on the basis of the basic and additional information decoded by the EFM demodulation circuit 38.

Fourth Embodiments of the Playback Apparatus and Method

Also, the player 80 according to the present invention may be designed to be compatible with a disk-shaped recording medium 1 including a first recording layer formed from a magnetic material and of which a change in magnetized direction is recorded as basic data, and a second recording layer of Which a change in transmittance is recorded as additional data.

From the first recording layer in the disk-shaped recording medium 1, there can be read the basic data as a change in polarized direction of a reflected light of a light beam irradiated to the first recording layer. Also, from the second recording layer in the disk-shaped recording medium, there can be read the additional data as a change in light amount of the reflected light of the light beam irradiated to the second recording layer.

The player 80 includes also the rotation drive 22, optical pickup head 25, etc. as shown in FIG. 13.

Figure 16:
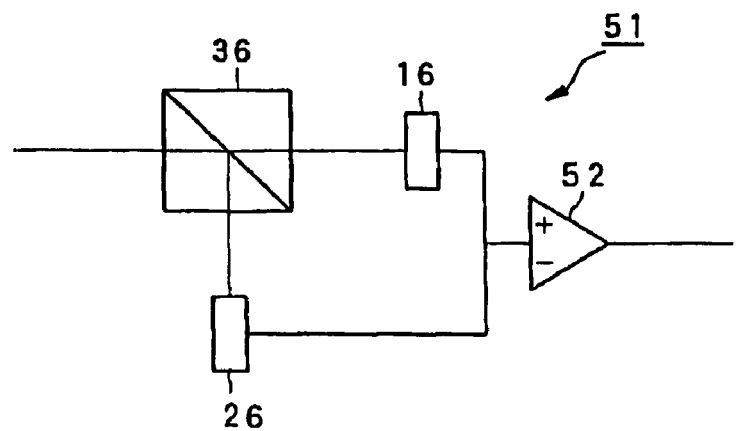
FIG. 16 is a block diagram of a magneto-optical signal detector provided in the optical pickup head.

In this embodiment, a detector 51 included in the optical pickup head 25 includes, as shown in FIG. 16, a polarizing beam splitter 36 which splits the incident reflected light into a first reflected light and second reflected light correspondingly to components of a polarized direction, first photodetector 26 to detect the light amount of the first reflected light, second photodetector 16 to detect the light amount of the second reflected light, and a comparator 52 which makes a comparison between the results of the detection by the first and second photodetectors 26 and 16. In this detector 51, the polarized direction of the reflected light is detected based on the result of the comparison by the comparator 52.

Also in this embodiment, the optical pickup head 25 reads the basic data on the basis of the result of the reflected-light polarized direction by the detector 51, while reading the additional data on the basis of the result of the reflected-light intensity by the detector 51. The EFM demodulation circuit 38 works as a first decoding means for decoding basic information from the basic data, while working as a second decoding means for decoding additional information from the additional data.

The playback circuit 43 generates read information on the basis of the basic and additional information decoded by the EFM demodulation circuit 38.

Fifth Embodiments of the Playback Apparatus and Method

Also, the player 80 according to the present invention can be designed to be compatible with a disk-shaped recording medium 1 formed from a magnetic material and which has defined thereon a recording track on which basic data is recorded as pits and additional data is recorded as a change in magnetized direction.

On the recording track in this disk-shaped recording medium 1, basic data is recorded as pits and additional data to be added to the basic data is recorded as a change in magnetized direction. On the recording track, additional data is recorded as generally circular magneto-optical spots formed on the recording track. The magneto-optical spots include at least two types; one having a first area and the other having a second area smaller than the first area. In this disc-shaped recording medium, read information generated by a predetermined processing on the basis of the basic and additional area is superior in quality to basic information generated from the basic data.

The player 80 includes also the rotation drive 22, optical pickup head 25, etc. as shown in FIG. 13.

According to this embodiment, the basic data recorded as pits is read as a change in light amount detected by the first photodetector 27 as shown in FIG. 14. The detector 51 in the optical pickup head 25 includes, as shown in FIG. 16, the polarizing beam splitter 36 which splits the incident reflected light into a first reflected light and second reflected light correspondingly to components of a polarized direction, first photodetector 26 to detect the light amount of the first reflected light, second photodetector 16 to detect the light amount of the second reflected light, and a comparator 52 which makes a comparison between the results of the detection by the first and second photodetectors 26 and 16. In this detector 51, the polarized direction of the reflected light is detected and the area of the magneto-optical spot is determined, based on the result of the comparison by the comparator 52. In the detector 51, the area of the magneto-optical spot is determined by detecting a ratio between the results of light-amount detection by the first and second photodetectors 26 and 16 on the basis of the result of comparison by the comparator 52.

Also in this embodiment, the optical pickup head 25 reads the basic data on the basis of the result of the reflected-light intension direction by the detector 51, while reading the additional data on the basis of the results of the reflected-light polarized direction detection and magneto-optical spots area detection by the detector 51. The EFM demodulation circuit 38 works as a first decoding means for decoding basic information from the basic data, while working as a second decoding means for decoding additional information from the additional data.

The playback circuit 43 generates read information on the basis of the basic and additional information decoded by the EFM demodulation circuit 38.

Embodiment of the Disk-Shaped Recording Medium Production Apparatus

Figure 17:
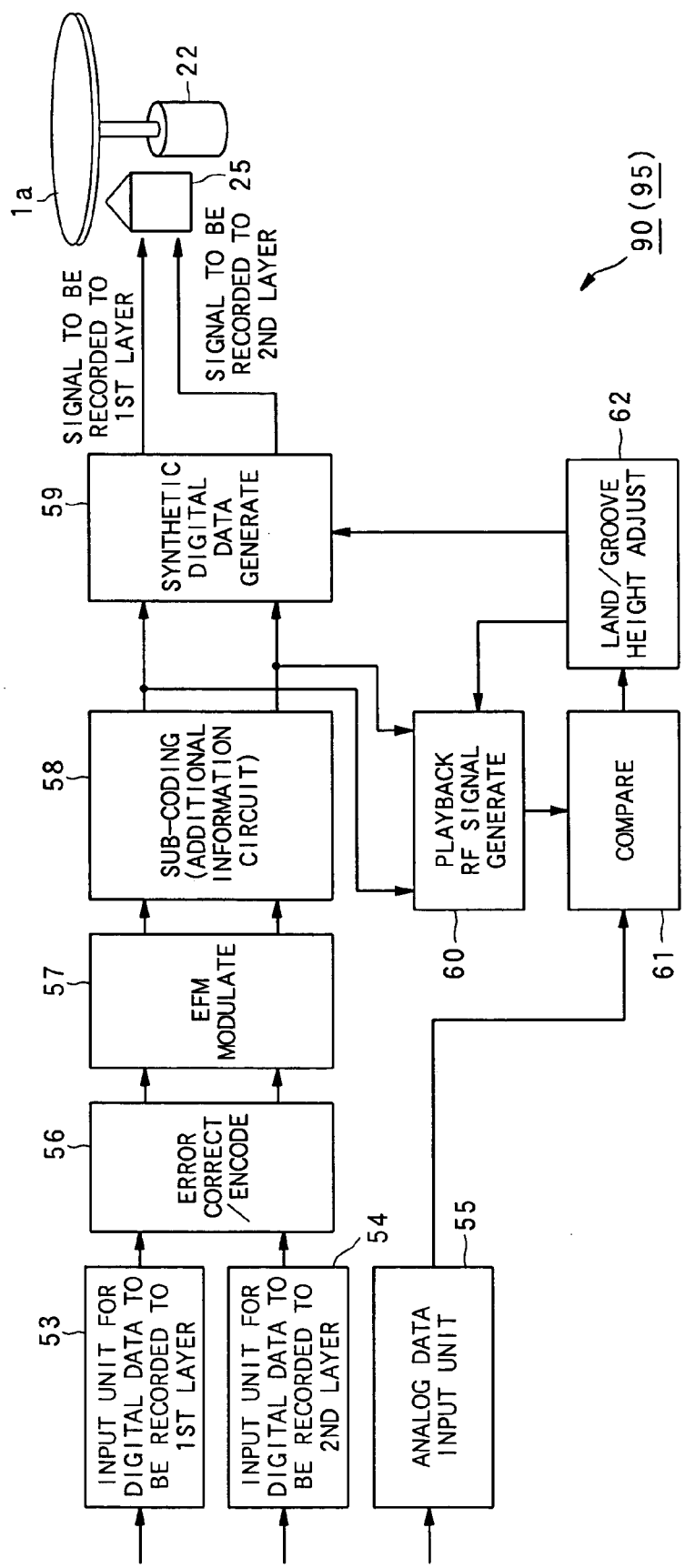
FIG. 17 is a block diagram of the disk-shaped recording medium production apparatus according to the present invention.

The disk-shaped recording medium production apparatus, generally indicated with a reference 90 in FIG. 17, is intended for use to produce a master disk 1a for production of a disk-shaped recording medium to which basic data is recorded as pits and additional data is recorded as a portion formed in a part of each of the pits.

In the disk-shaped recording medium, read information generated by a predetermined processing on the basis of the basic data and additional data is superior in quality to basic information generated from the basic data.

In the disk-shaped recording medium production apparatus 90, the basic information is coded by a first digital data input unit 53 as an encoding means. Also in this disk-shaped recording medium production apparatus 90, additional information is coded by a second digital data input unit 54 as an encoding means. The second digital input unit 54 may be designed to generate the additional data by classification and adaptation which will further be described later. The "classification and adaptation" operation is done by a circuit such as a processing unit which will be described in detail later. It should be noted that in case the additional data is analog signals or third digital data which indicating an analog amount, it is supplied from outside via an analog data input unit 55.

Outputs from the first and second digital data input units 53 and 54 are passed to an error correction/encoding circuit 56. The signals subjected to error correction and encoding are sent to an EFM modulation circuit 57 where it is EFM-modulated and sent to a sub-coding circuit 58. The basic and additional data sub-coded in the sub-coding circuit 58 are passed to a synthetic digital data generator 59. The synthetic digital data generator 59 combines the basic and additional data together to generate synthetic data.

Also, output data from the sub-coding circuit 58 is sent to a playback RF signal generation circuit 60. The playback RF signal generation circuit 60 calculates a reflected light. More specifically, the playback RF signal generation circuit 60 calculates the shape of the pits for recording basic data as pits to the recording layer of the disk-shaped recording medium, calculates the shape of the step-like portions for recording as step-like portions formed at the recording layer, and calculates the state of the reflected light on the basis of the results of the calculations when a laser beam to be focused in a position not included in the recording layer has been irradiated to the recording layer having the pits and step-like portions formed thereon.

The results of the calculations by the playback RF signal generation circuit 60 are sent to a comparator 61; The comparator 61 makes a comparison between data read from the reflected light calculated by the playback RF signal generation circuit 60 and the additional data.

The result of the comparison by the comparator 61 is passed to a land/groove height adjuster 62. The land/groove height adjuster 62 functions herein to control the additional data. The land-groove height adjuster 62 controls, on the basis of the results of the comparison by the comparator 61, the additional data in the synthetic digital data generator 59 to correct the shape of the step-like portion in order to make data read from the reflected light calculated by the playback RF signal generation circuit 60 coincide with the additional data.

The synthetic digital data generated by the synthetic digital data generator 59 is sent to an optical pickup head 25. The optical pickup head 25 forms pits and step-like portions in the recording layer of the master disk 1a on the basis of the synthetic data supplied from the synthetic digital data generator 59.

Figure 18:
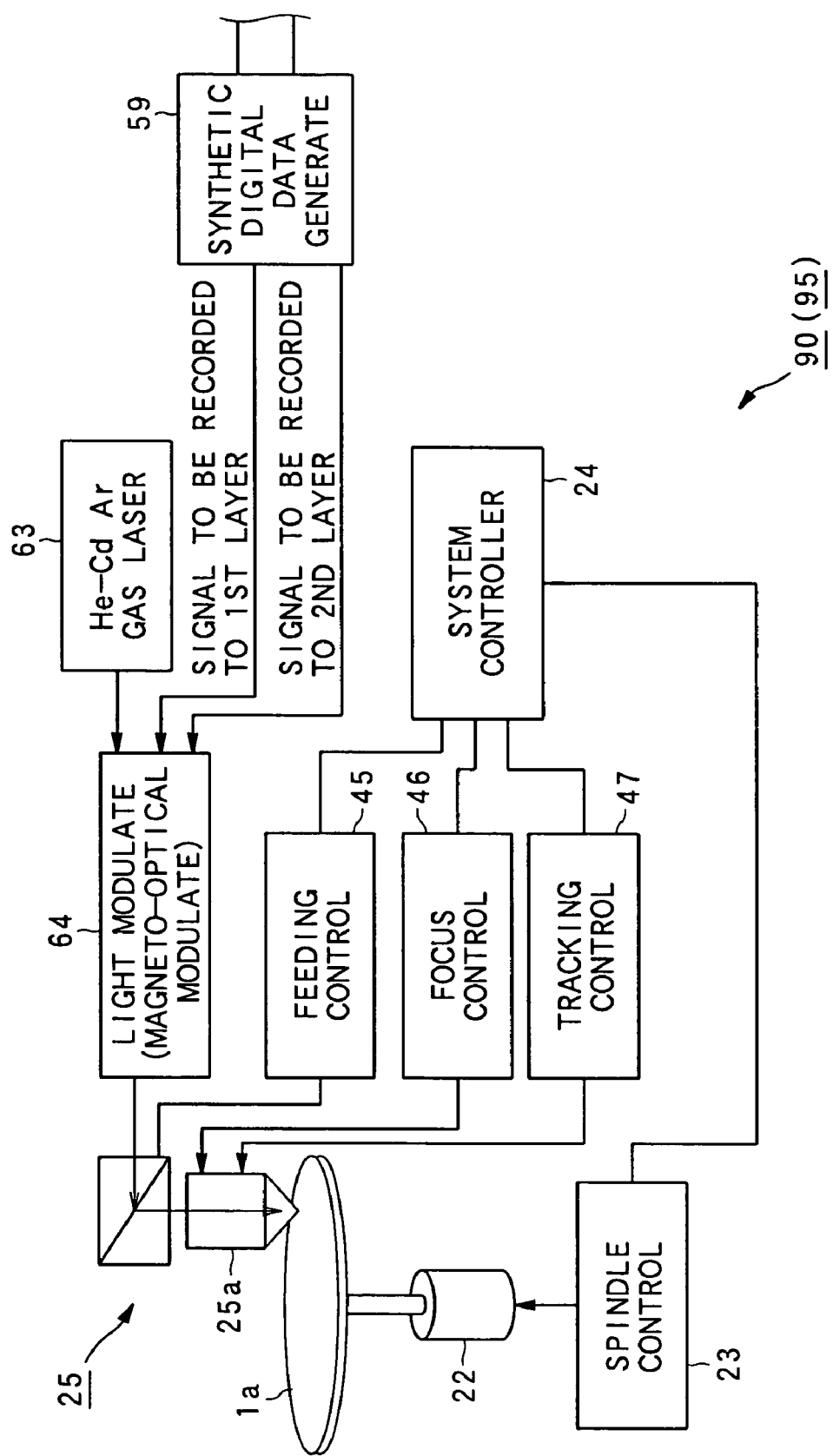
FIG. 18 is a block diagram of the substantial part of the disk-shaped recording medium production apparatus.

In the disk-shaped recording medium production apparatus 90, the optical pickup head 25 includes, as shown in FIG. 18, an external laser light emitter (for example, He—Cd or Ar gas laser) 63 and an light modulator 64. A laser beam emitted from the external laser light emitter 63 is incident upon an optical system 25a in the optical pickup head 25 through the light modulator 64 controlled based on the synthetic data, and focused onto the recording layer of the master disk 1a.

The disk-shaped recording medium production apparatus 90 includes a rotation drive 22 which holds and drives to rotate the master disk 1a. The rotation drive 22 has a spindle motor which rotates the master disk 1a, and is controlled by a system controller 24 by means of a spindle control circuit 23.

Also, the optical pickup head 25 is moved between the inner and outer circumferences of the master disk 1a by a feeding mechanism (not shown). The feeding mechanism is controlled by the system controller 24 via a feeding control circuit.

Further, the disk-shaped recording medium production apparatus 90 includes a focus control circuit 46. The focus control circuit 46 is controlled by the system controller 24 on the basis of the result of the reflected light detection by the photodetectors in the optical pickup head 25 to adjust the focus of the optical pickup head 25. The focus adjustment is intended to set the in-focus position of the laser beam emitted from the optical pickup head 25 to a predetermined position relative to the signal recording layer of the master disk 1a by moving the objective lens of the optical pickup head 25 optical-axially.

Also, the disk-shaped recording medium production apparatus 90 includes a tracking control circuit 47. The tracking control circuit 47 is controlled by the system controller 24 on the basis of the result of the reflected light detection by the photodetectors in the optical pickup head 25 to adjust the tracking of the optical pickup head 25. The tracking adjustment is intended to position the in-focus position of the laser beam emitted from the optical pickup head 25 onto the recording track on the master disk 1a by moving the objective lens of the optical pickup head 25 in a direction orthogonal to the optical axis (radially of the master disk 1a).

Note that in the production of a master disk for a two-layer disk, the playback RF signal generation circuit 60 makes the aforementioned calculations on the assumption that at least a first recording layer and second recording layer are formed stacked one on the other and the laser beam is focused in a position between the first and second recording layers. The optical pickup head 25 forms due pits and step-like portions in the first recording layer of the master disk while forming due pits and step-like portions in the second recording layer.

Embodiment of the Recorder

The recorder, generally indicated with a reference 95, can be designed to record various data to the disk-shaped recording medium 1 including the first recording layers where basic data is recorded and the second recording layer where additional data is recorded. Basically, the recorder 95 is constructed similarly to the disk-shaped recording medium 90 shown in FIG. 17.

Read information generated by a predetermined processing on the basis of basic and additional data is superior in quality to basic information generated from the basic data.

Figure 19:
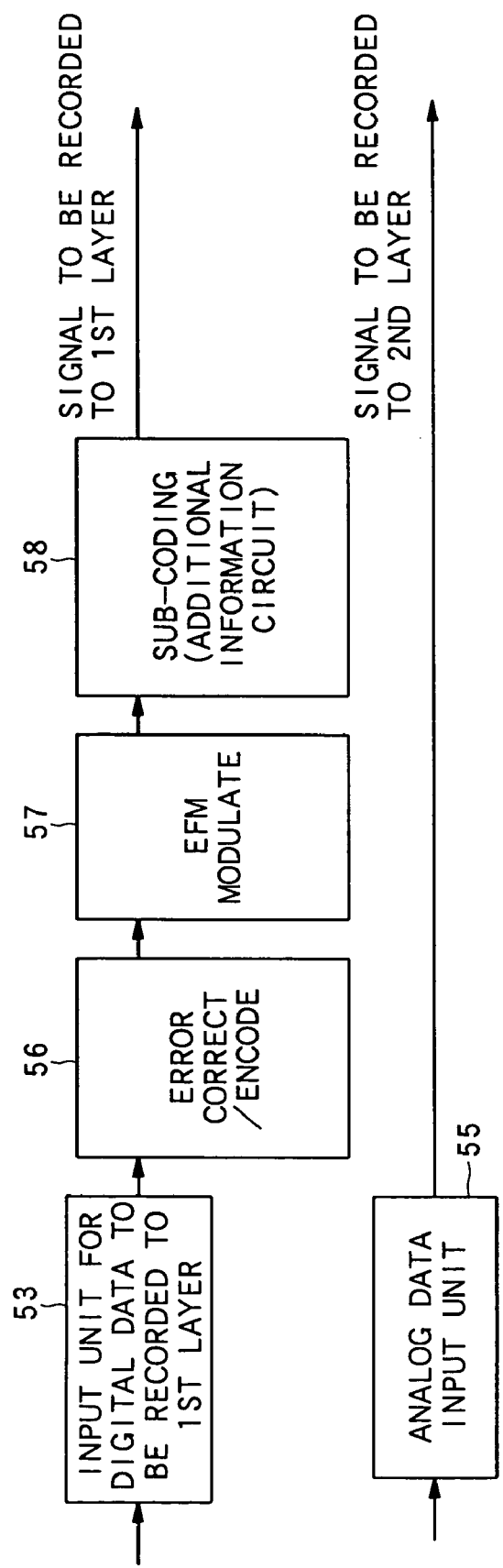
FIG. 19 is a block diagram of the recording apparatus according to the present invention.

In this recorder 95, the basic information is encoded by an input unit 53 for digital data to be recorded to the first layer as shown in FIG. 19. The input unit 53 also works as an encoding means. Also in this recorder, the additional data (to be recorded to the second layer) is supplied from outside via an analog data input unit 55.

The input unit 53 supplies the encoded basic information to an error correction/encoding circuit 56. The error correction/encoding circuit 56 corrects errors of the encoded basic information, and supplies the error-corrected encoded basic information to an EFM modulation circuit 57 where it is EFM-modulated. The EFM-modulated signal is sent to a sub-coding circuit 58. The sub-coded in the sub-coding circuit 58 is taken as basic data (signals to be recorded to the first layer).

Note that the recorder 95 may be designed to digitize the additional data (signals to be recorded to the second layer) via an encoding circuit similar to that for the basic data.

The basic data is sent to an optical pickup head 25 which works as a first recording means. The optical pickup head 25 records basic data to a first recording layer of the disk-shaped recording medium 1 by irradiating a light beam to the first recording layer. That is, the optical pickup head 25 records, along a recording track formed on the first recording layer, the basic data as digital data having a predetermined length of channel bits to the first recording layer.

Note that the optical pickup head 25 may record basic data to the first recording layer by changing the magnetized direction of the first recording layer or by forming pits on the first recording layer.

Additional data is sent to the optical pickup head 25 which also works as a second recording means. The optical pickup head 25 records the additional data to a second recording layer of the disk-shaped recording medium 1 by irradiating a light beam to the second recording layer. That is, the optical pickup head 25 records, along a recording track formed on the second recording layer, the additional data as analog data or as digital data having a predetermined length of channel bits, shorter than the channel bits of the basic data, to the second recording layer.

Note that in case the basic data is recorded as pits to the first recording layer, the optical pickup head 25 may record the additional data to the second recording layer by changing the magnetized direction of the second recording layer or by changing the transmittance of the second recording layer.

In case the additional data is recorded to the second recording layer by changing the magnetized direction of the second recording layer, the optical pickup head 25 can record the additional data as magneto-optical spots having at least two different areas to the second recording layer by adjusting the optical output thereof.

In case the basic data is recorded to the first recording layer by changing the magnetized direction of the first recording layer, the additional data should be recorded to the second recording layer by changing the transmittance of the second recording layer. In this case, the second recording layer contains an organic dye or a crystal while a bright portion (high in transmittance) and has a dark portion (low in transmittance) be formed therein correspondingly to the additional data.

First Embodiment of the Semiconductor Device

Figure 20:
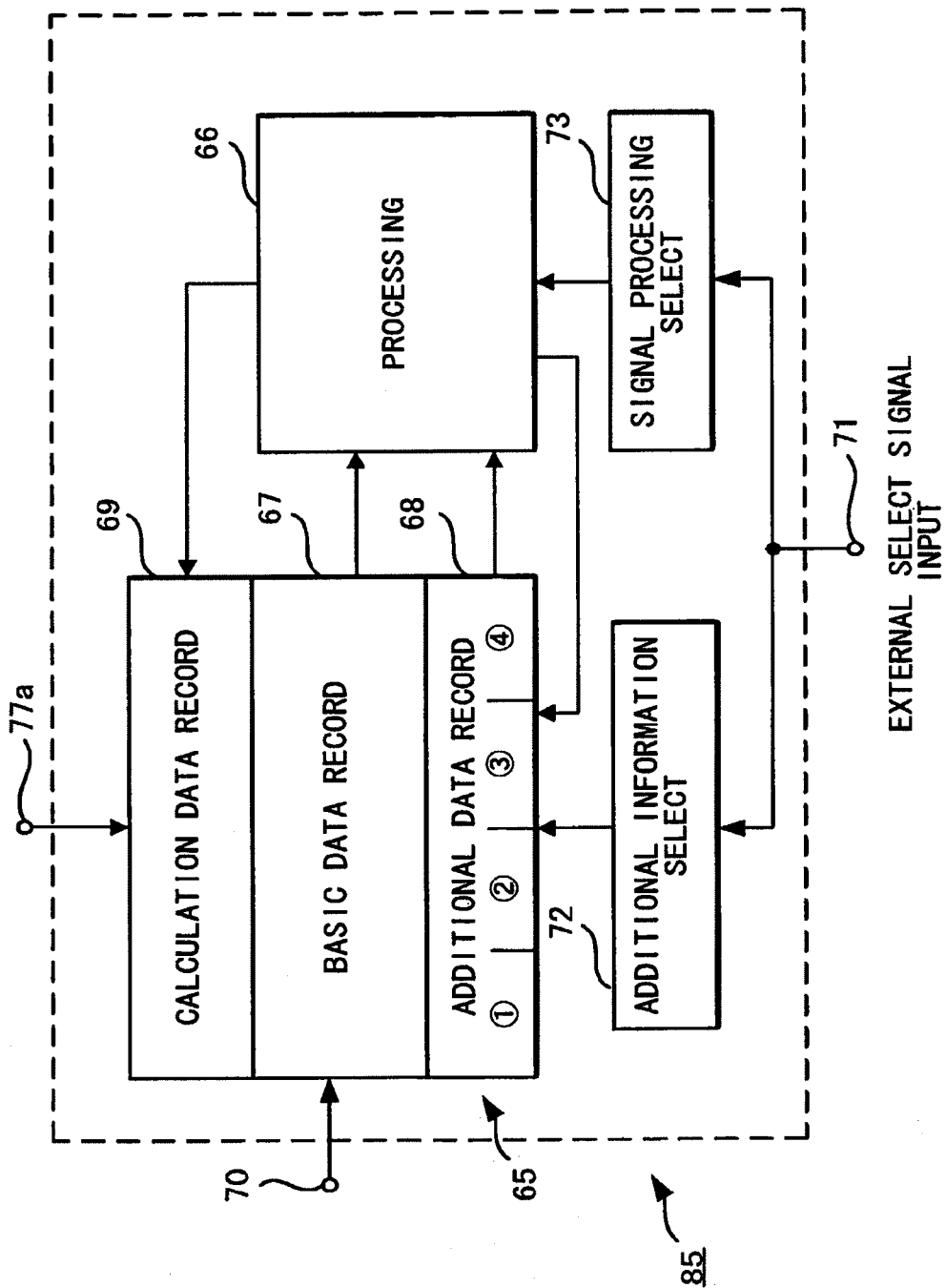
FIG. 20 is a block diagram of a first embodiment of a semiconductor device according to the present intention.

The recording medium according to the present invention may be designed as a semiconductor device. The semiconductor device, generally indicated with a reference 85, includes a data recording unit 65 and processing unit 66 as shown in FIG. 20. The data recording unit 65 consists of a plurality of data recording blocks. More specifically, the data recording unit 65 includes a basic data recording block 67 which records basic information supplied from an input unit, additional data recording block 68 having recorded therein additional data which is information to be added to the basic information, and a calculation data recording block 69 which records calculation data encoded by the processing unit 66.

In the semiconductor device 85, the basic information is supplied from the input unit 70 and recorded as basic data to the basic data recording block 67. The processing unit 66 makes a predetermined processing on the basis of the basic data and additional data recorded in the additional data recording block 68. In the processing unit 66, either the additional data or signal processing is selected under the control of an additional information selector 72 and signal processing selector 73 correspondingly to an external select signal supplied from an external select signal input unit 71.

Figure 21:
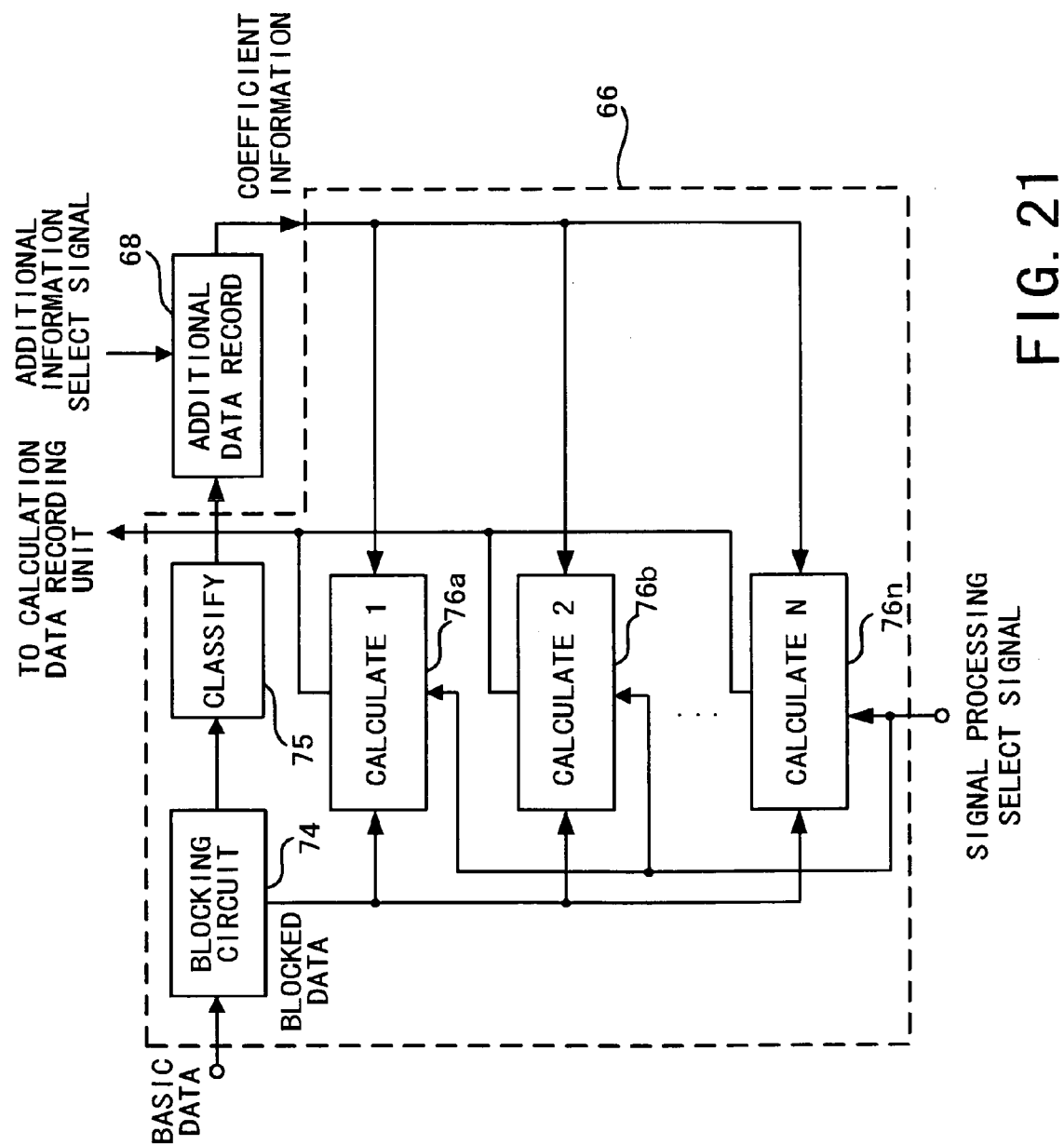
FIG. 21 is a block diagram of the substantial part of the semiconductor device.

The processing unit 66 is to make a "classification/adaptation" operation which will be described in detail later. As shown in FIG. 21, the processing unit 66 includes a blocking circuit 74 which is supplied with basic data and blocks the data. The blocked basic data output from the blocking circuit 74 is sent to a classification circuit 75 and also to first, second, . . . , and n-th calculation circuits 76a, 76b, . . . , 76n. The classification circuit 75 classifies input blocked basic data, and controls the additional data recording block 68 in the data recording unit 65 according to the result of the classification. The additional data recording block 68 sends predetermined additional data to each of the calculation circuits 76a, 76b, . . . , 76n under the control of the classification circuit 75 and also under the control, corresponding to an external select signal, of the additional information selector 72. One of the calculation circuits 76a, 76b, . . . , 76n, selected by the signal processing selector 73 correspondingly to the external select signal, calculates the supplied blocked basic data with the supplied additional data as a coefficient, and sends the result of the calculation as calculation data to the calculation data recording block 69 in the data recording unit 65.

The calculation data stored in the calculation data recording block 69 is outputted appropriately via an output unit 77a connected to the calculation data recording block 69.

That is, in the "classification/adaptation" operation, blocked basic data is classified and additional data corresponding to the class of the classified basic data is used as a coefficient. Further detail of this operation will be given later. The calculation data output from the processing unit 66 corresponds to information superior in quality to basic information.

In the semiconductor device 85, the basic information may be video information as in the aforementioned disk-shaped recording medium. In this case, the calculation data may be data having a higher resolution than the basic information or data corresponding to video information having an improved gradation. Also, the calculation data may be data corresponding to video data having less noise than the basic information. Further, the calculation data may be data corresponding to video data having an improved time resolution compared with the basic information. For example, for a higher resolution of video signal, a resolution is elected correspondingly to input information to the external select signal input unit 71. The additional data used corresponds to such functions.

Also, the processing unit 66 may be designed as a circuit to select additional data by detecting a predetermined feature of basic data. In this case, the feature of basic data detected by the processing unit 66 includes, for example, an image motion. The processing unit 66 can read a coefficient corresponding to an image motion.

The calculation data may be data corresponding to information about an oscillation by an external oscillator. Also, the calculation data may be data corresponding to information about a volume of sound reproduced by an external sound reproduction unit. Further, the calculation data may be data corresponding to information about an air blasting by an external blower. That is to say, the signal processing in the processing unit 66 may vary from one application to another.

Second Embodiment of the Semiconductor Device

Also, the semiconductor device 85 may be designed, as shown in FIG. 22, including a data recording unit 65, processing unit 66, input unit 70 at which basic data is supplied, and an output unit 77b which outputs directly calculation data resulted from an operation made in the processing unit 66. The input unit 70 may be supplied with already encoded basic data from output, and an encoding means for encoding basic information to provide basic data may be provided upstream of the input unit 70.

In this case, calculation data resulted from an operation made in the processing unit 66 is supplied to outside via the output unit 77b without being stored once in the calculation data recording block 69. That is, in the semiconductor device 85, when the calculation data is necessary, the processing unit 66 makes a calculation just before outputting the calculation data. Other operations are similar to those in the aforementioned first embodiment of the semiconductor device.

Classification/Adaptation

The "classification/adaptation" operation made in the aforementioned player 80 and semiconductor device 85 will be described. "Classification/adaptation" of video signal will be described herebelow as an example. In the following explanation, a SD (standard definition) signal corresponds to the basic data having previously been described in the explanation of the present invention, and the "classification/adaptation" operation is made to process SD signal with the use of additional data to provide an HD (high definition) superior in quality to the SD signal.

The basic data is data read recorded once in the recording medium and read from the latter. In the following explanation, coefficient data is generated by a coefficient data generation circuit. According to the present invention, however, the coefficient data is data generated in advance by the coefficient data generation circuit and recorded once as additional data. That is, the data is read from the recording medium for use as the coefficient data.

Note that also according to the present invention, basic data may be kept recorded in the recording medium, while "coefficient type data" operation which will be described in detail later may be recorded as additional data in the recording medium. For reproduction, the coefficient data may be generated from the "coefficient type data (additional data)".

Figure 23:
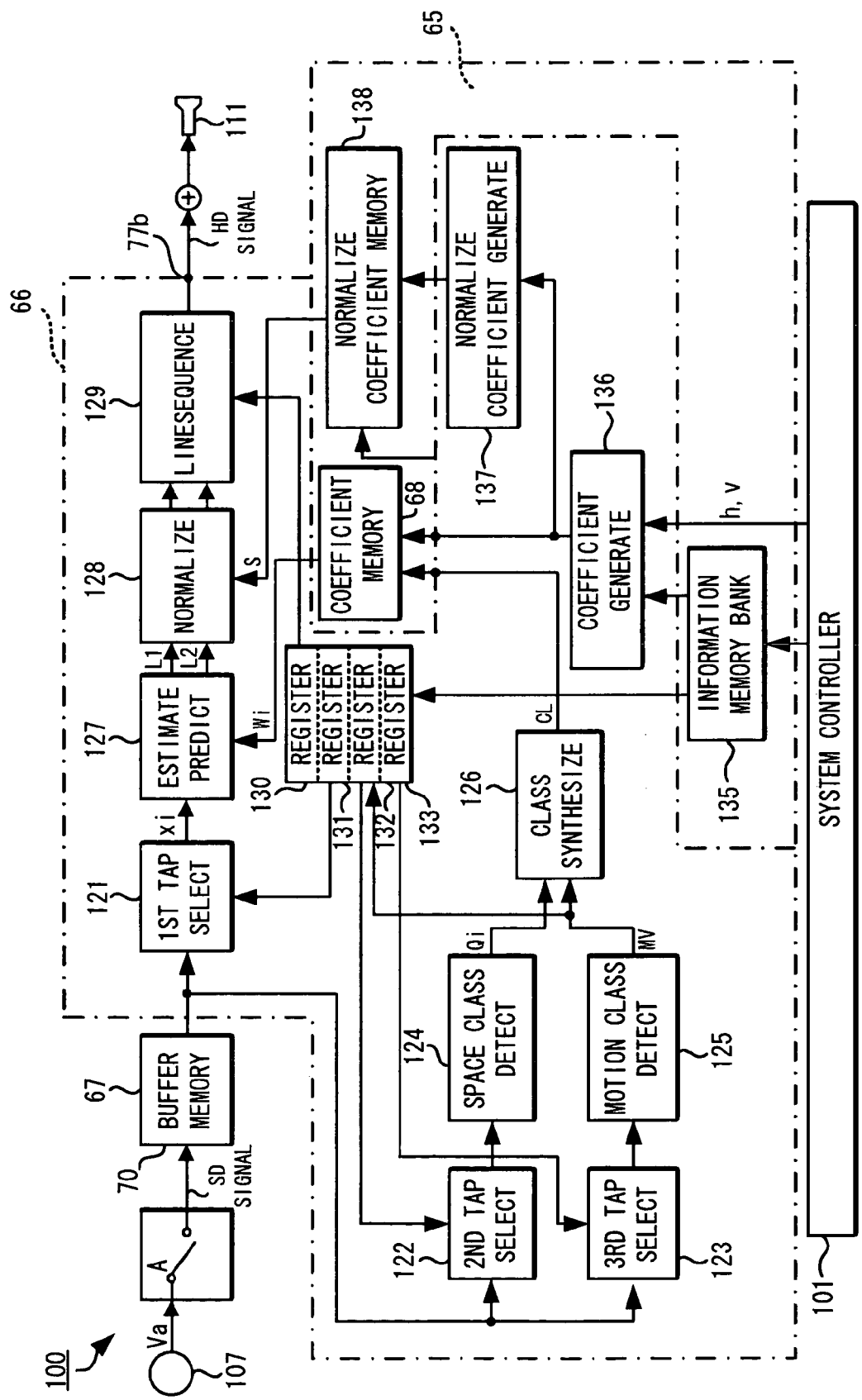
FIG. 23 is a block diagram of the playback apparatus in which classification and adaptation are effected.

The "classification/adaptation" operation will be explained concerning conversion of an SD signal into an HD signal by way of example. As shown in FIG. 23, the "classification/adaptation" operation is such that a space class and motion class are detected from pixel data in a tap corresponding to a pixel of interest of an HD signal, selectively extracted from an SD signal, to provide a class code CL indicative of the class of the pixel of interest of the HD signal, generate additional data of each class and store the additional data into a coefficient memory included in the data recording unit 65. The coefficient memory 68 corresponds to the additional data recording block 68.

Then in an estimate prediction circuit 127 which will be described in detail later, an estimate equation is used to calculate pixel data of the pixel of interest of the HD signal from data xi in the tap corresponding to the pixel of interest of the HD signal, selectively extracted from the SD signal in the tap selection circuit 121, and additional data Wi read by a class code CL from the coefficient memory 68. It should be noted that coefficient type data of each class is stored in the memory bank 135.

The "classification/adaptation" operation will be explained herebelow with reference to the accompanying drawings. The player, generally indicated with a reference 100, which makes a "classification/adaptation" operation is supplied with a 525i signal as an SD (standard definition) signal, as basic data, read from the recording medium, converts the 525i signal into a 525p or 1050i signal as an HD (high definition) signal, and displays an image formed from the 525p or 1050i signal, as shown in FIG. 23.

Note that the 525i signal is an interlaced video signal with 525 lines, 525p signal is a progressive (non-interlaced) video signal with 525 lines and 1050i signal is an interlaced video signal with 1050 lines.

The player 100 includes a microcomputer and a system controller 101 which controls the system operation.

In addition, the player 100 includes an input unit 107 at which an SD signal Va (525i signal) is supplied, and a buffer memory 67 equivalent to the basic data recording block 67 and which is supplied with the SD signal Va via the input unit 70 and provisionally holds the SD signal Va. Further, the player 100 includes a processing unit 66 which converts the SD signal (525i signal) buffered in the buffer memory 67 into an HD signal (525p or 1050i signal), and a display unit 111 which displays an image formed from the HD signal provided from the processing unit 66 via the output unit 77b. The display unit 111 is a CRT (cathode ray tube) or a flat-panel display such as LCD (liquid crystal display).

The SD signal (525i signal) supplied at the input unit 107 is stored and provisionally stored in the buffer memory 67. The SD signal provisionally stored in the buffer memory 67 is supplied to the processing unit 66 where it will be converted into an HD signal (525p or 1050i signal). That is, in the processing unit 66, there is provided pixel data forming the HD signal (will be referred to as "HD pixel data" hereunder) is produced from pixel data forming the SD signal (will be referred to as "SD pixel data" hereunder). The HD signal output from the processing unit 66 is supplied to the display unit 111 which will display an image formed from the HD signal on the screen thereof.

Next, the processing unit 66 will be described in detail with reference to FIG. 23. As shown, the processing unit 66 includes first to third tap selection circuits 121 to 123 which selectively extract and output data on a plurality of SD pixels positioned around a pixel of interest associated with the HD signal. (1050i or 525p signal) from SD signal (525i signal) stored in the buffer memory 67.

The first tap selection circuit 121 is to selectively extract data on an SD pixel intended to be used for prediction (will be referred to as "prediction tap"). The second tap selection circuit 122 is to selectively extract data on an SD pixel intended to be used for a classification corresponding to a level distribution pattern of the SD pixel data (will be referred to as "space class tap"). The third tap selection circuit 123 is to selectively extract data on an SD pixel intended to be used for a classification corresponding to a motion (will be referred to as "motion class tap").

Note that in case a space class is determined using SD pixel data belonging to a plurality of fields, the space class will also include motion information.

Figure 24:
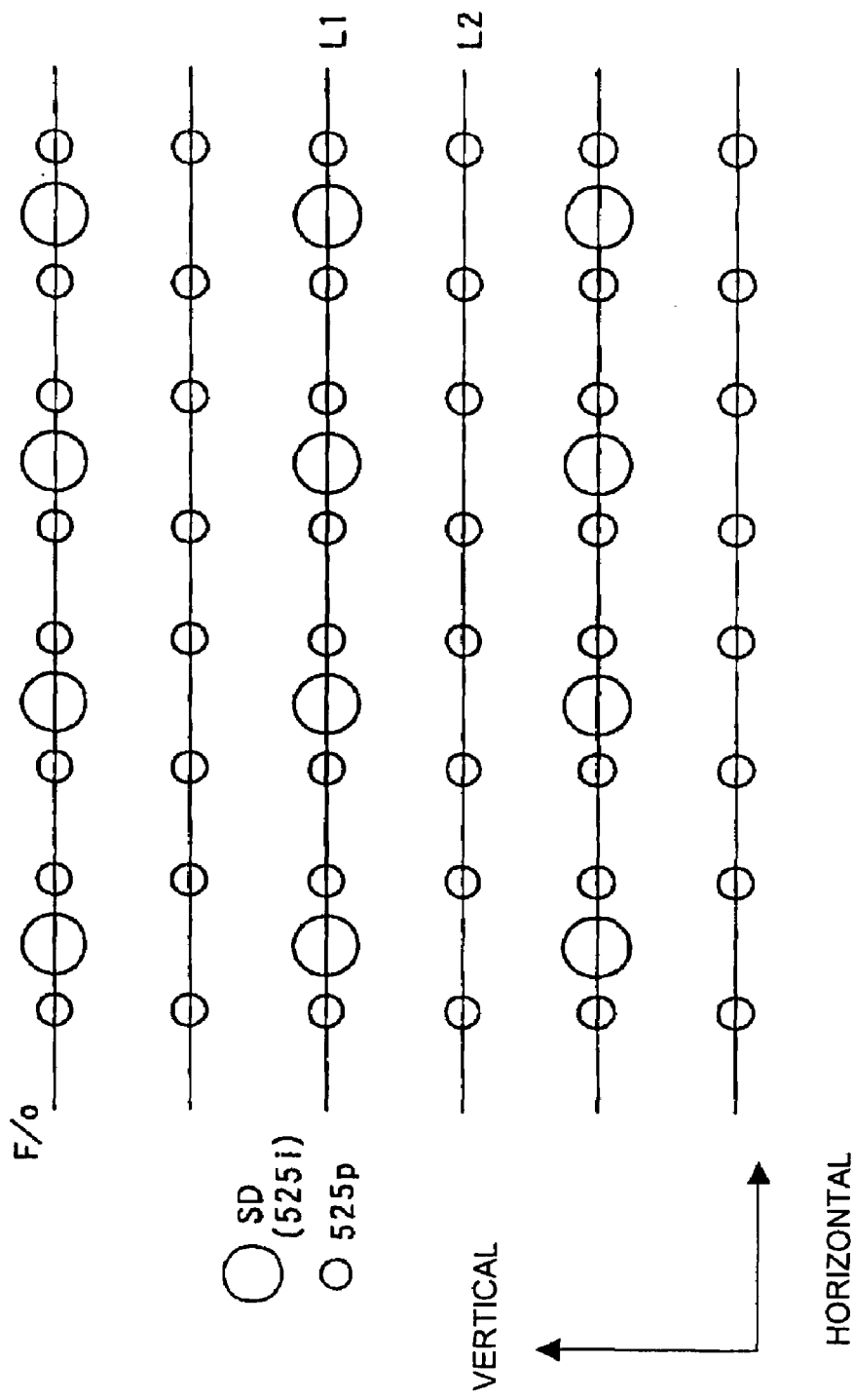
FIG. 24 explains the relation in pixel position between 525i and 525p signals.

FIG. 24 shows a relation in pixel position between the 525i and 525p signals in odd-numbered fields (o) of a frame (F). In FIG. 24, the large dot indicates a pixel of the 525i signal, while the small dot indicates a pixel of the 525p signal. In even-numbered fields (e), the line of the 525i signal is shifted 0.5 line. As seen from FIG. 24, the pixel data of the 525p signal includes line data L1 in the same position as the line of the 525i signal and line data L2 in the intermediate position between upper and lower lines of the 525i signal. Also, the number of pixels in each line of the 525p signal is double that in each line of the 525i signal.

Figure 25:
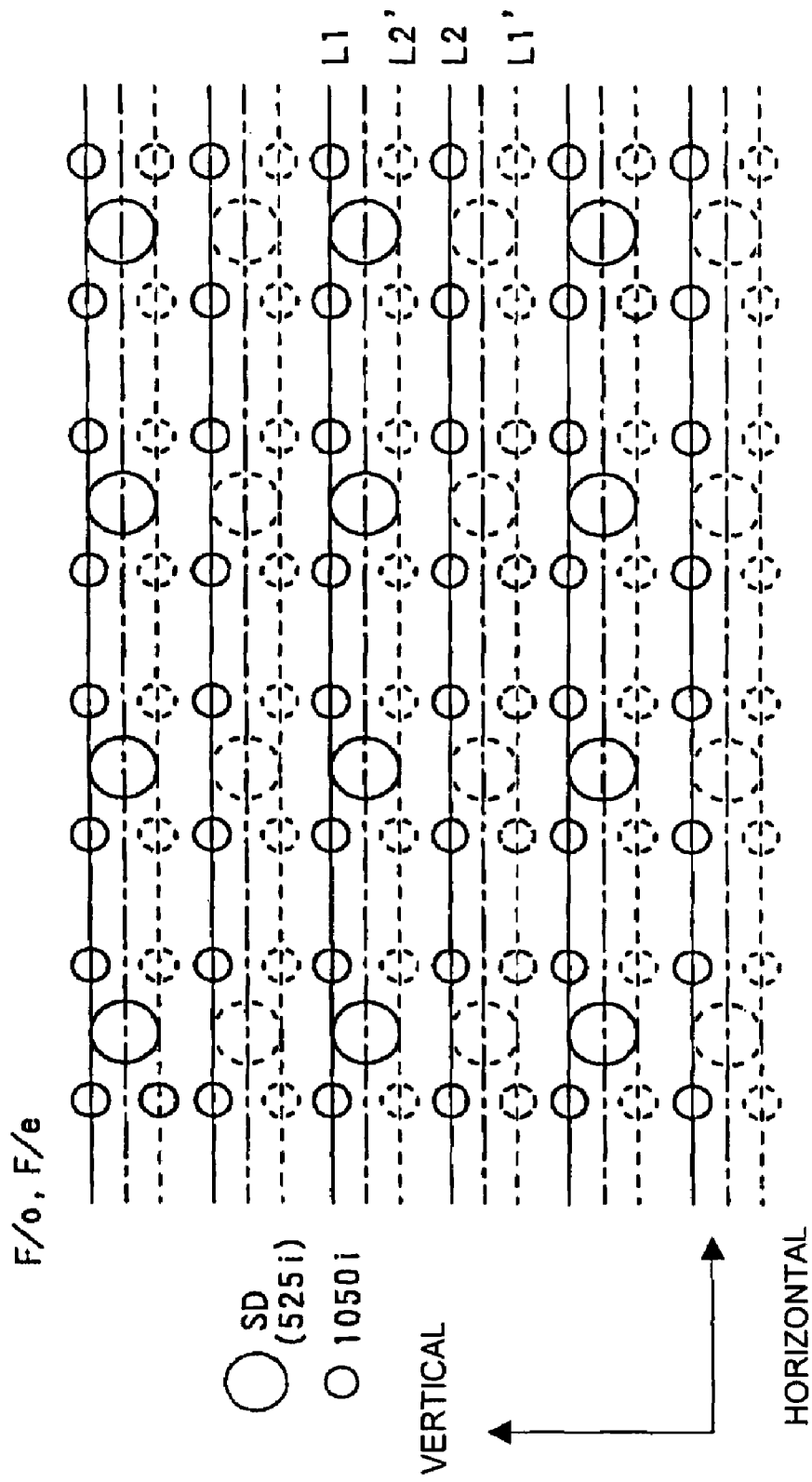
FIG. 25 explains the relation in pixel position between 525i and 1050i signals.

FIG. 25 shows a relation in pixel position in a frame (F) between the 525i and 1050i signals. In FIG. 25, the pixel position in an odd-numbered field (o) is indicated with a solid line, while the pixel position in an even-numbered field (e) is indicated with a broken line. The large dots indicate pixels of 525i signal, while the small dots indicate pixels of 1050i signal output. As seen from FIG. 25, the pixel data of the 1050i signal includes line data L1 and L1' in positions near the line of the 525i signal and line data L2 and L2' in positions far from the line of the 525i signal. Note that the line data L1 and L2 are those in odd-numbered fields, while the line data L1' and L2' are those in even-numbered fields. Also, the number of pixels in each line of the 1050i signal is double that in each line of the 525i signal.

Figure 26:
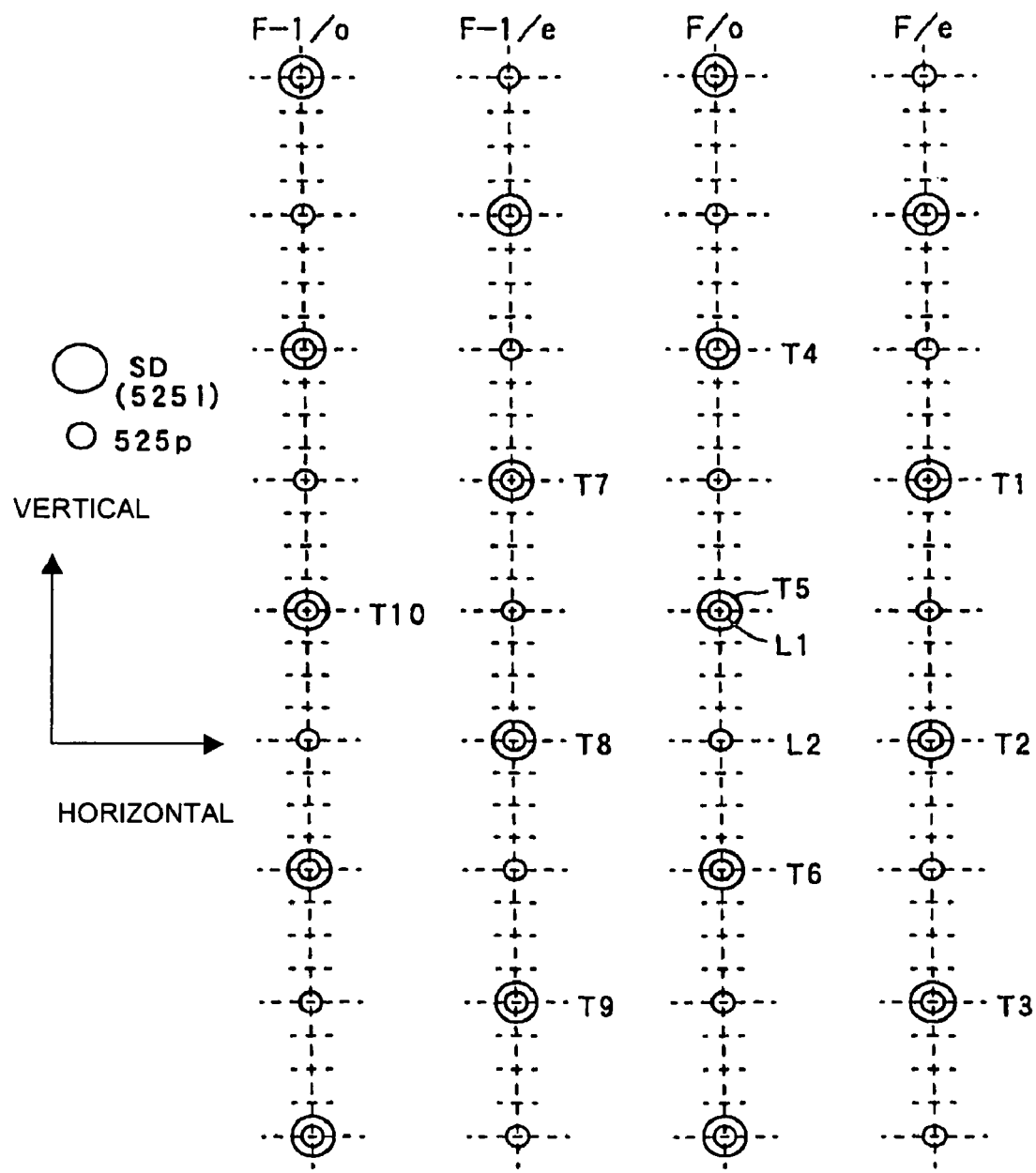
FIG. 26 shows the relation in pixel position between 525i and 525p signals and an example of prediction tap.
Figure 27:
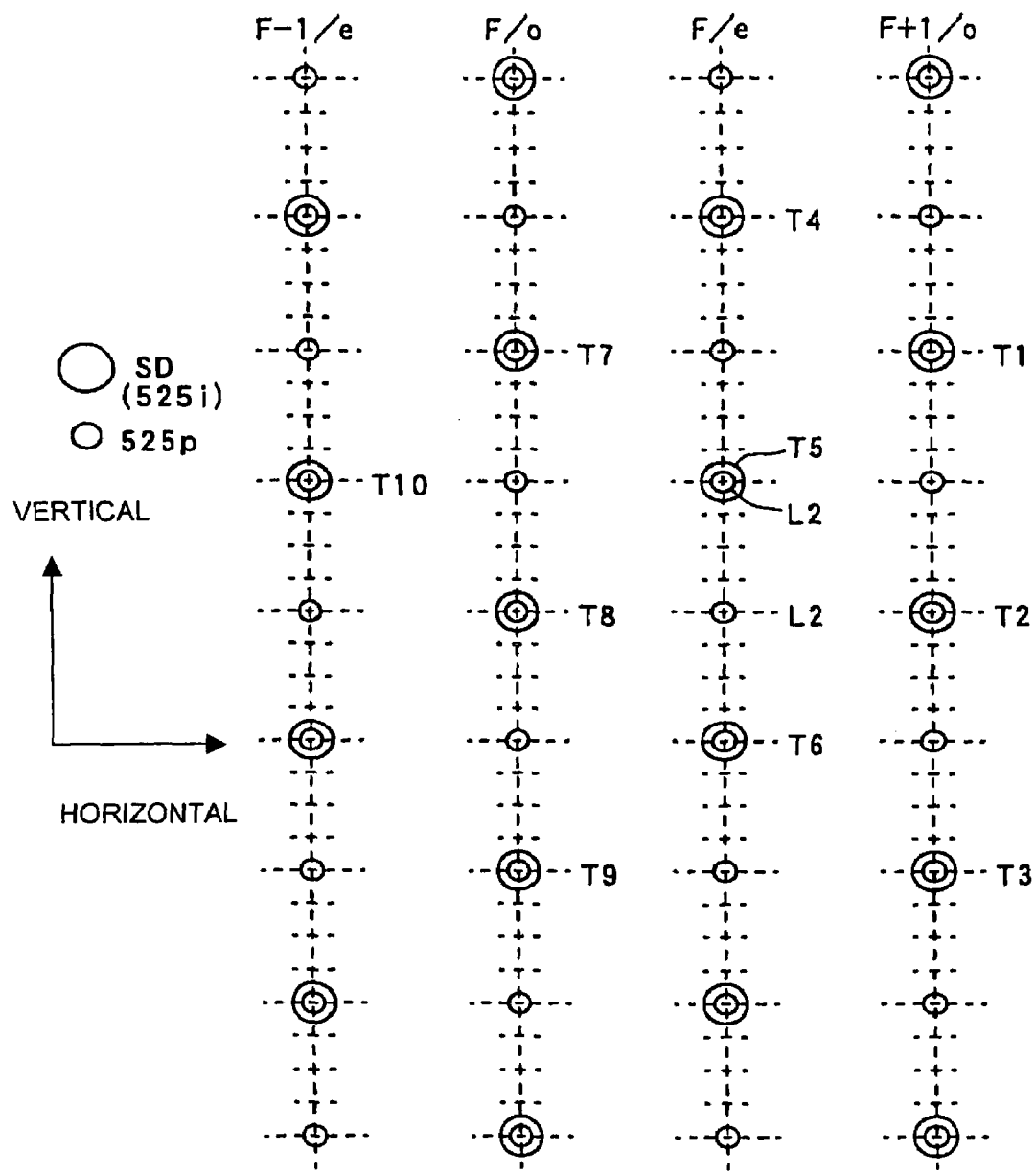
FIG. 27 shows the relation in pixel position between 525i and 525p signals and an example of prediction tap.

FIGS. 26 and 27 show actual examples of prediction taps (SD pixels) selected by the first tap selection circuit 121 when a 525i signal is converted into a 525p signal. FIGS. 26 and 27 also show a relation in vertical pixel position among odd- and even-numbered fields (o and e) of temporally successive frames F−1, F and F+1.

As shown in FIG. 26, prediction taps for prediction of line data L1 and L2 of a field F/o are SD pixels T1, T2 and T3 included in a next field F/e and existent in positions spatially near pixels of a 525p signal to be produced (pixel of interest), SD pixels T4, T5 and T6 included in a field F/o and existent in positions spatially near pixels of the 525p signal to be produced, SD pixels T7, T8 and T9 included in a further preceding field F−1/e and existent in positions spatially near pixels of the 525p signal to be produced, and an SD pixel T10 included in a preceding field F−1/o and existent in a position spatially near pixels of the 525p signal to be produced.

As shown in FIG. 27, prediction taps for prediction of line data L1 and L2 of the field F/e are SD pixels T1, T2 and T3 included in the next field F+1/o and existent in positions spatially near pixels of a 525p signal to be produced, SD pixels T4, T5 and T6 included in the field F/e and existent in positions spatially near pixels of the 525p signal to be produced, SD pixels T7, T8 and T9 included in the preceding field F/o and existent in positions spatially near pixels of the 525p signal to be produced, and an SD pixel T10 included in the further preceding field F−1/e and existent in a position spatially near pixels of the 525p signal to be produced.

Note that such an arrangement may be done that the SD pixel T9 will not be selected as the prediction tap for prediction of the line data L1 while the SD pixel T4 will not be selected as the prediction tap for prediction of the line data L2.

Figure 28:
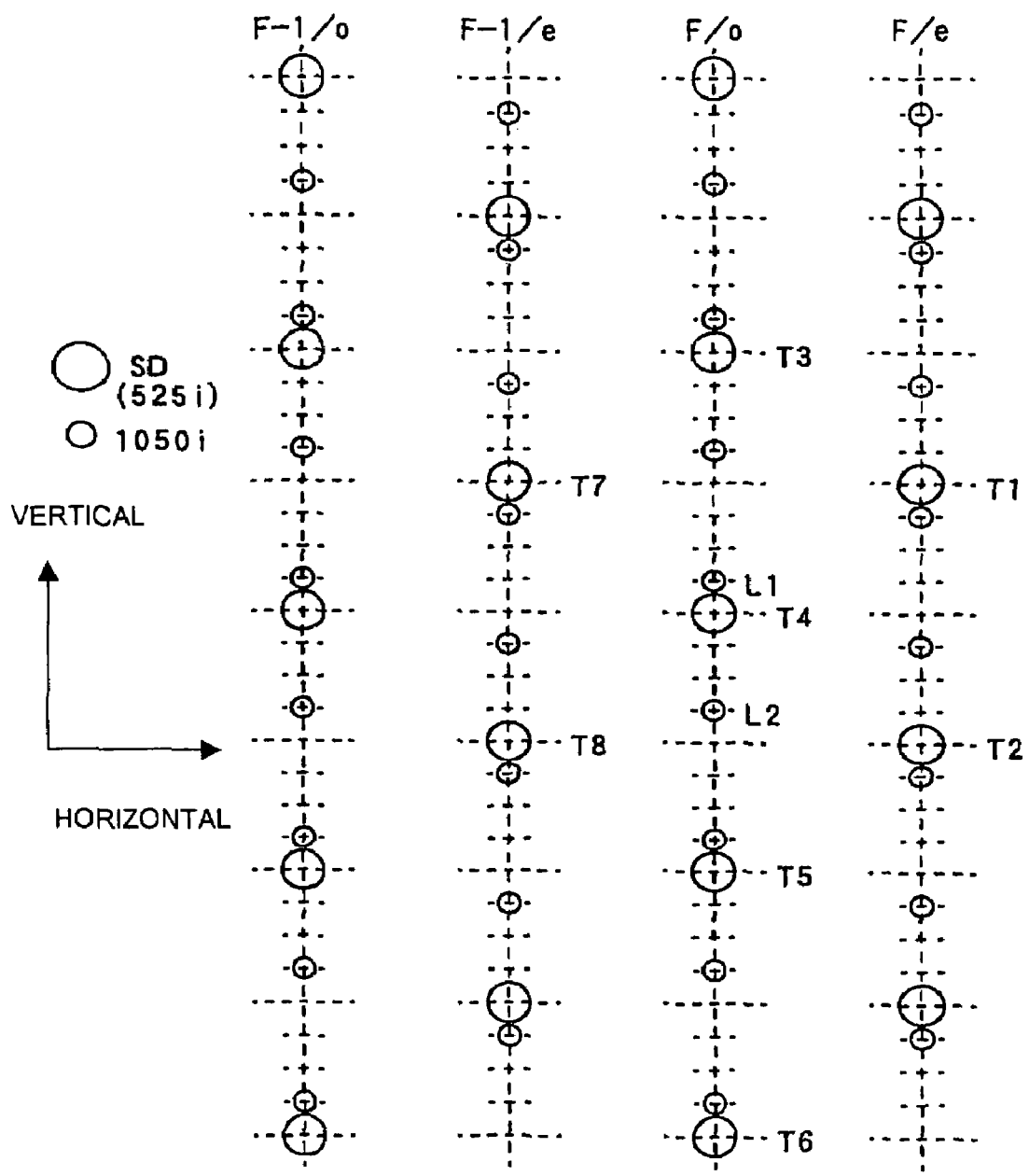
FIG. 28 shows the relation in pixel position between 525i and 1050i signals and an example of prediction tap.
Figure 29:
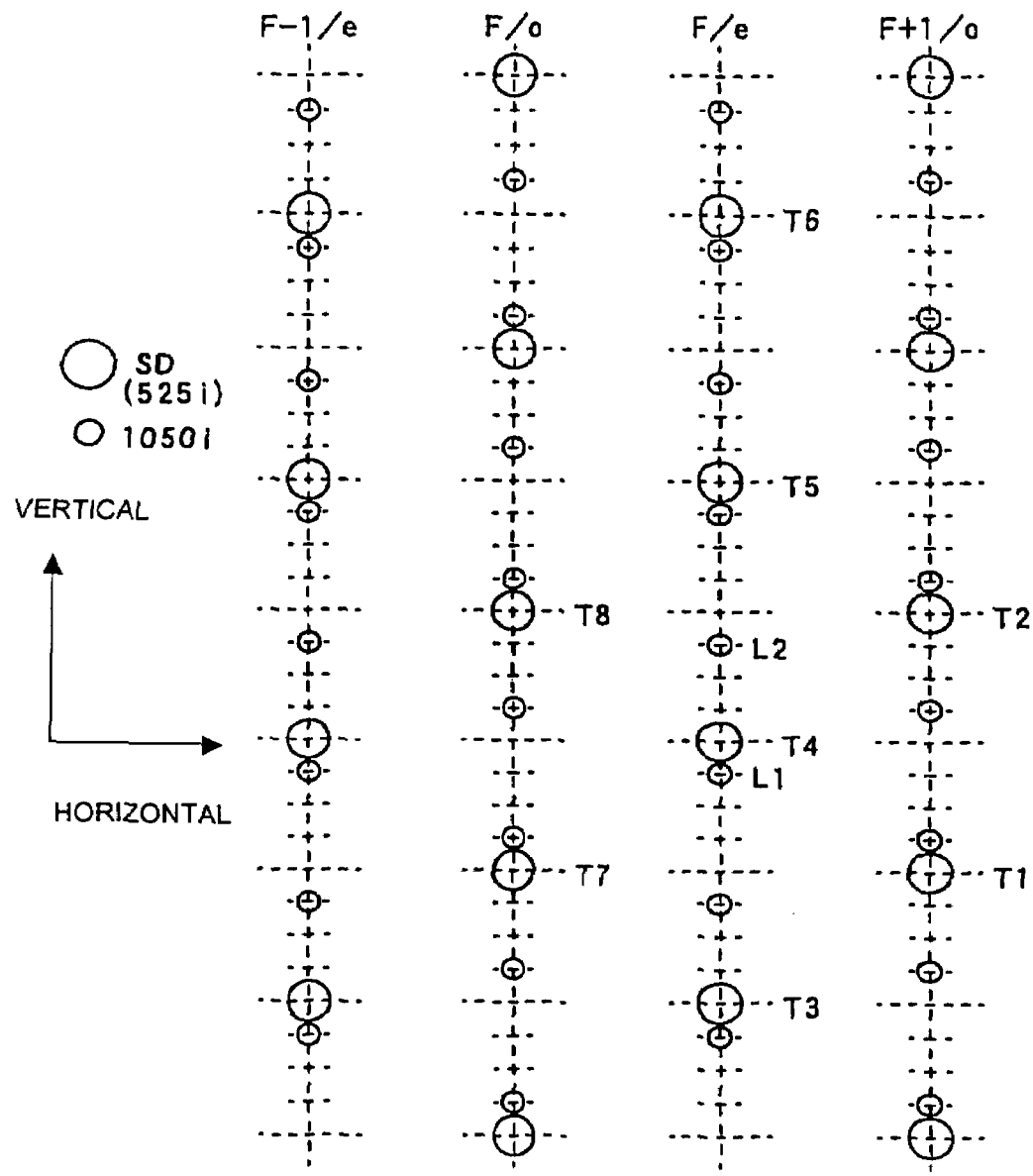
FIG. 29 shows the relation in pixel position between 525i and 1050i signals and an example of prediction tap.

FIGS. 28 and 29 show actual examples of prediction taps (SD pixels) selected by the first tap selection circuit 121 when a 525i signal is converted into a 1050i signal. FIGS. 28 and 29 also show a relation in vertical pixel position among odd- and even-numbered fields (o and e) of temporally successive frames F−1, F and F+1.

As shown in FIG. 28, prediction taps for prediction of line data L1 and L2 of the field F/o are SD pixels T1 and T2 included in the next field F/e and existent in positions spatially near pixels of a 1050i signal to be produced (pixel of interest), SD pixels T3, T4, T5 and T6 included in the field F/o and existent in positions spatially near pixels of the 525p signal to be produced, and SD pixels T7 and T8 included in the preceding field F−1/e and existent in positions spatially near pixels of the 1050i signal to be produced.

As shown in FIG. 29, prediction taps for prediction of line data L1' and L2' of the field F/e are SD pixels T1 and T2 included in a next field F+1/e and existent in positions spatially near pixels of a 1050i signal to be produced, SD pixels T3, T4, T5 and T6 included in the field F/e and existent in positions spatially near pixels of the 1050i signal to be produced, and SD pixels T7 and T8 included in the preceding field F/o and existent in positions spatially near pixels of the 525p signal to be produced.

Note that such an arrangement may be done that the SD pixel T6 will not be selected as the prediction tap for prediction of the line data L1 and L1' while the SD pixel T3 will not be selected as the prediction tap for prediction of the line data L2 and L2'.

Further, as shown in FIGS. 26 to 29, such an arrangement may be done that in addition to the SD pixels existent in the same positions in a plurality of fields, the multiple fields one or more horizontal SD pixels will be selected as the prediction taps.

Figure 30:
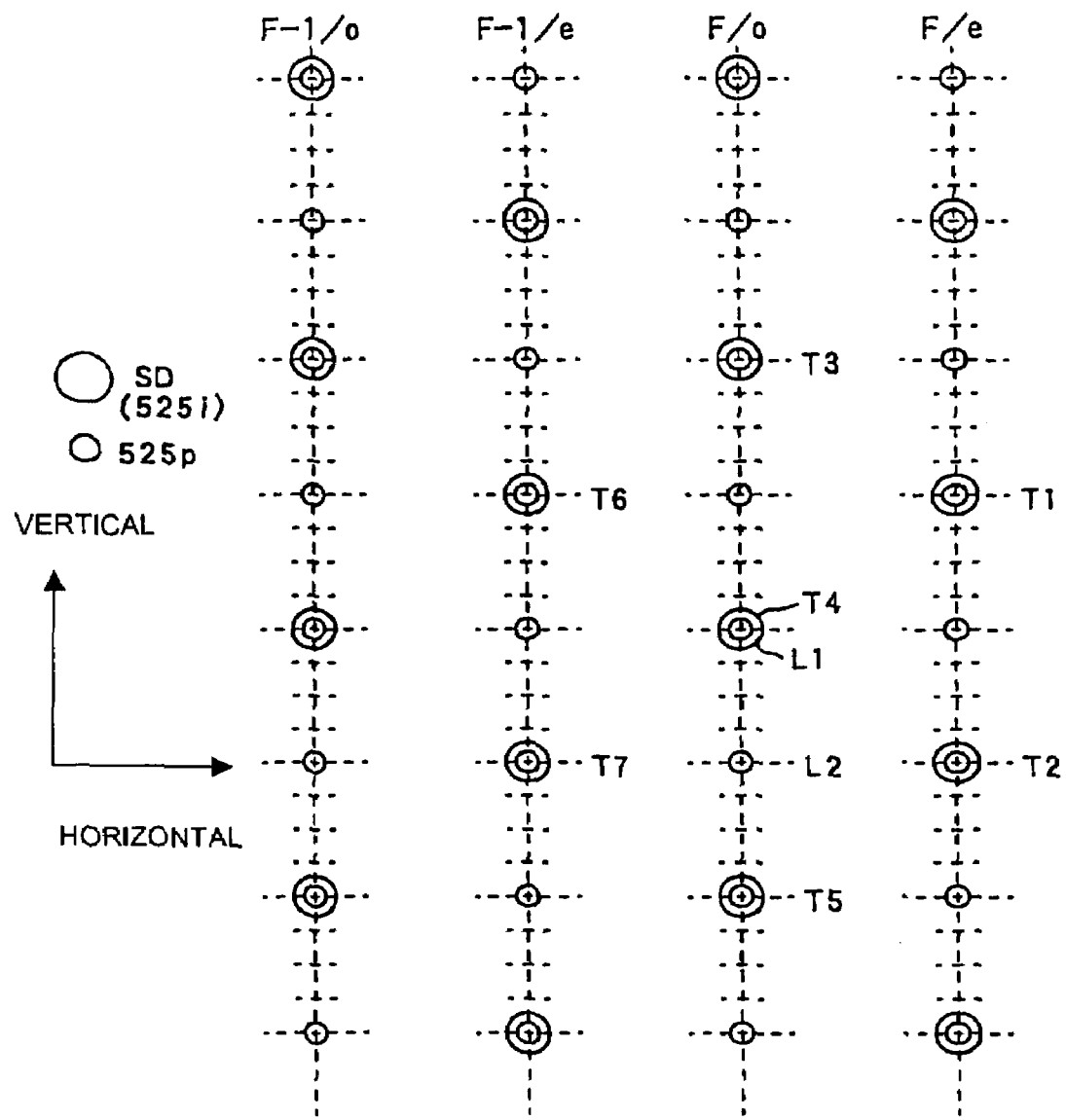
FIG. 30 shows the relation in pixel position between 525i and 525p signals and an example of space class tap.
Figure 31:
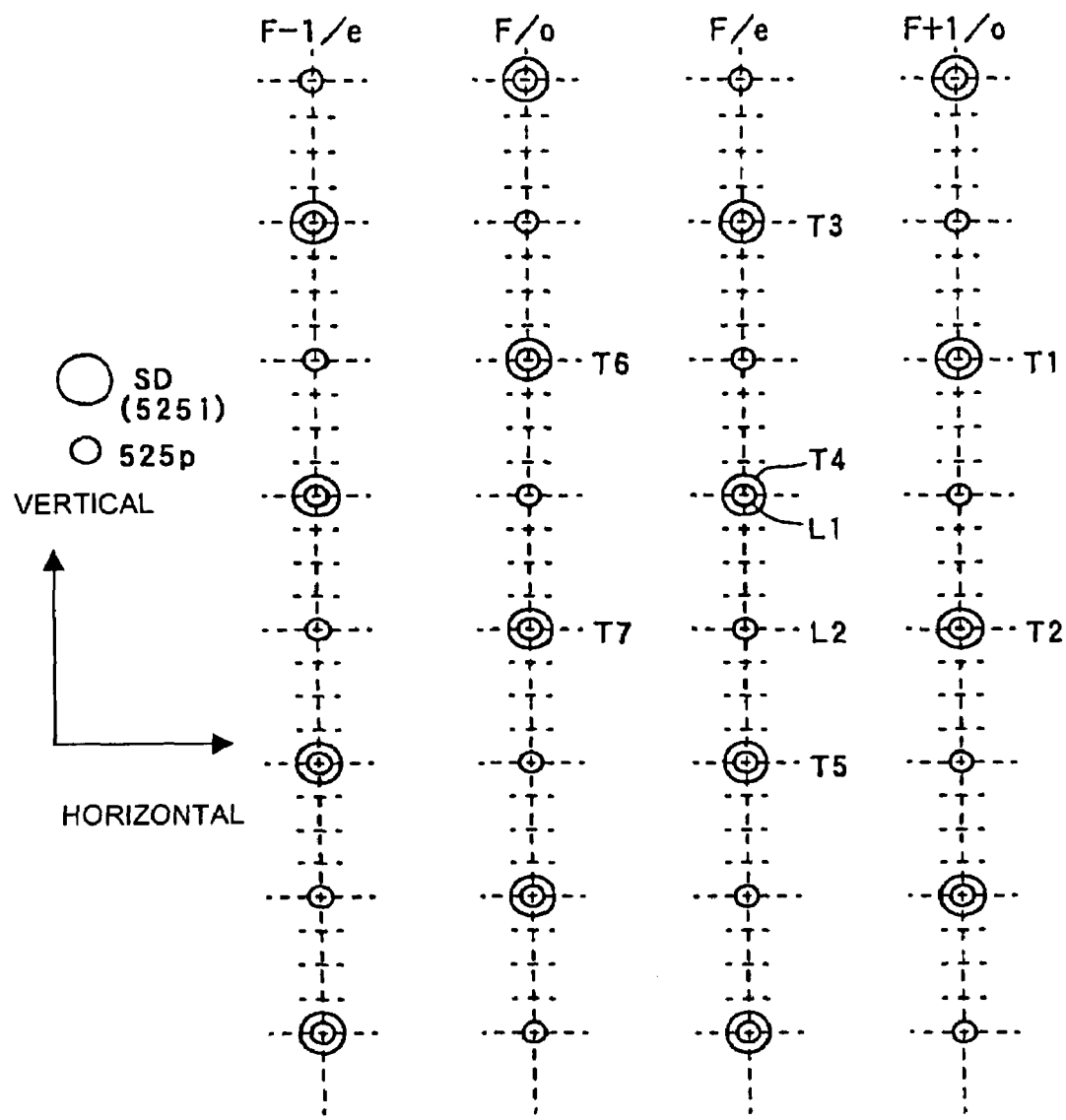
FIG. 31 shows the relation in pixel position between 525i and 525p signals and an example of space class tap.

FIGS. 30 and 31 show actual examples of space class taps (SD pixels) selected by the second tap selection circuit 122 when a 525i signal is converted into a 525p signal. FIGS. 30 and 31 also show a relation in vertical pixel position among odd- and even-numbered fields (o and e) of temporally successive frames F−1, F and F+1.

As shown in FIG. 30, space class taps for prediction of line data L1 and L2 of the field F/o are SD pixels T1 and T2 included in a next field F/e and existent in positions spatially near pixels of a 525p signal to be produced (pixel of interest), SD pixels T3, T4 and T5 included in the field F/o and existent in positions spatially near pixels of the 525p signal to be produced, and SD pixels T6 and T7 included in a preceding field F−1/e and existent in positions spatially near pixels of the 525p signal to be produced.

As shown in FIG. 31, space class taps for prediction of line data L1 and L2 of the field F/e are SD pixels T1 and T2 included in a next field F+1/o and existent in positions spatially near pixels of a 525p signal to be produced, SD pixels T3. T4 and T5 included in the field F/e and existent in positions spatially near pixels of the 525p signal to be produced, and SD pixels T6 and T7 included in the preceding field F/o and existent in positions spatially near pixels of the 525p signal to be produced.

Note that such an arrangement may be done that the SD pixel T7 will not be selected as the space class tap for prediction of the line data L1 while the SD pixel T6 will not be selected as the space class tap for prediction of the line data L2.

Figure 32:
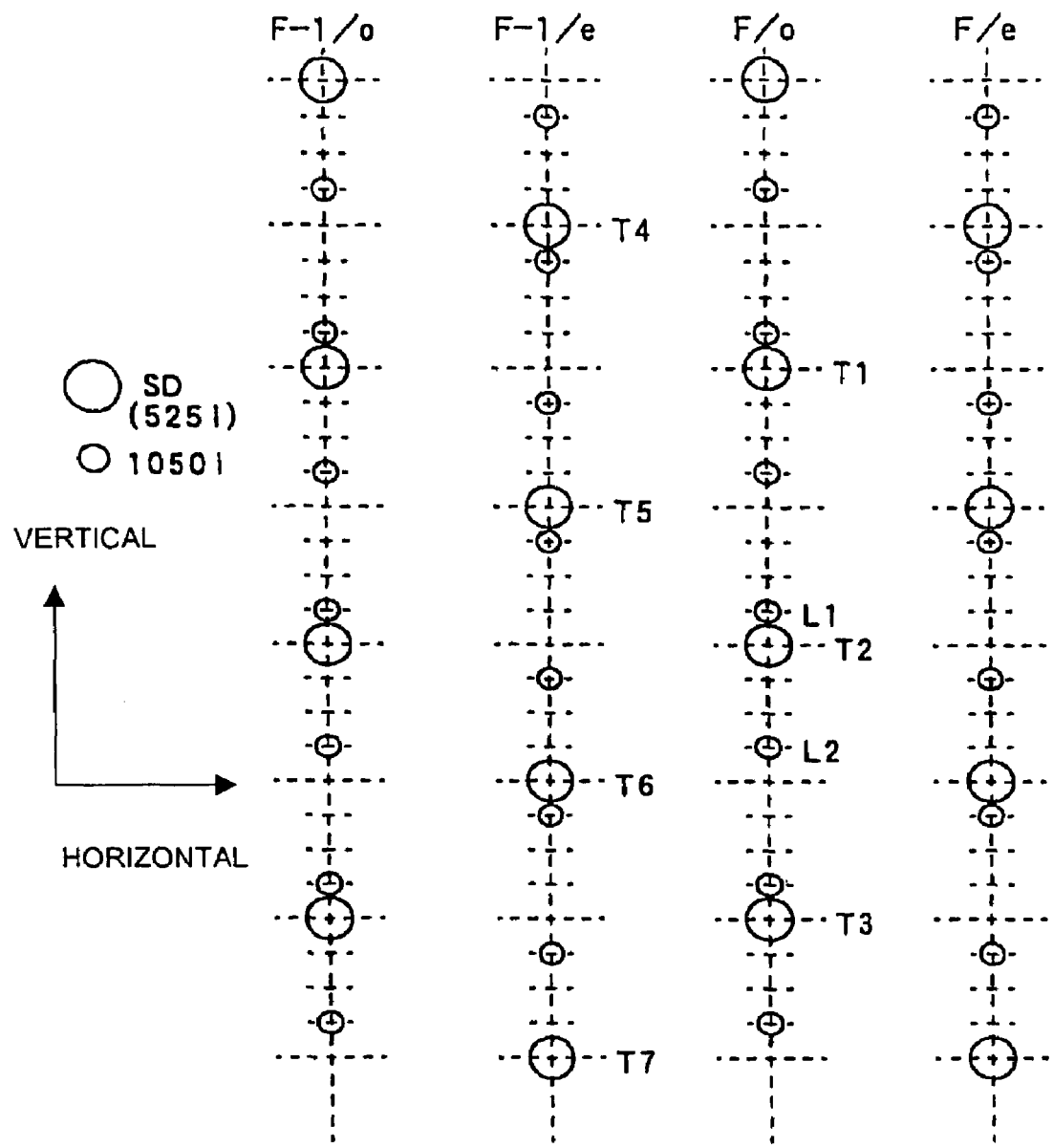
FIG. 32 shows the relation in pixel position between 525i and 1050i signals and an example of space class tap.
Figure 33:
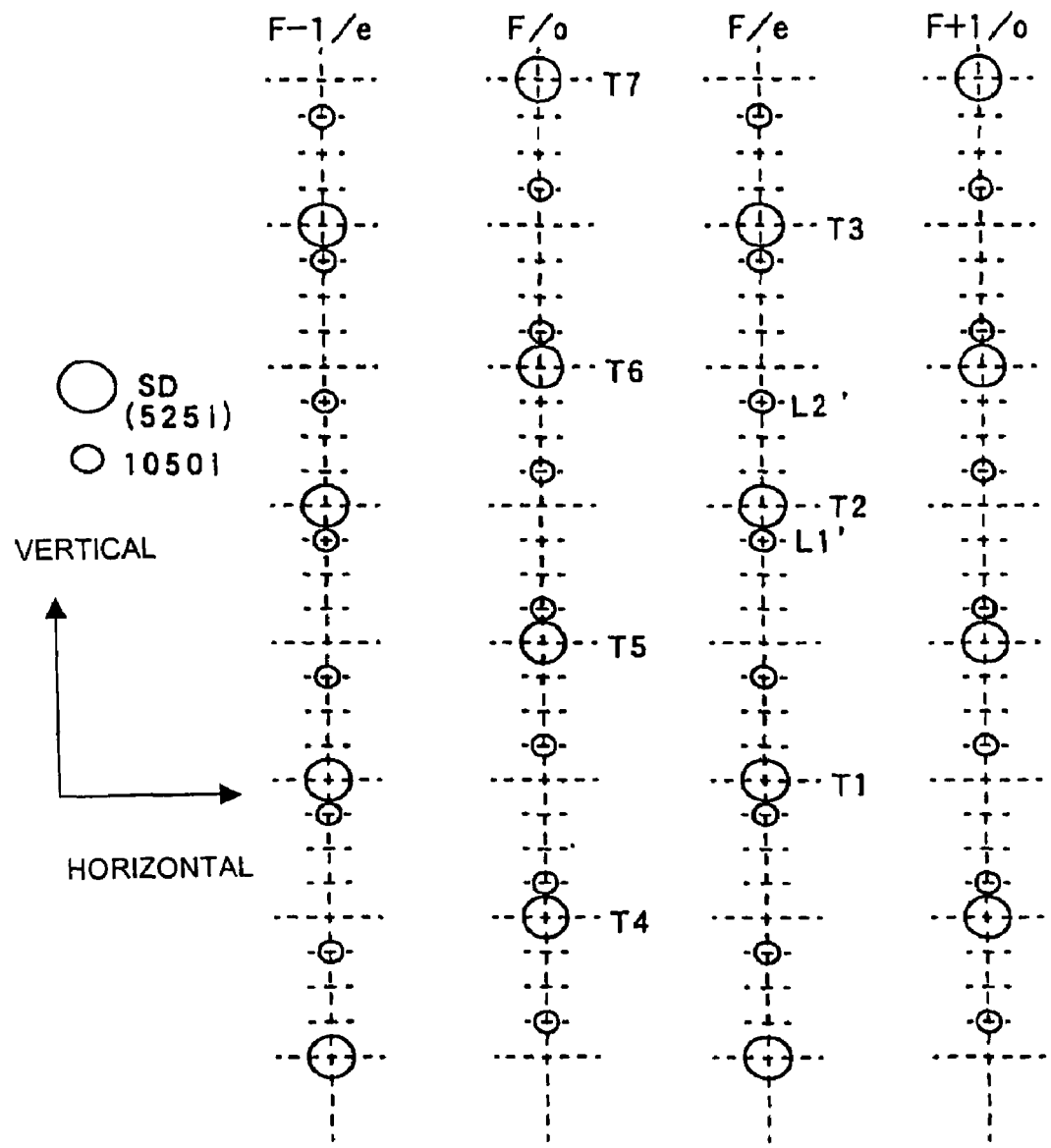
FIG. 33 shows the relation in pixel position between 525i and 1050i signals and an example of space class tap.

FIGS. 32 and 33 show actual examples of space class taps (SD pixels) selected by the second tap selection circuit 122 when a 525i signal is converted into a 1050i signal. FIGS. 32 and 33 also show a relation in vertical pixel position among odd- and even-numbered fields (o and e) of temporally successive frames F−1, F and F+1.

As shown in FIG. 32, space class taps for prediction of line data L1 and L2 of the field F/o are SD pixels T1, T2 and T3 included in the next field F/e and existent in positions spatially near pixels of a 1050i signal to be produced (pixel of interest), SD pixels T4, T5, T6 and T7 included in the preceding field F−1/e existent in positions spatially near pixels of the 1050i signal to be produced.

As shown in FIG. 33, space class taps for prediction of line data L1' and L2' of the field F/c are SD pixels T1, T2 and T3 included in the field F/e and existent in positions spatially near pixels of a 1050i signal to be produced, SD pixels T4, T5, T6 and T7 included in the preceding field F/o existent in positions spatially near pixels of the 1050i signal to be produced.

Note that such an arrangement may be done that the SD pixel T7 will not be selected as the space class tap for prediction of the line data L1 and L1' while the SD pixel T4 will not be selected as the space class tap for prediction of the line data L2 and L2'.

Further, as shown in FIGS. 30 to 33, such an arrangement may be done that in addition to the SD pixels existent in the same positions in a plurality of fields, the multiple fields one or more horizontal SD pixels will be selected as the space class taps.

Figure 34:
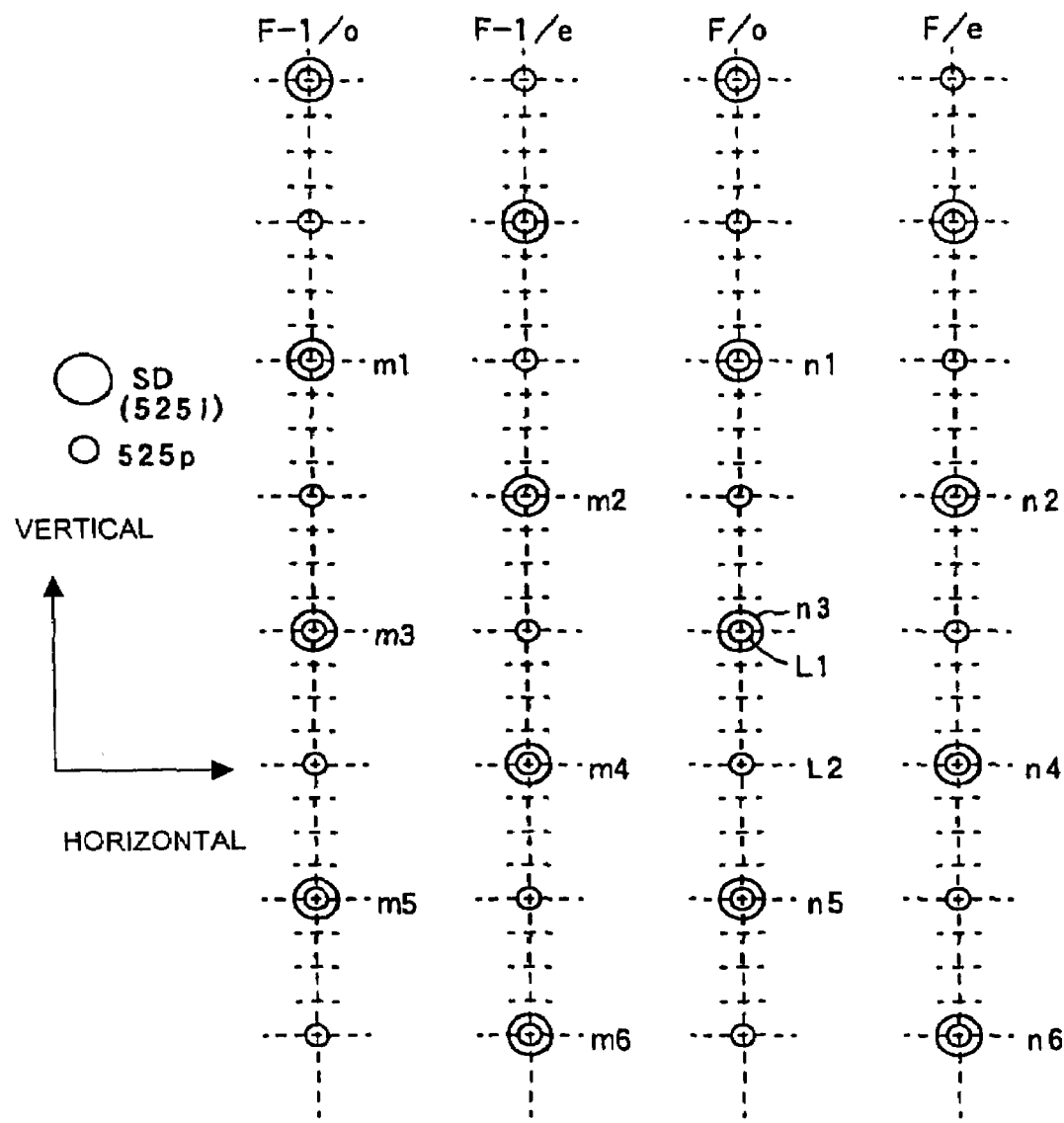
FIG. 34 shows the relation in pixel position between 525i and 525p signals and an example of motion class tap.

FIG. 34 shows an actual example of motion class taps (SD pixels) selected by the third tap selection circuit 123 when a 525i signal is converted into a 525p signal. FIG. 34 also shows a relation in vertical pixel position among odd- and even-numbered fields (o and e) of temporally successive frames F−1 and F. As shown in FIG. 34, motion class taps for prediction of line data L1 and L2 of the field F/o are SD pixels n2, n4 and n6 included in a next field F/e and existent in positions spatially near pixels of a 525p signal to be produced (pixel of interest), SD pixels n1, n3 and n5 included in the field F/o and existent in positions spatially near pixels of the 525p signal to be produced, SD pixels m2, m4 and m6 included in a preceding field F−1/e and existent in positions spatially near pixels of the 525p signal to be produced, and SD pixels m1, m3 and m5 included in a further preceding field F−1/o and existent in positions spatially near pixels of the 525p signal to be produced. The vertical positions of the SD pixels n1 to n6 coincide with those of the SD pixels m1 to m6.

Figure 35:
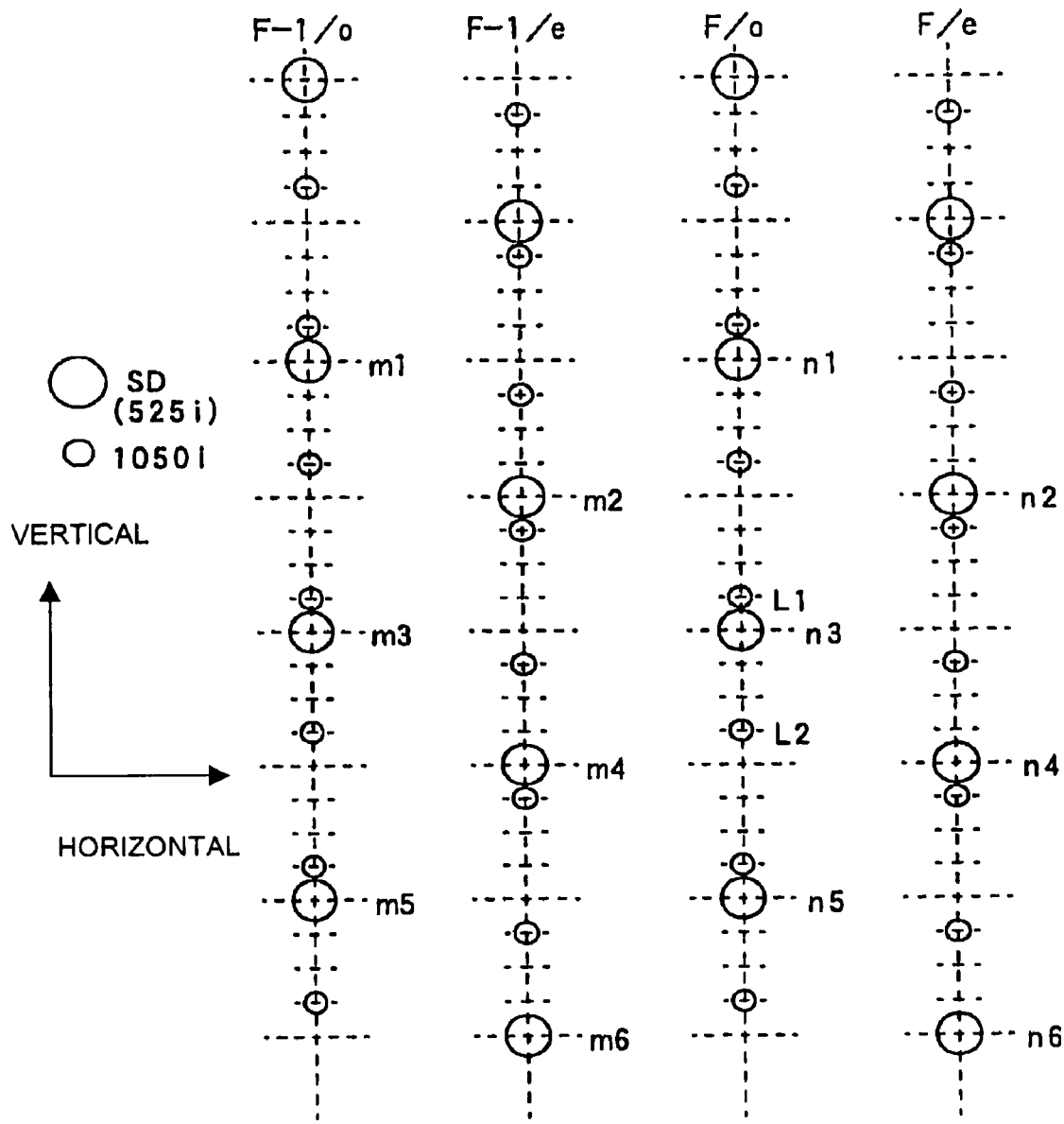
FIG. 35 shows the relation in pixel position between 525i and 525p signals and an example of motion class tap.

FIG. 35 shows an actual example of motion class taps (SD pixels) selected by the third tap selection circuit 123 when a 525i signal is converted into a 1050i signal. FIG. 35 also shows a relation in vertical pixel position among odd- and even-numbered fields (o and e) of temporally successive frames F−1 and F. As shown in FIG. 35, motion class taps for prediction of line data L1 and L2 of the field F/o are SD pixels n2, n4 and n6 included in the next field F/e and existent in positions spatially near pixels of a 1050i signal to be produced, SD pixels n1, n3 and n5 included in the field F/o and existent in positions spatially near pixels of the 1050i signal to be produced, SD pixels m2, m4 and m6 included in the preceding field F−1/e and existent in positions spatially near pixels of the 1050i signal to be produced, and SD pixels m1, m3 and m5 included in the further preceding field F−1/o and existent in positions spatially near pixels of the 1050i signal to be produced. The vertical positions of the SD pixels n1 to n6 coincide with those of the SD pixels m1 to m6.

Explanation will be made with reference to FIG. 23 again. As shown, the processing unit 66 includes also a space class detection circuit 124 which detects a level distribution pattern of data (SD pixel data) in the space class tap selectively extracted by the second tap selection circuit 122, detects a space class on the basis of the level distribution pattern and provides information about the class as an output.

The space class detection circuit 124 makes such a calculation as compresses each SD pixel data from 8 bits to 2 bits. The space class detection circuit 124 provides, as an output, the compressed data corresponding to each SD pixel data as class information about the space class. According to this embodiment, the data compression is attained using "ADRC (adaptive dynamic range coding)". The data may be compressed using any of techniques such as "DPCM (predictive coding)", "VQ (vector quantization)", etc. in addition to the "ADRC" technique.

The "ADRC" technique is inherently an adaptive re-quantization developed for the purpose of a high-performance encoding for VTR (video tape recorder) but since it enables to efficiently represent a local pattern of a signal level by a short word length, it is suitably usable in the aforementioned data compression. In case the "ADRC" technique is used, it is assumed that a maximum value of data in a space class tap (SD pixel data) is MAX, a minimum value of the data is MIN, dynamic range of the data is DR (=MAX MIN+1) and number of bits to re-quantized is P. In this case, a re-quantized code Qi as compressed data for each SD pixel data ki as data in the space class tap is calculated using the following equation (1):

$$Qi=[(kj\ MIN+0.5).\ 2P/DR] \quad (1)$$

where "[ ]" means a truncation, and i=1 to Na when there are a number Na of SD pixel data as the space class tap data.

In addition, the processing unit 66 includes a motion class detection circuit 125 which detects a motion class representing mainly an extent of a motion from data (SD pixel data) in a motion class tap selectively extracted by the third tap selection circuit 123 and provides information about the class as an output.

In the motion class detection circuit 125, inter-frame differences are calculated from data (SD pixel data) mi and ni in motion class taps selectively extracted by the third tap selection circuit 123, and then a mean value of absolute values of the differences is compared with a threshold to detect a motion class which is an index of motion. That is the motion class detection circuit 125 calculates an mean value AV of the difference absolute values by the following equation (2):

$$AV = \frac{\sum_{i=1}^{Nb} |mi - ni|}{Nb} \quad (2)$$

where Nb is 6 when the twelve SD pixel data m1 to m6 and n1 to n6 are extracted as above, for example, in the third tape selection circuit 123.

Then in the motion class detection circuit 125, the above calculated mean value AV is compared with one or more thresholds to provide class information MV about the motion class. For example, in case there are prepared three thresholds th1, th2 and th3 (th1<th2<th3) and four motion classes are to be detected, MV=0 when AV th1, MV=1 when th1<AV th2, MV=2 when th2<AV th3, and MV=3 when th3<AV.

The processing unit 66 includes also a class synthesis circuit 126 which produces, based on a re-quantized code Qi as class information about a space class provided as an output from the space class detection circuit 124 and class information MV about a motion class provided as an output from the motion class detection circuit 125, a class code CL indicating a class to which a pixel (pixel of interest) of an HD signal (525p or 1050i signal) belongs.

The class synthesis circuit 126 calculates a class code CL by the following equation (3):

$$CL = \sum_{i=1}^{Na} qi(2^P)^i + MV \cdot 2^{P Na} \quad (3)$$

where Na is a number of data (SD pixel data) in a space class tap and P is a number of re-quantized bits in the "ADRC" technique.

The processing unit 66 includes also registers 130 to 133, coefficient memory 68 and a line sequencing circuit 129 which will further be described later. The line sequencing circuit 129 has to make a selection between its own operations depending upon which it provides, a 525p signal or 1050i signal. The register 130 is provided to store motion designation information for designating a motion of the line sequencing circuit 129. The line sequencing circuit 129 functions according to operation designation information supplied from the register 130.

The register 131 is provided to store tap position information in a prediction tap selected by the first tap selection circuit 121. The first tap selection circuit 121 selects a prediction tap according to tap position information supplied from the register 131. The tap position information is used to number a plurality of possible selectable SD pixels for designating a number for an SD pixel to be selected. This is also true for subsequent tap information.

The register 132 stores space class position information in a space class tap selected by the second tap selection circuit 122. The second tap selection circuit 122 selects a space class tap according to tap position information supplied from the register 132.

Note that the register 132 is provided to store tap position information A when there is a relatively small motion and tap position information B when there is a relatively large motion. It depends upon the class information MV about a motion class provided as an output from the motion class detection circuit 125 which is to be supplied to the second tap selection circuit 122, the tap position information A or B.

More specifically, when MV=0 or MV=1 because there is no motion or there is a motion but it is small, respectively, the tap position information A is supplied to the second tap selection circuit 122. A space class tap selected by the second tap selection circuit 122 is spread over a plurality of fields as shown in FIGS. 30 to 33. Also, when MV=2 or MV=3 because there is a relatively large motion, the tap position information B is supplied to the second tap selection circuit 122. A space class tap selected by the second tap selection circuit 122 is not illustrated here but it is assumed that the tap is for only SD pixels existing in a field where a pixel to be produced exists.

Note that such an arrangement may be made that the above-mentioned register 131 stores tap position information when there is a relatively small motion and tap position information when there is a relatively large motion and that tap position information supplied to the first tap selection circuit 121 is selected according to class information MV about a motion class supplied from the motion class detection circuit 125.

The register 133 is provided to store motion class position information in a motion class tap selected by the third tap selection circuit 123. The third tap selection circuit 123 selects a motion class tap according to tap position information supplied from the register 133.

Further, the coefficient memory 68 stores, for each class, additional data on an estimate equation used in the estimate prediction circuit 127. The additional data is information for conversion of 525i signal as SD signal into 525p or 1050i signal as HD signal.

The coefficient memory 68 is supplied with a class code CL from the aforementioned class synthesis circuit 126 as read address information. Additional data corresponding to a class code CL will be read from the coefficient memory 68 and supplied to the estimate prediction circuit 127.

The processing unit 66 includes also an information memory bank 135. This information memory bank 135 has prestored therein operation designation information which is to be stored into the register 130 and tap position information which is to be stored into the registers 131 to 133.

Also, the information memory bank 135 has prestored therein, as operation designation information to be stored into the register 130, first operation designation information for causing the line sequencing circuit 129 to provide 525p signal as an output and second operation designation information for causing the line sequencing circuit 129 to provide 1050i signal as an output.

Also, the information memory bank 135 has prestored therein first tap position information corresponding to a first method of conversion (of 525i signal into 525p signal) and second tap position information corresponding to a second method of conversion (of 525i signal into 1050i signal), each as tap position information in a prediction tap and which is to be stored into the register 131. The information memory bank 135 loads either the first or second tap position information into the register 131 according to information for selecting either of the above-mentioned methods of conversion.

Also, the information memory bank 135 has prestored therein first tap position information corresponding to a first method of conversion (of 525i signal into 525p signal) and second tap position information corresponding to a second method of conversion (of 525i signal into 1050i signal), each as tap position information in a space class tap and which is to be stored into the register 132. It should be noted that each of the first and second tap position information consists of tap position information when there is a relatively small motion and tap position information when there is a relatively large motion. The information memory bank 135 loads either the first or second tap position information into the register 132 according to information for selecting either of the above-mentioned methods of conversion.

Also, the information memory bank 135 has prestored therein first tap position information corresponding to a first method of conversion (of 525i signal into 525p signal) and second tap position information corresponding to a second method of conversion (of 525i signal into 1050i signal), each as tap position information in a motion class tap and which is to be stored into the register 133. The information memory bank 135 loads either the first or second tap position information into the register 133 according to information for selecting either of the above-mentioned methods of conversion.

Also, the information memory bank 135 has prestored therein coefficient type data on each class corresponding to each of the first and second methods of conversion. The coefficient type data is additional data on a generation formula for generation of additional data which is to be stored into the aforementioned coefficient memory 68.

In the estimate prediction circuit 127, HD pixel data y is calculated from prediction tap data xi (SD pixel data) and additional data Wi read from the coefficient memory 68 with the use of the following estimate equation (4):

$$y = \sum_{i=1}^{n} Wi \cdot xi \tag{4}$$

where n is 10 when the first tap selection circuit 121 selects ten prediction taps as shown in FIGS. 24 and 27.

Then, additional data Wi (i=1 to n) in the estimate equation is supplied from outside or generated using a generation formula including preset parameters h and v as shown in the following equation (5):

$$\begin{aligned} W_1 &= w_{10} + w_{11}v + w_{12}h + w_{13}v^2 + w_{14}vh + w_{15}h^2 + \\ &\quad w_{16}v^3 + w_{17}v^2h + w_{18}vh^2 + w_{19}h^3 \\ W_2 &= w_{20} + w_{21}v + w_{22}h + w_{23}v^2 + w_{24}vh + w_{25}h^2 + \\ &\quad w_{26}v^3 + w_{27}v^2h + w_{28}vh^2 + w_{29}h^3 \\ &\vdots \\ W_i &= w_{i0} + w_{i1}v + w_{i2}h + w_{i3}v^2 + w_{i4}vh + w_{i5}h^2 + \\ &\quad w_{i6}v^3 + w_{i7}v^2h + w_{i8}vh^2 + w_{i9}h^3 \\ &\vdots \\ W_n &= w_{n0} + w_{n1}v + w_{n2}h + w_{n3}v^2 + w_{n4}vh + w_{n5}h^2 + \\ &\quad w_{n6}v^3 + w_{n7}v^2h + w_{n8}vh^2 + w_{n9}h^3 \end{aligned} \tag{5}$$

The information memory bank 135 has stored therein coefficient type data w10 to wn9 as additional data in the generation formula for each of the methods of conversion and classes. The generation of the coefficient type data will be described in detail later.

The processing unit 66 includes also a coefficient generation circuit 136 which generates, by the equation (5) and with the use of the values of coefficient type data and parameters h and v for each class, additional data Wi (i=1 to n) in an estimate equation corresponding to the values of parameters h and v for the class. The coefficient generation circuit 136 is loaded, from the information memory bank 135, with coefficient type data for each class corresponding to the above-mentioned first or second method of conversion according to information for selection of the method of conversion. Also, the coefficient generation circuit 136 is supplied with the values of parameters h and v from the system controller 101.

The additional data Wi (i=1 to n) for each class, generated by the coefficient generation circuit 136, is stored into the aforementioned coefficient memory 68. The additional data Wi for each class is generated by the coefficient generation circuit 136 during each vertical blanking period, for example. Thus, even if the values of parameters h and v have been changed, the additional data Wi for each class, stored in the coefficient memory 68, can instantly be changed to ones corresponding to the values of parameters h and v, whereby the resolution can smoothly be adjusted, The processing circuit 66 includes also a normalize coefficient generation circuit 137 which calculates, by the following equation (6), a normalize coefficient S generated by the coefficient generation circuit 136 and corresponding to the additional data Wi (i=1 to n) for each class, and a normalize coefficient memory 138 which stores, fr each class, the normalize coefficient S thus generated by the normalize coefficient generation circuit 137:

$$S = \sum_{i=1}^{n} Wi \quad (6)$$

The normalize coefficient memory 138 is supplied with the class code CL generated by the aforementioned class synthesis circuit 126, as read address information. A normalize coefficient S corresponding to the class code CL will be read from the normalize coefficient memory 138 and supplied to a normalization circuit 128 which will be described in detail later.

The processing unit 66 includes also the aforementioned estimate prediction circuit 127 which calculates data on pixels of HD signal to be produced (pixels of interest) from data (SD pixel data) xi in a prediction tap selectively extracted by the first tap selection circuit 121 and additional data Wi read from the coefficient memory 68.

In the estimate prediction circuit 127, it is necessary for conversion of 525i signal into 525p signal to generate line data L1 in the same position as the line of the 525i signal and line data L2 in an intermediate position between upper and lower lines of the 525i signal in each of an odd-numbered field (o) and even-numbered field (e) and double the number of pixels in each line, as shown in FIG. 24. In this estimate prediction circuit 127, it is also necessary for conversion of the 525i signal into 1050i signal to generate line data L1 and L1' in positions near the line of the 525i signal and line data L2 and L2' in positions far from the line of 525i signal in each of the odd-numbered fields (o) and even-numbered field (e) and double the number of pixels in each line, as shown in FIG. 25.

Therefore, the estimate prediction circuit 127 generates four pixel data forming HD signal at the same time. For example, the four pixel data are simultaneously generated using estimate equations different in additional data from each other, and additional data in each of the estimate equations is supplied from the coefficient memory 68. The estimate prediction circuit 127 calculates, by the estimate equation (4), HD pixel data y to be produced from the data (SD pixel data) xi on the prediction tap and additional data Wi read from the coefficient memory 68.

The processing unit 66 includes also the normalization circuit 128 having previously been described. The normalization circuit 128 normalizes each of HD pixel data y forming line data L1 and L2 (or L1' and L2') supplied from the estimate prediction circuit 127 by dividing the HD pixel data by a normalize coefficient S corresponding to the additional data Wi (i=1 to n) read from the normalize coefficient memory 131 and used for production of each HD pixel data. The additional data in the estimate equation is generated by the coefficient generation circuit 136 on the basis of coefficient type data, which has not previously been described. However, the additional data thus generated includes an error of truncation and it cannot be assured that the sum of all additional data Wi (i=1 to n) is 1.0. Thus, the HD pixel data y calculated by the estimate prediction circuit 127 will be caused to vary in level due to an error of truncation. In this case, the variation can be eliminated by normalizing the HD pixel data by the normalization circuit 128.

The processing unit 66 includes also the line sequencing circuit 129 as having previously been mentioned. The line sequencing circuit 129 sequences the line data L1 and L2 (or L1' and L2') supplied from the estimate prediction circuit 127 via the normalization circuit 128 by making a line speed doubling in which the horizontal blanking period is made 1.5 times longer.

Figure 36:
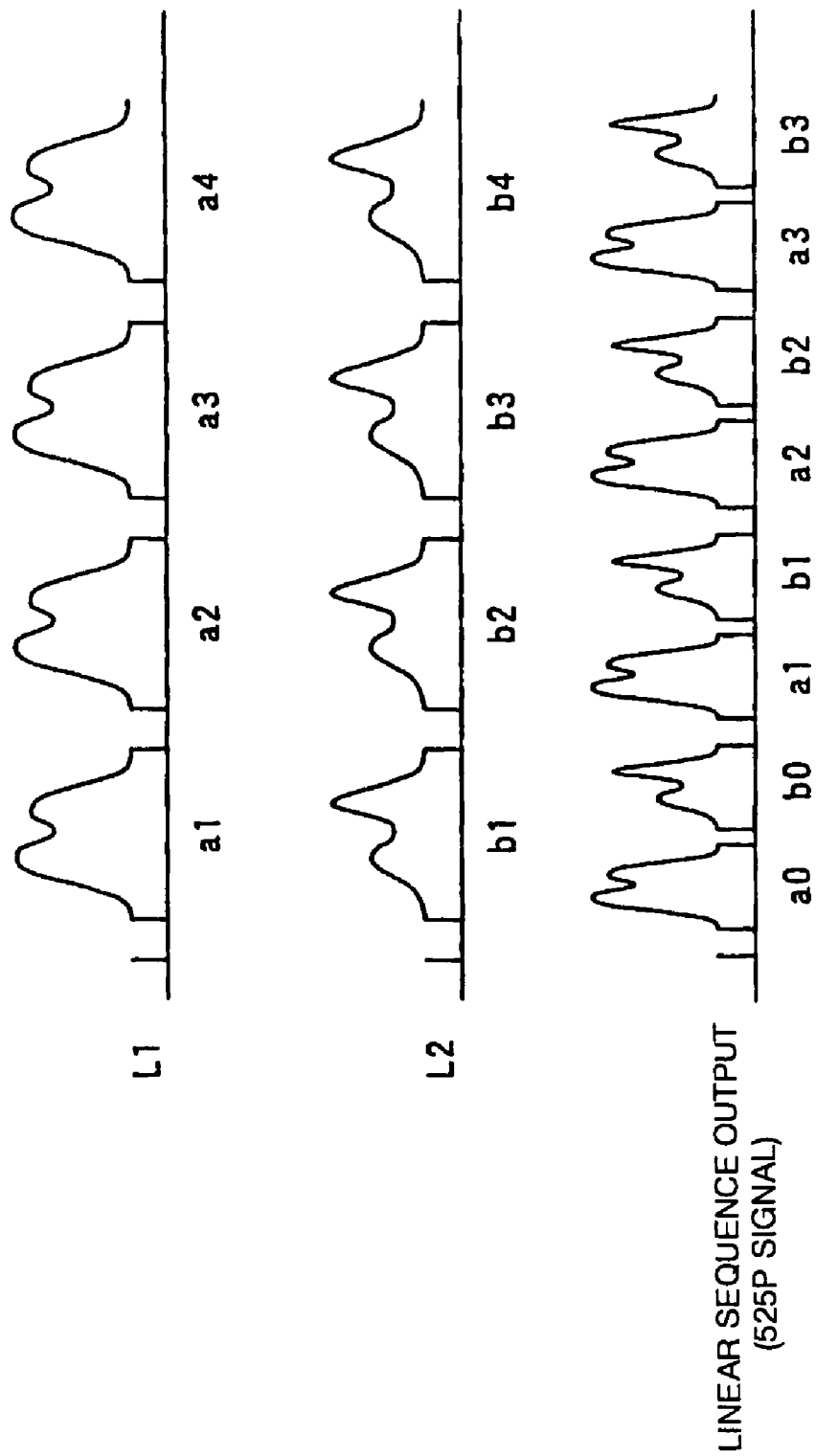
FIG. 36 shows analog waveforms to explain line speed doubling for providing 525p signal as output.

FIG. 36 shows analog waveforms to explain the line speed doubling for providing 525p signal as an output. As above, the estimate prediction circuit 127 generates line data L1 and L2. The line data L1 includes lines a1, a2, a3, . . . in this order, and the line data L2 includes lines b1, b2, b3, . . . in this order. The line sequencing circuit 129 generates line-sequenced outputs a0, b0, a1, b1, . . . by compressing data in each line to a half along the time base and selecting the compressed data alternately.

Note that for providing 1050i signal as an output, the line sequencing circuit 129 generates line-sequenced outputs to meet the interlaced relation between the odd- and even-numbered fields. Therefore, the line sequencing circuit 129 has to have the operation thereof switched for provision of either 525p or 1050i signal as an output. The operation designation information for this purpose is supplied from the register 130 as having previously been described.

The processing unit 66 functions as will be described herebelow with reference to FIG. 23.

The second tap selection circuit 122 selectively extracts data in a space class tap (SD pixel data) from the SD signal (525i signal) stored in the buffer memory 67. In this case, the second tap selection circuit 122 selects the tap on the basis of tap position information supplied from the register 132 and corresponding to a preselected method of conversion and a motion class detected by the motion class detection circuit 125.

The data (SD pixel data) in the space class tap selectively extracted by the second tap selection circuit 122 is supplied to the space class detection circuit 124. In the space class detection circuit 124, each SD pixel data as the data in the space class tap is processed by the ADRC technique to provide a re-quantized code Qi as class information on the space class (classified primarily for representation of a waveform in the space) (see the aforementioned equation (1)).

Also, the third tap selection circuit 123 selectively extracts data (SD pixel data) in a motion class tap from the SD signal (525i signal) stored in the buffer memory 67. In this case, the third tap selection circuit 123 selects the tap on the basis of tap position information supplied from the register 133 and corresponding to a preselected method of conversion.

The data (SD pixel data) in the motion class tap selectively extracted by the third tap selection circuit 123 is supplied to the motion class detection circuit 125. In the motion class detection circuit 125, each SD pixel data as the data in the motion class tap to provide class information MV on the motion class (classified primarily for representation of the extent of the motion).

The above motion information MV and re-quantized code Q1 are supplied to the class synthesis circuit 126. In this class synthesis circuit 126, a class code CL indicating a class, to which pixels (pixels of interest) of the HD signal to be produced (525p or 1050i signal) belongs, is generated from the motion information MV and re-quantized code Qi (see the aforementioned equation (3)) The class code CL is supplied as read address information to the coefficient memory 68 and normalize coefficient memory 138.

For each vertical blanking period, for example, additional data Wi (i=1 to n) in the estimate equation for each class corresponding to each of preset parameters h and v and methods of conversion is generated by the coefficient generation circuit 136 and stored into the coefficient memory 68. Also, a normalize coefficient S generated by the coefficient generation circuit 136 as above and corresponding to additional data Wi (i=1 to n) for each class is generated by the normalize coefficient generation circuit 137 and stored into the normalize coefficient memory 138.

Since a class code CL is supplied as read address information to the coefficient memory 68 as above, additional data Wi corresponding to the class code CL is read from the coefficient memory 68 and supplied to the estimate prediction circuit 127. Also, the first tap selection circuit 121 selectively extracts data in a prediction tap (SD pixel data) from the SD signal (525i signal) stored in the buffer memory 67. In this case, the first tap selection circuit 121 selects a tap on the basis of tap position information supplied from the register 131 and corresponding to a preselected method of conversion. Data (SD pixel data) xi in a prediction tap selectively extracted by the first tap selection circuit 121 is supplied to the estimate prediction circuit 127.

The estimate prediction circuit 127 calculates data (HD pixel data) y on pixels of HD signal to be produced (pixel of interest) from the prediction tap data (SD pixel data) xi and additional data Wi read from the coefficient memory 68 (see the aforementioned equation (4)). In this case, four pixel data forming the HD signal are generated at the same time.

Thus, with selection of the first method of conversion for 525p signal, there are generated line data L1 in the same position as the line of the 525i signal and line data L2 in an intermediate position between upper and lower lines of the 525i signal in each of an odd-numbered field (o) and even-numbered field (e) and double the number of pixels in each line, as shown in FIG. 24. Also, when the second method of conversion for 1050i signal, there are generated line data L1 and L1' in positions near the line of the 525i signal and line data L2 and L2' in positions far from the line of 525i signal in each of the odd-numbered fields (o) and even-numbered field (e), as shown in FIG. 25.

Thus, the line data L1 and L2 (or L1' and L2') generated by the estimate prediction circuit 127 are supplied to the normalization circuit 128. Since a class code CL is supplied as read address information to the normalize coefficient memory 138 as above, a normalize coefficient S corresponding to the class code CL, that is, a normalize coefficient S corresponding to additional data Wi (i=1 to n) used for generation of each HD pixel data y forming the line data L1 and L2 (or L1' and L2') supplied from the estimate prediction circuit 127, is read from the normalize coefficient memory 138 and supplied to the estimate prediction circuit 127. The normalization circuit 128 normalizes each of HD pixel data y forming line data L1 and L2 (or L1' and L2') supplied from the estimate prediction circuit 127 by dividing the HD pixel data by the normalize coefficient S. Thus, it is possible to eliminate the variation in level of information data on a point of interest due to an error of truncation caused when additional data in the estimate equation (see the aforementioned equation (4)) is determined by the generation equation (see the aforementioned equation (5)) using coefficient type data.

The line data L1 and L2 (or L1' and L2') normalized by the normalization circuit 128 are supplied to the line sequencing circuit 129. The line sequencing circuit 129 generates HD signal by sequencing the line data L1 and L2 (or L1' and L2'). In this case, the line sequencing circuit 129 operates according to operation designation information supplied from the register 130 and corresponding to a preselected method of conversion. On this account, with the first method of conversion (for generation of 525p signal from 525i signal) being selected, the line sequencing circuit 129 will provide 525p signal as an output. On the other hand, with selection of the second method of conversion (for generation of 1050i signal from 525i signal), the line sequencing circuit 129 will provide 1050i signal as an output.

As above, the coefficient generation circuit 136 generates additional data Wi (i=1 to n) in an estimate equation corresponding to the values of parameters h and v for each class with the use of coefficient type data loaded from the information memory bank 135, and stores them into the coefficient memory 68.

The estimate prediction circuit 127 calculate HD pixel data y using the additional data Wi (i=1 to n) read from the coefficient memory 68 correspondingly to the class code CL. Therefore, it is possible to adjust the horizontal and vertical qualities of an image formed from the HD signal by adjusting the values of the parameters h and v. Note that in this case, additional data for each class corresponding to the adjusted values of parameters h and v is used by generating it by the coefficient generation circuit 136 at each time and any memory for storage of a large amount of additional data is not required.

As above, the information memory bank 135 stores coefficient type data for each method of conversion and class. The coefficient type data is generated in advance through learning.

First, an example of the coefficient type data generation will be described. In this example, there will be generated coefficient type data w10 to wn9 which are the additional data in the aforementioned generation equation (5).

For the purpose of this explanation, ti (i=0 to 9) will be defined as given by the following expression (7):

t0=1, t1=v, t2=h, t3=v2, t4=vh, t5=h2, t6=v3, t7=v2h,
t8=vh2, t9=h3　　　　(7)

Using the equation (7), the aforementioned equation (5) can be rewritten as given by the following equation (8):

$$W_j = \sum_{i=0}^{9} W_{ji} t_i \qquad (8)$$

Finally, an undetermined coefficient wxy is determined through learning. That is, for each method of conversion and class, multiple SD and HD pixel data are used to determine a coefficient value which minimizes a square error. This is a solution by the so-called least-squares method. On the assumption that the number of times of learning is m, residual in k-th (1 k m) learned data is ek and sum of square errors is E, the sun E is given by the following equation (9) using the equations (4) and (5):

$$E = \sum_{k=1}^{m} e_k^2 \quad (9)$$

$$= \sum_{k=1}^{m} [y_k - (W_{1 \times 1K} + W_{2 \times 2K} + \cdots + W_{n \times nK})]^2$$

$$= \sum_{k=1}^{m} \{y_k - [(t_0 w_{10} + t_1 w_{11} + \cdots + t_9 w_{19})_{x1k} + \cdots$$
$$\cdots + (t_0 w_{n0} + t_1 w_{n1} + \cdots + t_9 w_{n9})_{xnk}]\}^2$$

$$= \sum_{k=1}^{m} \{y_k - [(w_{10} + w_{11}v + \cdots + w_{19}h^3)_{x1k} + \cdots$$
$$\cdots + (w_{n0} + w_{n1}v + \cdots + w_{n9}h^3)_{xnk}]\}^2$$

where xik is the k-th pixel data, in the i-th prediction tap position, of an SD image and yk is pixel data of the k-th HD image corresponding to the k-th pixel data.

In the solution using the least-squares method, wxy is determined such that a partial differentiation by wxy in the equation (9) will be zero. This is given by the following equation (10):

$$\frac{\partial E}{\partial w_{ij}} = \sum_{k=1}^{m} 2\left(\frac{\partial e_k}{\partial w_{ij}}\right) e_k = -\sum_{k=1}^{m} 2t_j x_{ik} e_k = 0 \quad (10)$$

By defining Xipjq and Yip as in the following equations (11) and (12), the equation (10) can be rewritten as given by the following equation (13) using a matrix:

$$X_{ipjq} = \sum_{K=1}^{m} x_{ik} t_p x_{jk} t_q \quad (11)$$

$$Y_{ip} = \sum_{K=1}^{m} x_{ik} t_p y_k \quad (12)$$

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} \begin{bmatrix} Y_{10} \\ Y_{11} \\ Y_{12} \\ \vdots \\ Y_{19} \\ Y_{20} \\ \vdots \\ Y_{n9} \end{bmatrix} \quad (13)$$

Each of these equations is generally called "normal equation". The normal equation is solved for wxy using the "flushing (process of Gauss-Jordan elimination)" or the like to provide coefficient type data.

Figure 37:
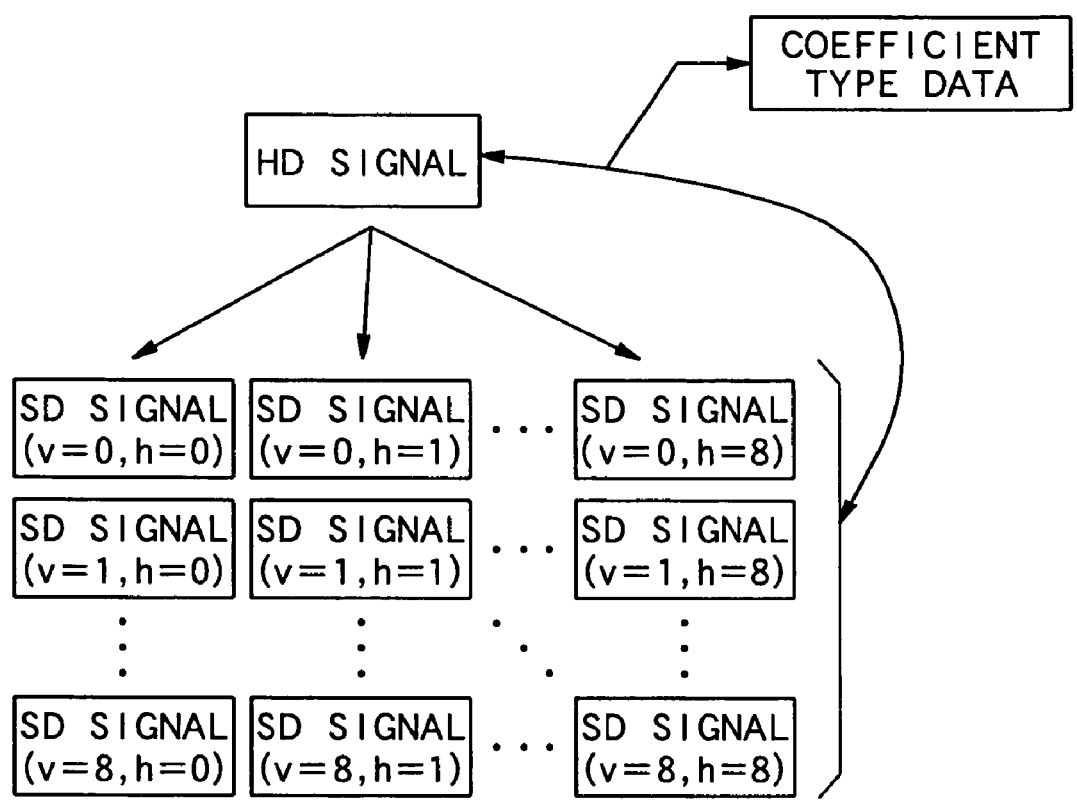
FIG. 37 shows the concept of an example of coefficient type data generation method.

FIG. 37 shows the concept of the aforementioned coefficient type data generation method. A plurality of SD signals is generated from HD signal. For example, the parameters h and v, by which the horizontal and vertical bands of a filter used in generation of the SD signals from the HD signal, are varied in nine steps to generate a total of 81 kinds of SD signals. A learning is made between the plurality of SD signals thus generated and HD signal to generate coefficient type data.

Figure 38:
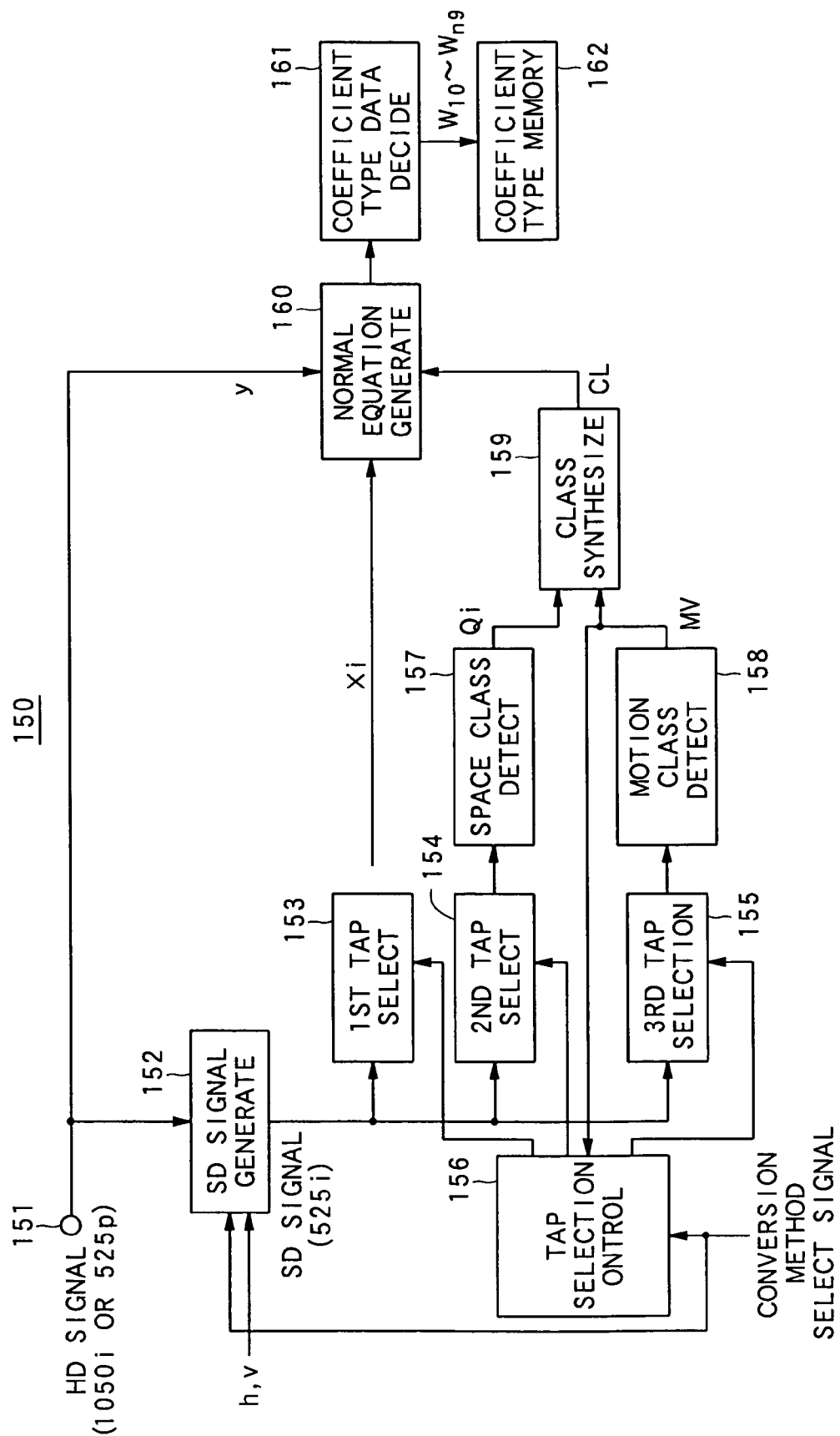
FIG. 38 is a block diagram of a coefficient type data generator.

FIG. 38 shows the construction of a coefficient type data generator, generally indicated with a reference 150, which generates coefficient type data under the above concept.

The coefficient type data generation unit 150 has an input terminal 151 at which HD signal (525p or 1050i) as a teacher signal is supplied, and an SD signal generation circuit 152 which makes horizontal and vertical thinning-out of the HD signal to provide SD signals as an input signal.

The SD signal generation circuit 152 is supplied with a conversion-method select signal as a control signal. With the first method of conversion (in the processing unit 66 in FIG. 23, 525i signal is converted into 525p signal) being selected, the SD signal generation circuit 152 will thin out the 525p signal to provide SD signals (as shown in FIG. 24). On the other hand, with selection of the second method of conversion (in the processing unit 66 in FIG. 23, 525i signal is converted into 1050i signal), the SD signal generation circuit 125 will thin out the 1050i signal to provide SD signals (as shown in FIG. 25).

Further, the SD signal generation circuit 152 is also supplied with parameters h and v as control signals. The horizontal and vertical bands of a filter used in generation of SD signals from HD signal are varied correspondingly to these supplied parameters h and v. The filter will be described in detail taking some examples.

Figure 39:
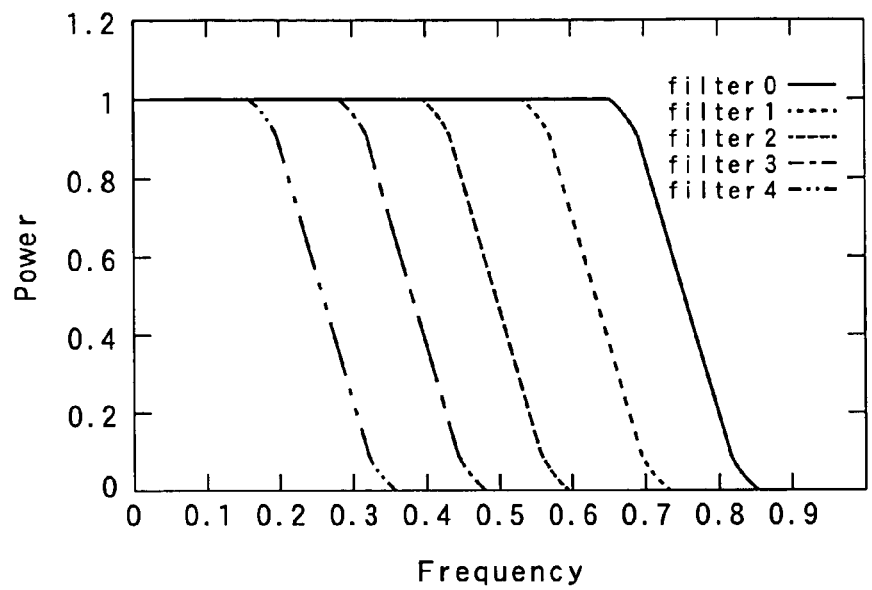
FIG. 39 shows an example of frequency response of the coefficient type data generator.

For example, the filter may be composed of a bandpass filter to limit the horizontal band and a bandpass filter to limit the vertical bad. In this case, frequency responses corresponding to stepwise values of the parameter h or v can be designed to provide a one-dimensional filter having such frequency responses corresponding to the stepwise values of the parameter h or v by making inverse Fourier transform of the frequency responses, as shown in FIG. 39.

Also, the filter may be composed of a one-dimensional Gaussian filter to limit the horizontal band and a one-dimensional Gaussian filter to limit the vertical band. The one-dimensional Gaussian filter is given by the following equation (14):

$$\text{Out} = \frac{1.0}{\sigma \sqrt{2.0_\pi}} e^{\frac{-(4.0 \times -37)^2}{2.0\sigma^2}} \quad (14)$$

In this case, a one-dimensional Gaussian filter having frequency responses corresponding to the stepwise values of the parameter h or v can be provided through stepwise variation of the value of a standard deviation σ correspondingly to the stepwise values of the parameter h or v.

Also, the filter may be composed of a two-dimensional filter F (h, v) of which the horizontal and vertical frequency responses depend upon the parameters h and v, for example. Similarly to the aforementioned one-dimensional filter, the two-dimensional filter having two-dimensional frequency responses corresponding to stepwise values of the parameters h and v can be provided by designing two-dimensional frequency responses corresponding to stepwise values of the parameters h and v and making two-dimensional inverse Fourier transform of the frequency responses.

The coefficient type data generation unit 150 includes first to third tap selection circuits 153 to 155. These tap selection circuits 153 to 155 selectively extract and output data on a plurality of SD pixels existent around a pixel of interest associated with HD signal (1050i or 525p signal) from SD signal (525i signal) supplied from the SD signal generation circuit 152.

These first to third tap selection circuits 153 to 155 are designed similarly to the aforementioned first to third tap selection circuits 121 to 123 in the processing unit 66. The first to third tap selection circuits 153 to 155 select taps as designed by tap position information supplied from a tap selection control circuit 156.

The above tap selection control circuit 156 is supplied with conversion method select signal as a control signal. Tap position information supplied to the first to third tap selection circuits 153 to 155 when the first method of conversion is selected is different from that supplied to the circuits 153 to 155 when the second method of conversion is selected. Also, the tap selection control circuit 156 is supplied with class information MV about a motion class supplied from a motion class detection circuit 158 which will further be described later. Thus, the tap position information supplied to the second tap selection circuit 154 varies depending upon which the motion is, large or small.

The coefficient type data generation unit 150 includes also a space class detection circuit 157 which detects a level distribution pattern of data (SD pixel data) in a space class tap selectively extracted by the second tap selection circuit 154, detects a space class on the basis of the level distribution pattern and provides class information as an output. The space class detection circuit 157 is designed similarly to the aforementioned space class detection circuit 124 in the processing unit 66. The space class detection circuit 157 provides, as class information indicating a space class, a re-quantized code Q1 for each SD pixel data as data in the space class tap.

In addition, the coefficient type data generation unit 150 includes a motion class detection circuit 158 which detects a motion class representing mainly an extent of a motion from data (SD pixel data) in a motion class tap selectively extracted by the third tap selection circuit 155 and provides information MV about the motion class as an output. The motion class detection circuit 158 is designed similarly to the aforementioned motion class detection circuit 125 in the processing unit 66. In the motion class detection circuit 158, inter-frame differences are calculated from data (SD pixel data) in motion class taps selectively extracted by the third tap selection circuit 155, and then a mean value of absolute values of the differences is compared with a threshold to detect a motion class which is an index of motion.

The coefficient type data generation unit 150 includes also a class synthesis circuit 159. This class synthesis circuit 159 produces, based on a re-quantized code Qi as class information about a space class provided as an output from the space class detection circuit 159 and class information MV about a motion class provided as an output from the motion class detection circuit 158, a class code CL indicating a class to which a pixel (pixel of interest) associated with HD signal (525p or 1050i) belongs. The class synthesis circuit 159 is also designed similarly to the aforementioned class synthesis circuit 126 in the processing unit 66.

The coefficient type data generation unit 150 includes also a normal equation generator 160. This normal equation generator 160 generates a normal equation (see the aforementioned equation (13)) which gives coefficient type data w10 to wn9 for each class from each HD pixel data y, as pixel data of interest, acquired from HD signal supplied at the input terminal 151, data (SD pixel data) xi in a prediction tap selectively extracted by the first tap selection circuit 153 correspondingly to each HD pixel data y, and a class code CL supplied from the class synthesis circuit 159 correspondingly to each HD pixel data y.

In this case, learning data is generated from a combination of one HD pixel data y and a number n of prediction tap pixel data corresponding to the HD pixel data. More specifically, parameters h and v for supply to the SD signal generation circuit 152 are changed one after another and thus a plurality of SD signals whose horizontal and vertical bands are varied stepwise is sequentially generated, whereby the normal equation generator 160 generates a normal equation having many learning data entered therein.

Coefficient type data calculated through learning between the HD signal and SD signals generated from the HD signal under the action of a narrow-band filter is intended for generation of a high resolution HD signal. On the other hand, coefficient type data calculated through learning between the HD signal and SD signals generated from the HD signal under the action of a wide-band filter is intended for generation of a low resolution HD signal. By generating the plurality of SD signals one after another and entering learning data in the normal equation, the normal equation permits to determine coefficient type data for providing HD signal having a continuous variation of resolution.

Note that a timing delay circuit provided upstream of the first tap selection circuit 153 permits to time SD pixel data xi which are to be supplied from the first tap selection circuit 153 to the normal equation generator 160.

The coefficient type data generation unit 150 includes also a coefficient type data decision unit 161 which is supplied with data on a normal equation generated for each class by the normal equation generator 160, solves the normal equation for each class and determines coefficient type data w10 to wn9 for each class, and a coefficient type memory 162 which stores the coefficient type data w10 to wn9 thus determined. The coefficient type data decision unit 161 solves the normal equation by flushing or the like, for example, and determines additional data w10 to wn9.

The coefficient type data generation unit 150 constructed as shown in FIG. 38 functions as will be described herebelow. It is supplied at the input terminal 151 thereof with HD signal (525p or 1050i) as a teacher signal. The SD signal generation circuit 152 generates SD signal (525i) as an input signal by making horizontal and vertical thinning-out of the HD signal.

In this case, with selection of the first method of conversion (in which the processing unit 66 shown in FIG. 23 generates 525p signal from the 525i signal), the SD signal generation circuit 152 makes thinning-out of the 525p signal to provide SD signal. On the other hand, with selection of the second method of conversion (in which the processing unit 66 shown in FIG. 23 generates 1050i signal from the 525i signal), the SD signal generation circuit 152 makes thinning-out of the 1050i signal to provide SD signal. Also in this case, the SD signal generation circuit 152 is supplied with parameters h and v as control signals and generates a plurality of SD signals whose horizontal and vertical bands are stepwise varied, one after another.

The second tap selection circuit 154 selectively extracts data (SD pixel data) in a space class tap positioned near a pixel of interest associated with HD signal (525p or 1050i) from the SD signals (525i). The second tap selection circuit 154 selects a tap on the basis of tap position information supplied from the tap selection control circuit 156 and corresponding to a selected method of conversion and a motion class detected by the motion class detection circuit 158.

The data (SD pixel data) in the space class tap selectively extracted by the second tap selection circuit 154 is supplied to the space class detection circuit 157. In the space class detection circuit 157, each SD pixel data as the data in the space class tap is processed by the ADRC technique to provide a re-quantized code Qi as class information on the space class (classified primarily for representation of a waveform in the space) (see the aforementioned equation (1)).

Also, the third tap selection circuit 155 selectively extracts data (SD pixel data) in a motion class tap positioned near the pixel of interest associated with the HD signal from the SD signal generated by the SD signal generation circuit 152. In this case, the third tap selection circuit 155 selects the tap according to tap position information supplied from the tap selection control circuit 156 and corresponding to a selected method of conversion The data (SD pixel data) in the motion class tap selectively extracted by the third tap selection circuit 155 is supplied to the motion class detection circuit 158. In the space class detection circuit 158, each SD pixel data as the data in the motion class tap to provide class information MV on the motion class (classified primarily for representation of the degree of the motion).

The above motion information MV and re-quantized code Qi are supplied to the class synthesis circuit 159. This class synthesis circuit 159 generates a class code CL (see the aforementioned equation (3)) indicating a class, to which a pixel of interest associated with HD signal (525p or 1050i signal) belongs, from the motion information MV and re-quantized code Qi.

Also, the first tap selection circuit 153 selectively extracts data (SD pixel data) in a prediction tap positioned near the pixel of interest associated with the HD signal from the SD signals generated by the SD signal generation circuit 152. In this case, the first tap selection circuit 153 selects the tap on the basis of tap position information supplied from the tap selection control circuit 156 and corresponding to a selected method of conversion.

Then, the normal equation generator 160 generates a normal equation (see the aforementioned equation (13)), intended for generation of coefficient type data w10 to wn9 for each class, from each HD pixel data y as data on a pixel of interest acquired from the HD signal supplied at the input terminal 151, data (SD pixel data) xi in a prediction tap selectively extracted by the first tap selection circuit 153 correspondingly to each of the HD pixel data y and a class code CL supplied from the class synthesis circuit 159 correspondingly to each HD pixel data y.

Then, the coefficient type data decision unit 161 solves the normal equation to determine coefficient type data w10 to wn9 for each class and stores the coefficient type data w10 to wn9 into the coefficient type memory 162 having an address defined for each class.

Thus, the coefficient type data generation unit 150 shown in FIG. 38 can generate coefficient type data w10 to wn9 for each class, which are to be stored into the information memory bank 135 in the processing unit 66 shown in FIG. 23. In this case, the SD signal generation circuit 152 generates SD signals (525i) from 525p or 1050i signal by a selected method of conversion. It can generate coefficient type data corresponding to each of the first method of conversion (for generation of 525p signal from 525i signal in the processing unit 66) and second method of conversion (for generation of 1050i signal from 525i signal in the processing unit 66).

Next, the coefficient type data generation will also be described concerning another example. The explanation will be given on the assumption that the example is intended for generation of coefficient type data w10 to wn9 as additional data in the aforementioned generation equation (5).

Figure 40:
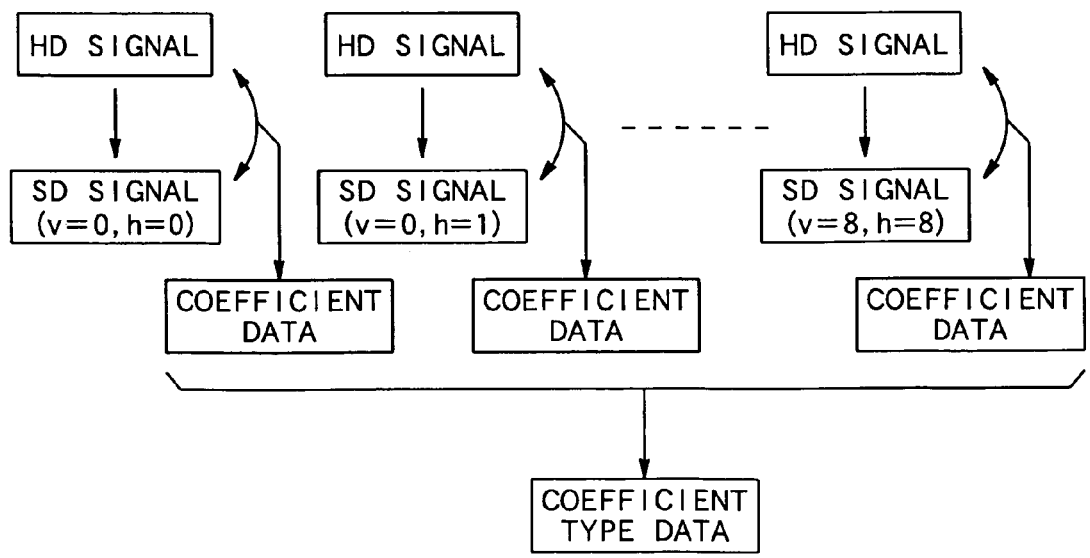
FIG. 40 shows the concept of another example of coefficient type data generation method.

FIG. 40 shows the concept of the other example. As shown, a plurality of SD signals is generated from HD signal. For example, a total of 81 kinds of SD signals is generated by varying parameters h and v, by which the horizontal and vertical bands of a filter used in generating SD signals from HD signal are varied, in nine steps, respectively. Additional data Wi in the aforementioned estimate equation (4) is generated through learning between the various SD signals thus generated and the HD signal. Then, coefficient type data is generated using the additional data Wi generated correspondingly to each of the SD signals.

First, how to generate the additional data in the estimate equation will be described. It is assumed herein that the additional data Wi (i=1 to n) in the estimate equation (4) is generated by the least-squares method. For this purpose, it is assumed that input data is X, additional data is W and prediction value is Y, and an observation equation as given by the following equation (15) is used:

$$XW = Y \quad (15)$$

$$X = \begin{bmatrix} X11 & X12 & \ldots & X1n \\ X21 & X22 & \ldots & X2n \\ \ldots & \ldots & \ldots & \ldots \\ Xm1 & Xm2 & \ldots & Xmn \end{bmatrix}, W = \begin{bmatrix} W_1 \\ W_2 \\ \ldots \\ W_n \end{bmatrix}, Y = \begin{bmatrix} y_1 \\ y_2 \\ \ldots \\ y_m \end{bmatrix}$$

where m is a number of learning data and n is a number of prediction taps.

The least-squares method is applied to data acquired using the observation equation (15). A residual equation as given by the following equation (16) is generated based on the observation equation (15)

$$XW = Y + E, E = \begin{bmatrix} e_1 \\ e_2 \\ \ldots \\ e_m \end{bmatrix} \quad (16)$$

The residual equation (16) shows that the most probable value of each additional data Wi assures the smallest value of e2 given by the following equation (17) under the condition given by the following equation (18):

$$e^2 = \sum_{i=1}^{m} ei^2 \quad (17)$$

$$e_1 \frac{\partial e_1}{\partial W_i} + e_2 \frac{\partial e_2}{\partial W_i} + \ldots + e_m \frac{\partial e_m}{\partial W_i} = 0 (i = 1, 2, \ldots, n) \quad (18)$$

That is, a number n of conditions based on a value i in the equation (18) are set and additional data W1, W2, . . . , Wn are calculated which meet the conditions. The following equation (19) is derived from the residual equation (16). Also the following equation (20) is derived from a combination of the equations (19) and (15):

$$\frac{\partial ei}{\partial W_1} = xi1, \frac{\partial ei}{\partial W_2} = xi2, \ldots, \frac{\partial ei}{\partial W_n} = xin(i = 1, 2, \ldots, m) \quad (19)$$

$$\frac{\partial ei}{\partial W_1} = xi1, \frac{\partial ei}{\partial W_2} = xi2, \ldots, \frac{\partial ei}{\partial W_n} = xin(i = 1, 2, \ldots, m) \quad (20)$$

Then the following normal equation (21) is derived from a combination of the equations (16) and (20):

$$\begin{cases} \left(\sum_{j=1}^{m} \times j1 \times j1\right)W_1 + \left(\sum_{j=1}^{m} \times j1 \times j2\right)W_2 + \ldots + \left(\sum_{j=1}^{m} \times j1 \times jn\right)W_n = \left(\sum_{j=1}^{m} \times j1yj\right) \\ \left(\sum_{j=1}^{m} \times j2 \times j1\right)W_1 + \left(\sum_{j=1}^{m} \times j2 \times j2\right)W_2 + \ldots + \left(\sum_{j=1}^{m} \times j2 \times jn\right)W_n = \left(\sum_{j=1}^{m} \times j2yj\right) \\ \ldots \\ \left(\sum_{j=1}^{m} \times jn \times j1\right)W_1 + \left(\sum_{j=1}^{m} \times jn \times j2\right)W_2 + \ldots + \left(\sum_{j=1}^{m} \times jn \times jn\right)W_n = \left(\sum_{j=1}^{m} \times jnyj\right) \end{cases} \quad (21)$$

Since there can be set up as many normal equations (21) as the number n of unknown quantities, it is possible to provide the most probable value of each additional data Wi. In this case, simultaneous equations are to be solved using the flushing or the like.

Next, determination of coefficient type data with the use of additional data generated correspondingly to each of the SD signals will be described.

It is assumed here that additional data being to a class and obtained through learning using SD signals corresponding to the parameters h and v is kvhi where i is a number for a prediction tap.

Each of the additional data Wi (i=1 to n) is represented as given by the aforementioned equation (5) using the coefficient type data w10 to wn9. Since the least-squares method is used for the additional data Wi, the residual is represented by the following equation (22):

$$e_{vhi} = k_{vhi} - (w_{i0} + w_{i1}v + w_{i2}h + w_{i3}v^2 + w_{i4}vh + w_{i5}h^2 + \quad (22)$$
$$w_{i6}v^3 + w_{i7}v^2h + w_{i8}vh^2 + w_{i9}h^3)$$
$$= k_{vhi} - \sum_{j=0}^{9} w_{ij}t_j$$

where tj is included in the aforementioned equation (7). Application of the least-squares method to the equation (22) provides the following equation (23):

$$\frac{\partial}{\partial w_{ij}} = \sum_v \sum_h (e_{vhi})^2 = \sum_v \sum_h 2\left(\frac{\partial e_{vhi}}{\partial w_{ij}}\right)e_{vhi} \quad (23)$$
$$= -\sum_v \sum_h 2t_j e_{vhi}$$
$$= 0$$

With Xjk and Yj defined by the following equations (24) and (25), the equation (23) can be rewritten to the following equation (26):

$$X_{jk} = \sum_v \sum_h t_j t_k \quad (24)$$

$$Y_j = \sum_v \sum_h t_j k_{vhi} \quad (25)$$

-continued $$\begin{bmatrix} X_{00} & X_{01} & \ldots & X_{09} \\ X_{10} & X_{11} & \ldots & X_{19} \\ \ldots & \ldots & \ddots & \ldots \\ X_{90} & X_{91} & \ldots & X_{99} \end{bmatrix} \begin{bmatrix} wi0 \\ wi1 \\ \ldots \\ wi9 \end{bmatrix} = \begin{bmatrix} Y_0 \\ Y_0 \\ \ldots \\ Y_9 \end{bmatrix} \quad (26)$$

The above equation (26) is also a normal equation, and by solving the equation (26) by a general solution such as the flushing or the like, the coefficient type data w10 to wn9 can be calculated.

Figure 41:
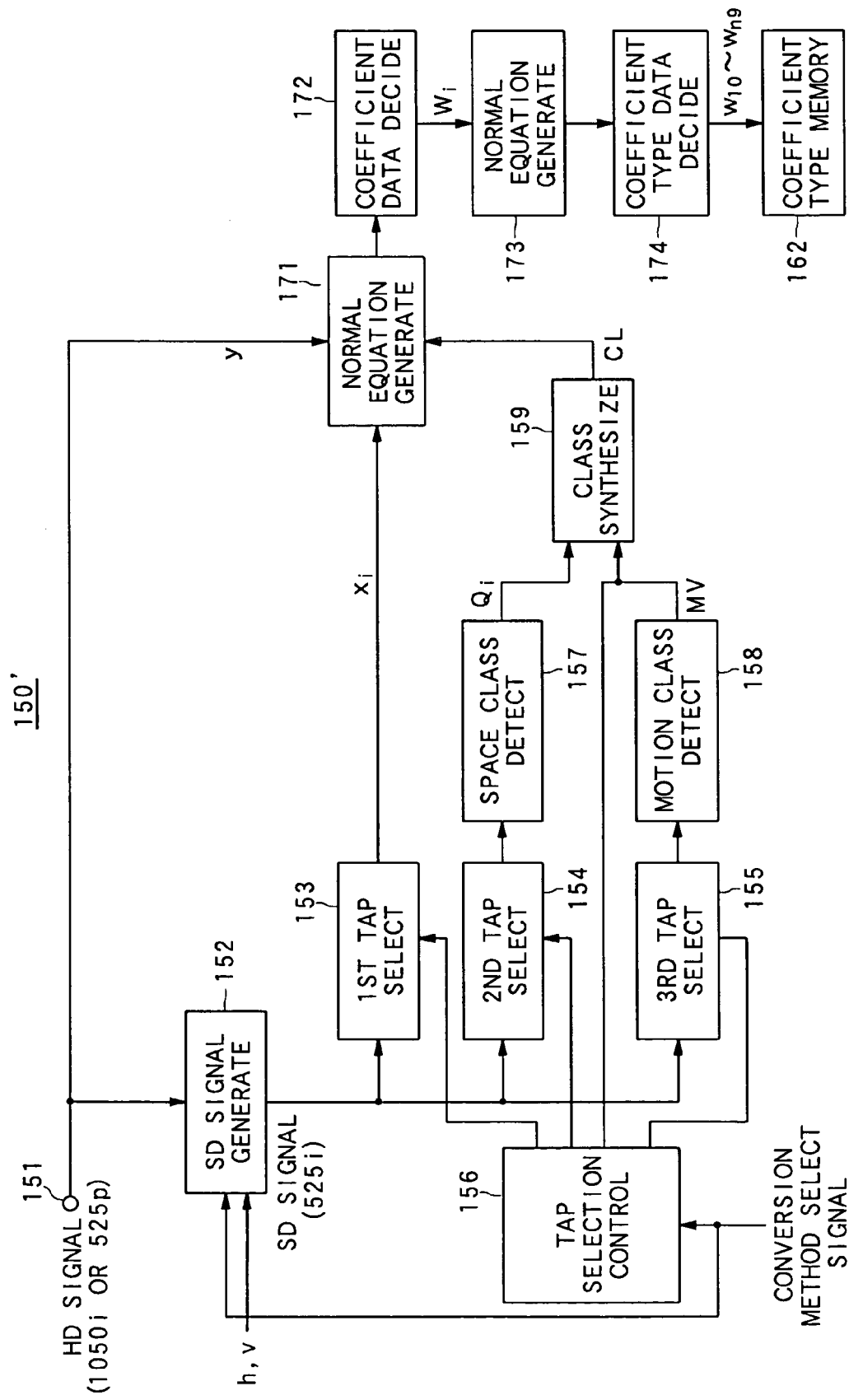
FIG. 41 is a block diagram of another coefficient type data generation method.

FIG. 41 shows a coefficient type data generation unit 150' which generates coefficient type data on the basis of the concept shown in FIG. 38. In FIG. 41, the parts corresponding to those shown in FIG. 40 are indicated with the same or similar references as in FIG. 40 and will not be described in detail any longer.

The coefficient type data generation unit 150' includes a normal equation generator 171. This normal equation generator 171 generates a normal equation (see the aforementioned equation (21)) which gives additional data Wi (i=1 to n) for each class from each HD pixel data y, as pixel data of interest, acquired from HD signal supplied at the input terminal 151, data (SD pixel data) xi in a prediction tap selectively extracted by the first tap selection circuit 153 correspondingly to each HD pixel data y, and a class code CL supplied from the class synthesis circuit 159 correspondingly to each HD pixel data y.

In this case, learning data is generated from a combination of one HD pixel data y and a number n of prediction tap pixel data corresponding to the HD pixel data. More specifically, parameters h and v for supply to the SD signal generation circuit 152 are changed one after another and thus a plurality of SD signals whose horizontal and vertical bands are varied stepwise is sequentially generated. Data on learning between the HD signal and each of the SD signals is generated. Thus, the normal equation generator 171 generates a normal equation intended for providing additional data Wi (i=1 to n) for each class correspondingly to each of the SD signals.

The coefficient type data generation unit 150' includes also a coefficient type data decision unit 172 which is supplied with data on a normal equation generated for each class by the normal equation generator 171, solves the normal equation and determines additional data Wi for each class, corresponding to each SD signal, and a normal equation generation unit 173 which generates a normal equation (see the aforementioned equation (26)) intended for generation of coefficient type data w10 to wn9 for each class using the additional data Wi for each class, corresponding to each SD signal.

The coefficient type data generation unit 150' includes also a coefficient type data decision unit 174 which is supplied with data on a normal equation generated for each class by the normal equation generator 173, solves the normal equation for each class and determines coefficient type data w10 to wn19 for each class, and a coefficient type memory 162 which stores the coefficient type data w10 to wn9 thus determined.

The rest of the coefficient type data generator 150' shown in FIG. 41 is constricted similarly to the coefficient type data generator 150 shown in FIG. 38.

The coefficient type data generation unit 150' constricted as shown in FIG. 41 functions as will be described herebelow. It is supplied at an input terminal 151 thereof with HD signal (525p or 1050i) as a teacher signal and generates SD signal (525i) as an input signal by making horizontal and vertical thinning-out of the HD signals in the SD signal generation circuit 152.

In this case, with selection of the first method of conversion (in which the processing unit 66 shown in FIG. 23 generates 525p signal from the 525i signal), the SD signal generation circuit 152 makes thinning-out of the 525p signal to provide SD signal. On the other hand, with selection of the second method of conversion (in which the processing unit 66 shown in FIG. 23 generates 1050i signal from the 525i signal), the SD signal generation circuit 152 makes thinning-out of the 1050i signal to provide SD signal. Also in this case, the SD signal generation circuit 152 is supplied with parameters h and v as control signals and generates a plurality of SD signals whose horizontal and vertical bands are stepwise varied, one after another.

The second tap selection circuit 154 selectively extracts data (SD pixel data) in a space class tap positioned near a pixel of interest associated with HD signal (525p or 1050i) from the SD signals (525i). The second tap selection circuit 154 selects a tap on the basis of tap position information supplied from the tap selection control circuit 156 and corresponding to a selected method of conversion and a motion class detected by the motion class detection circuit 158.

The data (SD pixel data) in the space class tap selectively extracted by the second tap selection circuit 154 is supplied to the space class detection circuit 157. In the space class detection circuit 157, each SD pixel data as the data in the space class tap is processed by the ADRC technique to provide a re-quantized code Qi as class information on the space class (classified primarily for representation of a waveform in the space) (see the aforementioned equation (1)).

Also, the third tap selection circuit 155 selectively extracts data (SD pixel data) in a motion class tap positioned near the pixel of interest associated with the HD signal from the SD generated by the SD signal generation circuit 152. In this case, the third tap selection circuit 155 selects the tap according to tap position information supplied from the tap selection control circuit 156 and corresponding to a selected method of conversion.

The data (SD pixel data) in the motion class tap selectively extracted by the third tap selection circuit 155 is supplied to the motion class detection circuit 158. In the space class detection circuit 158, each SD pixel data as the data in the motion class tap to provide class information MV on the motion class (classified primarily for representation of the degree of the motion).

The above motion information MV and re-quantized code Qi are supplied to the class synthesis circuit 159. This class synthesis circuit 159 generates a class code CL (see the aforementioned equation (3)) indicating a class, to which a pixel of interest associated with HD signal (525p or 1050i signal) belongs, from the motion information MV and re-quantized code Qi.

Also, the first tap selection circuit 153 selectively extracts data (SD pixel data) in a prediction tap positioned near the pixel of interest associated with the HD signal from the SD signals generated by the SD signal generation circuit 152. In this case, the first tap selection circuit 153 selects the tap on the basis of tap position information supplied from the tap selection control circuit 156 and corresponding to a selected method of conversion.

Then, the normal equation generator 171 generates a normal equation (see the aforementioned equation (21)), intended for generation of additional data Wi (i=1 to n) for each class, from each HD pixel data y as data on a pixel of interest acquired from the HD signal supplied at the input terminal 151, data (SD pixel data) xi in a prediction tap selectively extracted by the first tap selection circuit 153 correspondingly to each HD pixel data y, and a class code CL supplied from the class synthesis circuit 159 correspondingly to each HD pixel data y, correspondingly to each of the SD signals generated by the SD signal generation circuit 152.

In the additional data decision unit 172, the normal equation is solved to determine additional data Wi for each class, corresponding to each SD signal. The normal equation generation unit 173 generates a normal equation (see the aforementioned equation (26)), intended for generation of coefficient type data w10 to wn9, from additional data Wi for each class, corresponding to each SD signal.

Then, the coefficient type data decision unit 174 solves the normal equation to determine coefficient type data w10 to wn9 for each class and stores the coefficient type data w10 to wn9 into the coefficient type memory 162 having an address defined for each class.

Thus, the coefficient type data generation unit 150' shown in FIG. 41 can generate coefficient type data w10 to wn9 for each class, which are to be stored into the information memory bank 135 in the processing unit 66 shown in FIG. 23. In this case, the SD signal generation circuit 152 generates SD signals (525i) from 525p or 1050i signal by a selected method of conversion. It can generate coefficient type data corresponding to each of the first method of conversion (for generation of 525p signal from 525i signal in the processing unit 66) and second method of conversion (for generation of 1050i signal from 525i signal in the processing unit 66).

Note that for generation of additional data Wi (i=1 to n), the processing unit 66 shown in FIG. 23 uses the generation equation (5) as having previously been described but it may use the following equation (27) or (28) or any other equation represented by another function:

$$W_1 = w_{10} + w_{11}v + w_{12}h + w_{13}v^2 + w_{14}h^2 + w_{15}v^3 + w_{16}h^3 \quad (27)$$
$$W_2 = w_{20} + w_{21}v + w_{22}h + w_{23}v^2 + w_{24}h^2 + w_{25}v^3 + w_{26}h^3$$
$$\vdots$$
$$W_i = w_{i0} + w_{i1}v + w_{i2}h + w_{i3}v^2 + w_{i4}h^2 + w_{i5}v^3 + w_{i6}h^3$$
$$\vdots$$
$$W_n = w_{n0} + w_{n1}v + w_{n2}h + w_{n3}v^2 + w_{n4}h^2 + w_{n5}v^3 + w_{n6}h^3$$

$$W_1 = w_{10} + w_{11}v + w_{12}h + w_{13}v^2 + w_{14}vh + w_{15}h^2 \quad (28)$$
$$W_2 = w_{20} + w_{21}v + w_{22}h + w_{23}v^2 + w_{24}vh + w_{25}h^2$$
$$\vdots$$
$$W_i = w_{i0} + w_{i1}v + w_{i2}h + w_{i3}v^2 + w_{i4}vh + w_{i5}h^2$$
$$\vdots$$
$$W_n = w_{n0} + w_{n1}v + w_{n2}h + w_{n3}v^2 + w_{n4}vh + w_{n5}h^2$$

Also, although the processing unit 66 shown in FIG. 23 sets a parameter h for designation of a horizontal resolution and a parameter v for designation of a vertical resolution and adjusts the values of these parameters h and v in order to adjust the horizontal resolution and vertical resolution of an image, it may be designed to set a parameter z for designation of a degree of noise elimination (noise suppression) for example and adjust the value of the parameter z in order to adjust the degree of noise elimination from the image.

In this case, the following equation (29) or (30) may be used for generation of additional data Wi (i=1 to n):

$$W_1 = w_{10} + w_{11}z + w_{12}z^2 + w_{13}z^3$$
$$W_2 = w_{20} + w_{21}z + w_{22}z^2 + w_{23}z^3$$
$$\vdots$$
$$W_i = w_{i0} + w_{i1}z + w_{i2}z^2 + w_{i3}z^3 \quad (29)$$
$$\vdots$$
$$W_n = w_{n0} + w_{n1}z + w_{n2}z^2 + w_{n3}z^3$$

$$W_1 = w_{10} + w_{11}z + w_{12}z^2$$
$$W_2 = w_{20} + w_{21}z + w_{22}z^2$$
$$\vdots$$
$$W_i = w_{i0} + w_{i1}z + w_{i2}z^2 \quad (30)$$
$$\vdots$$
$$W_n = w_{n0} + w_{n1}z + w_{n2}z^2$$

Alternatively, an polynominal equation of a different order or an other equation represented by another function may be used for the same purpose.

Note that the coefficient type data as additional data in a generation equation including the parameter z can be generated by the coefficient type data generation unit 150 shown in FIG. 38 or the coefficient type data generation unit 150' shown in FIG. 41 as in generation of the coefficient type data as additional data in the generation equation including the aforementioned parameters h and v.

In this case, the SD signal generation circuit 152 is supplied with the parameter z as a control signal. When SD signal is generated from HD signal, the addition of noise to the SD signal is varied stepwise correspondingly to the value of the parameter z. By varying the addition of noise to the SD signal stepwise and registering leaning data, it is possible to generate coefficient type data intended for a continuous extend of noise elimination.

The noise addition corresponding to the value of the parameter z will be described in detail concerning some examples.

Figure 42A:
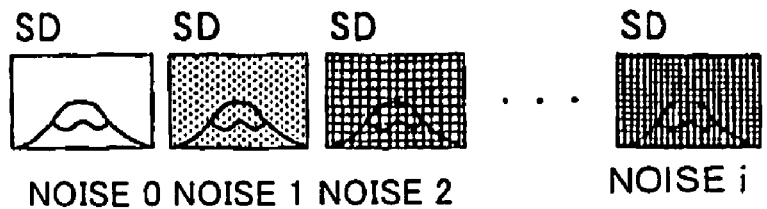
FIG. 42A explains a noise addition method with a variable noise level, FIG. 42B explains the noise addition method with a variable noise-including area and FIG. 42C explains the noise addition method with a variable noise-including image.

For example, noise signal whose amplitude level has been changed stepwise is added to SD signal as shown in FIG. 42A to generate SD signal whose noise level will vary stepwise.

Figure 42B:
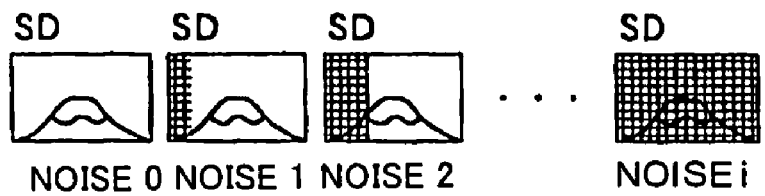

Also, noise signal whose amplitude level is fixed is added to SD signal as shown in FIG. 42B to stepwise vary an image area to which the noise signal is added, for example.

Figure 42C:
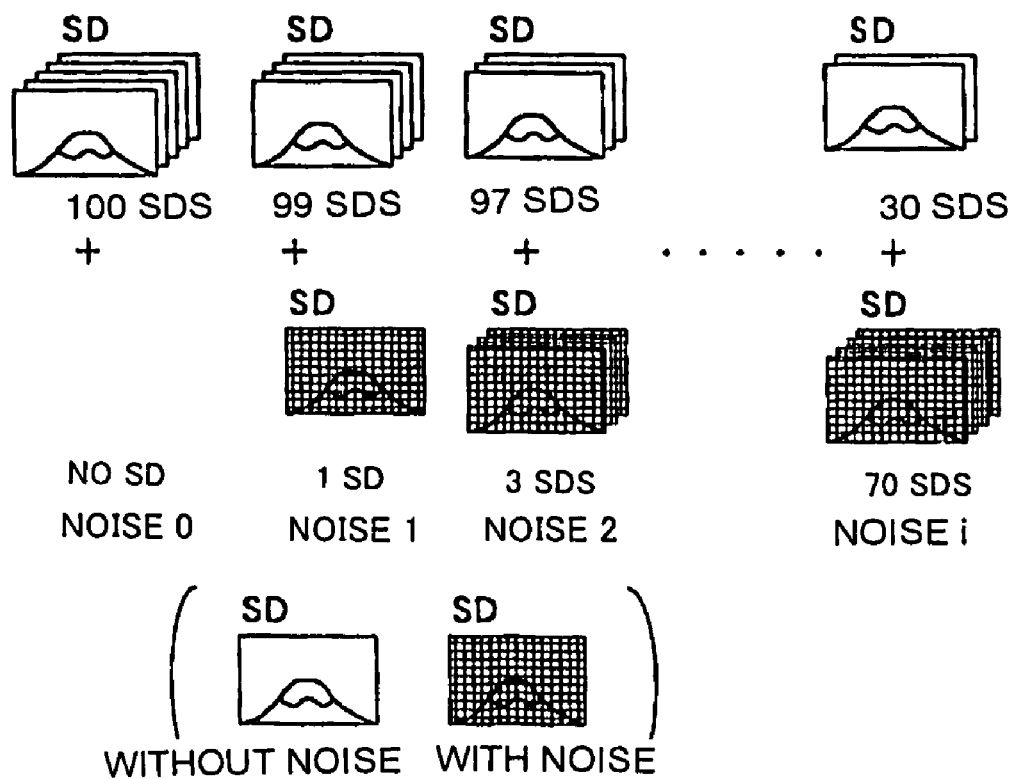

Further, there are prepared SD signals (for one screen) without noise and with noise, respectively, as shown in FIG. 42C, for example. In this case, for generation of a normal equation, learning of each of such SD signals is done multiple times.

In a "noise 0" step, learning of SD signals without noise and with noise, respectively, is repeated 100 times. In a "noise i" step, learning of SD signal without noise is repeated 30 times and learning of SD signal with noise is repeated 70 times. In this case, the "noise i" step provides a learning system for calculation of coefficient type data whose degree of noise elimination is high. Namely, by repeating the learning with the number of times of learning of SD signals without noise and with noise, respectively, being varied stepwise, it is possible to provide coefficient type data for successive degrees of noise elimination.

The above technique can be applied in the form of an addition of normal equations. First, a learning is done to calculate additional data in an estimate equation in each of the steps "noise 0" to "noise i". At this time, the normal equation will be as given by the aforementioned equation (21). It is assumed here that Pij and Qj are defined as in the following equations (31) and (32), respectively. The equation (21) can be rewritten into the following equation (33):

$$P_{ij} = \sum_p x_{pi} x_{pj} \quad (31)$$

$$Q_j = \sum_p x_{pj} y_p \quad (32)$$

$$\begin{bmatrix} P_{11} & P_{12} & \cdots & P_{1n} \\ P_{21} & P_{22} & \cdots & P_{2n} \\ \cdots & \cdots & \ddots & \cdots \\ P_{n1} & P_{n2} & \cdots & P_{nn} \end{bmatrix} \begin{bmatrix} w_1 \\ w_2 \\ \cdots \\ w_n \end{bmatrix} = \begin{bmatrix} Q_1 \\ Q_2 \\ \cdots \\ Q_n \end{bmatrix} \quad (33)$$

where xij is an i-th learned value of SD pixel data in a j-th prediction tap position, yi is an i-th learned value of HD pixel data, and Wi is a coefficient.

The left part of the equation (33) when SD signal without noise is learned as above is defined as [P1ij], while the right part is defined as [Q1i]. Similarly, the left part of the equation (33) when SD signal with noise is learned is defined as [P2ij], while the right part is defined as [Q2i]. In this case, [Paij] and [Qai] are defined as given by the following equations (34) and (35), respectively:

$$[Paij]=(1\ a)[P1ij]+a[P2ij] \quad (34)$$

$$[Qai]=(1\ a)[Q1i]+a[Q2i] \quad (35)$$

where 0 a 1.

Note that when a=1, the normal equation is given by the following equation (36):

$$[Paij][Wi]=[Qai] \quad (36)$$

This normal equation is equal to that in the "noise 0" step in FIG. 42C. When a=0.7, the normal equation is equal to that when in the "noise i" step.

By generating a normal equation for each noise level by varying the value a stepwise, it is possible to provide intended coefficient type data. In this case, as having previously been described concerning the coefficient type data generation unit 150' shown in FIG. 41, it is possible to calculate additional data Wi by the normal equation for each noise level and provide coefficient type data using the additional data in each of the noise steps.

Also, by combining together normal equations each for a noise level, it is possible to generate a normal equation intended for generation of coefficient type data as in the aforementioned equation (13). This technique will be described in detail herebelow. There will be described the generation, using the aforementioned equation (30), of a normal equation intended for coefficient type data.

SD signals having noise levels corresponding to some kinds of parameter z are generated in advance for learning, and [P] and [Q] represented by the aforementioned equations (34) and (35), respectively, are prepared. The [P] and [Q] are represented by [Pnij] and [Qni], respectively. Also, the aforementioned equation (7) can be rewritten as given by the following equation (37):

$$t0=1, t0=z, t2=z2 \quad (37)$$

In this case, the aforementioned equations (24) and (25) are rewritten into the following equations (38) and (39), respectively. By solving the following equation (40) for these equations (38) and (39), it is possible to provide coefficient type data wij.

$$X_{ip,jp} = \sum_z t_p t_q P_{zij} \quad (38)$$

$$Y_{ip} = \sum_z t_p Q_{zi} \quad (39)$$

$$\begin{bmatrix} X_{1010} & X_{1011} & X_{1012} & X_{1020} & \cdots & X_{10m2} \\ X_{1110} & X_{1111} & X_{1112} & X_{1120} & \cdots & X_{11m2} \\ X_{1210} & X_{1211} & X_{1212} & X_{1220} & \cdots & X_{12m2} \\ X_{2010} & X_{2011} & X_{2012} & X_{2020} & \cdots & X_{20m2} \\ \vdots & \vdots & \vdots & \vdots & \ddots & \vdots \\ X_{m210} & X_{m211} & X_{m212} & X_{m220} & \cdots & X_{m2m2} \end{bmatrix} \begin{bmatrix} w_{10} \\ w_{11} \\ w_{12} \\ w_{20} \\ \vdots \\ w_{m2} \end{bmatrix} = \begin{bmatrix} Y_{10} \\ Y_{11} \\ Y_{12} \\ Y_{20} \\ \vdots \\ Y_{m2} \end{bmatrix} \quad (40)$$

where m is a variable indicating a total number of prediction taps.

In the processing unit 66 shown in FIG. 23, the parameter h designating a horizontal resolution and parameter v designating a vertical resolution are set and the horizontal resolution and vertical resolution of an image can be adjusted by adjusting the values of the parameters h and v. However, the processing unit 66 may be designed such that the horizontal resolution and vertical resolution can be adjusted with a single parameter. For example, one parameter r is set which designates a horizontal resolution and vertical resolution. In this case, and r=1 is set to correspond to h=1 and v=1, r=2 is set to correspond to h=2 and v=2, . . . , or r=1 is set to correspond to h=1 and v=2, r=2 is set to correspond to h=2 and v=3, In this case, a generation equation for generation of additional data Wi (i=1 to n) may be a polynominal equation of the parameter r or the like.

Also, in the processing unit 66 shown in FIG. 23, the parameter h for designating a horizontal resolution and parameter v for designating a vertical resolution are set and the horizontal resolution and vertical resolution of an image can be adjusted by adjusting the values of multiple kinds of parameters h and v. However, the processing unit 66 may similarly be designated such that the above parameter r for designating a horizontal resolution and vertical resolution and parameter z for designating the aforementioned degree of noise elimination (noise suppression) can be set and the horizontal resolution and vertical resolution of an image and also the degree of noise elimination can be adjusted by adjusting the values of the multiple kinds of parameters r and z.

In this case, a generation equation intended for generation of the additional data Wi (i=1 to n) may be the following equation (41) or the like, a polynominal equation of different degrees or any other equation represented by another function:

$$W_1 = w_{10} + w_{11}r + w_{12}z + w_{13}r^2 + w_{14}rz + w_{15}z^2 + \quad (41)$$
$$w_{16}r^3 + w_{17}r^2z + w_{18}rz^2 + w_{19}z^3$$
$$W_2 = w_{20} + w_{21}r + w_{22}z + w_{23}r^2 + w_{24}rz + w_{25}z^2 +$$
$$w_{26}r^3 + w_{27}r^2z + w_{28}rz^2 + w_{29}z^3$$

-continued $$\vdots$$
$$W_i = w_{i0} + w_{i1}r + w_{i2}z + w_{i3}r^2 + w_{i4}rz + w_{i5}z^2 +$$
$$w_{i6}r^3 + w_{i7}r^2z + w_{i8}rz^2 + w_{i9}z^3$$
$$\vdots$$
$$W_n = w_{n0} + w_{n1}r + w_{n2}z + w_{n3}r^2 + w_{n4}rz + w_{n5}z^2 +$$
$$w_{n6}r^3 + w_{n7}r^2z + w_{n8}rz^2 + w_{n9}z^3$$

Coefficient type data as additional data in the generation equation including the parameters r and z can be generated by the coefficient type data generation unit 150 shown in FIG. 38 or the coefficient type data generation unit 150' shown in FIG. 41 similarly to the coefficient type data as additional data in the generation equation including the aforementioned parameters h and v.

In this case, the SD signal generation circuit 152 is supplied with the parameters r and z as control signals, and when SD signals are generated from HD signal, the horizontal and vertical bands of the SD signal and the state of noise addition to the SD signals are varied stepwise correspondingly to the values of the parameters r and z.

Figure 43:
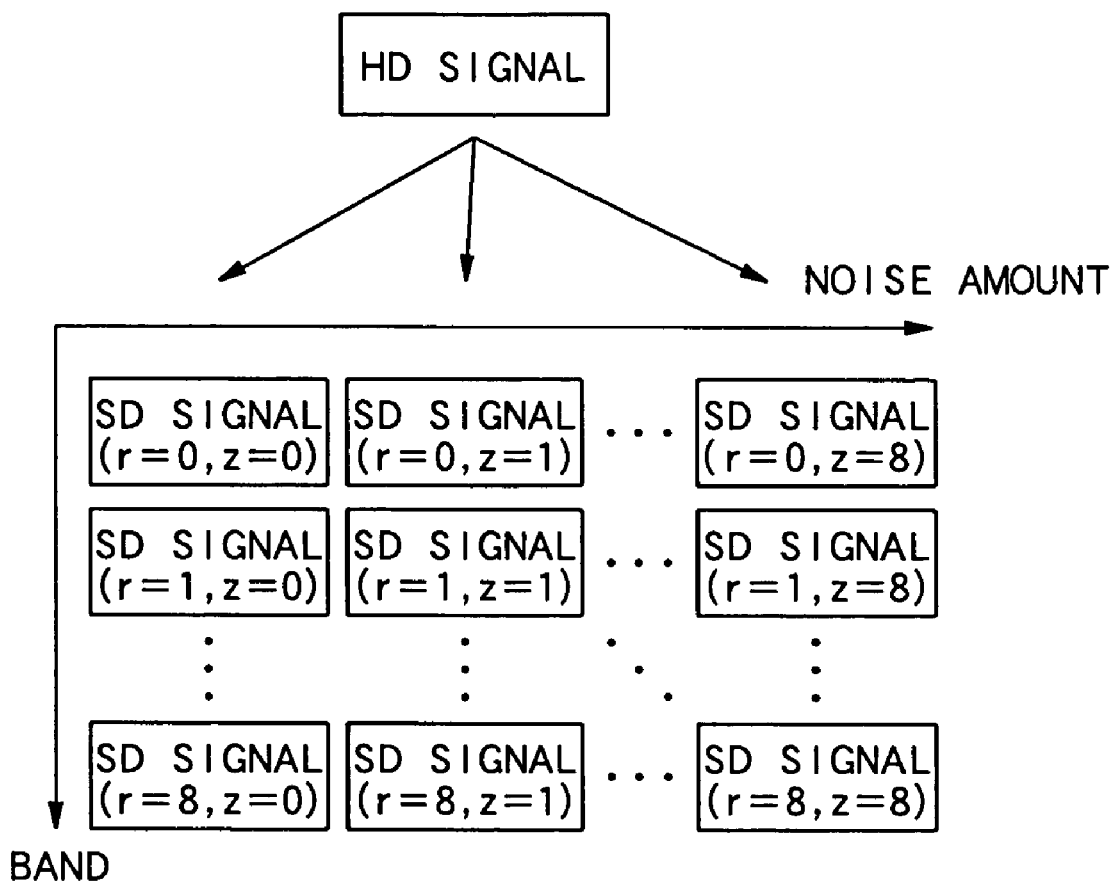
FIG. 43 shows an example generation of SD signal (parameters r and z).

FIG. 43 shows an example of the generation of SD signal corresponding to the parameters r and z. In this example, each of the parameters r and z is varied in nine steps to provide a total of 81 kinds of SD signals. It should be noted that the parameters r and z may be varied in more than 9 steps. In this case, the coefficient type data calculated will be improved in accuracy but an increased amount of calculation be required.

Also, in the processing unit 66 shown in FIG. 23, the parameter h for designating a horizontal resolution and parameter v for designating a vertical resolution are set and the horizontal resolution and vertical resolution of an image can be adjusted by adjusting the values of multiple kinds of parameters h and v. However, the processing unit 66 may also be designated such that a parameter z for designating the aforementioned degree of noise elimination (noise suppression) can be set in addition to the parameters h and v and the horizontal resolution and vertical resolution of an image and also the degree of noise elimination can be adjusted by adjusting the values of the multiple kinds of parameters h, v and z.

In this case, a generation equation intended for generation of the additional data Wi (i=1 to n) may be the following equation (42) or the like, a polynominal equation of different degrees or any other equation represented by another function:

$$W_1 = w_{1\_0} + w_{1\_1}v + w_{1\_2}h + w_{1\_3}z + w_{1\_4}v^2 + w_{1\_5}h^2 + \quad (42)$$
$$w_{1\_6}z^2 + w_{1\_7}vh + w_{1\_8}hz + w_{1\_9}zv + w_{1\_10}v^3 +$$
$$w_{1\_11}h^3 + w_{1\_12}z^3 + w_{1\_13}v^2h + w_{1\_14}vh^2 + w_{1\_15}vhz +$$
$$w_{1\_16}vz^2 + w_{1\_17}h^2z + w_{1\_18}hz^2 + w_{1\_19}z^3$$
$$W_2 = w_{2\_0} + w_{2\_1}v + w_{2\_2}h + w_{2\_3}z + w_{2\_4}v^2 + w_{2\_5}h^2 +$$
$$w_{2\_6}z^2 + w_{2\_7}vh + w_{2\_8}hz + w_{2\_9}zv + w_{2\_10}v^3 +$$
$$w_{2\_11}h^3 + w_{2\_12}z^3 + w_{2\_13}v^2h + w_{2\_14}vh^2 + w_{2\_15}vhz +$$
$$w_{2\_16}vz^2 + w_{2\_17}h^2z + w_{2\_18}hz^2 + w_{2\_19}z^3$$
$$\vdots$$

-continued $$W_i = w_{i\_0} + w_{i\_1}v + w_{i\_2}h + w_{i\_3}z + w_{i\_4}v^2 + w_{i\_5}h^2 +$$
$$w_{i\_6}z^2 + w_{i\_7}vh + w_{i\_8}hz + w_{i\_9}zv + w_{i\_10}v^3 +$$
$$w_{i\_11}h^3 + w_{i\_12}z^3 + w_{i\_13}v^2h + w_{i\_14}vh^2 + w_{i\_15}vhz +$$
$$w_{i\_16}vz^2 + w_{i\_17}h^2z + w_{i\_18}hz^2 + w_{i\_19}z^3$$
$$\vdots$$
$$W_n = w_{n\_0} + w_{n\_1}v + w_{n\_2}h + w_{n\_3}z + w_{n\_4}v^2 + w_{n\_5}h^2 +$$
$$w_{n\_6}z^2 + w_{n\_7}vh + w_{n\_8}hz + w_{n\_9}zv + w_{n\_10}v^3 +$$
$$w_{n\_11}h^3 + w_{n\_12}z^3 + w_{n\_13}v^2h + w_{n\_14}vh^2 + w_{n\_15}vhz +$$
$$w_{n\_16}vz^2 + w_{n\_17}h^2z + w_{n\_18}hz^2 + w_{n\_19}z^3$$

Coefficient type data as additional data in the generation equation including the parameters h, v and z can be generated by the coefficient type data generation unit 150 shown in FIG. 38 or the coefficient type data generation unit 150' shown in FIG. 41 similarly to the coefficient type data as additional data in the generation equation including the aforementioned parameters h and v.

In this case, the SD signal generation circuit 152 is supplied with the parameters h, v and z as control signals, and when SD signals are generated from HD signal, the horizontal and vertical bands of the SD signal and the state of noise addition to the SD signals are varied stepwise correspondingly to the values of the parameters h, v and z.

Figure 44:
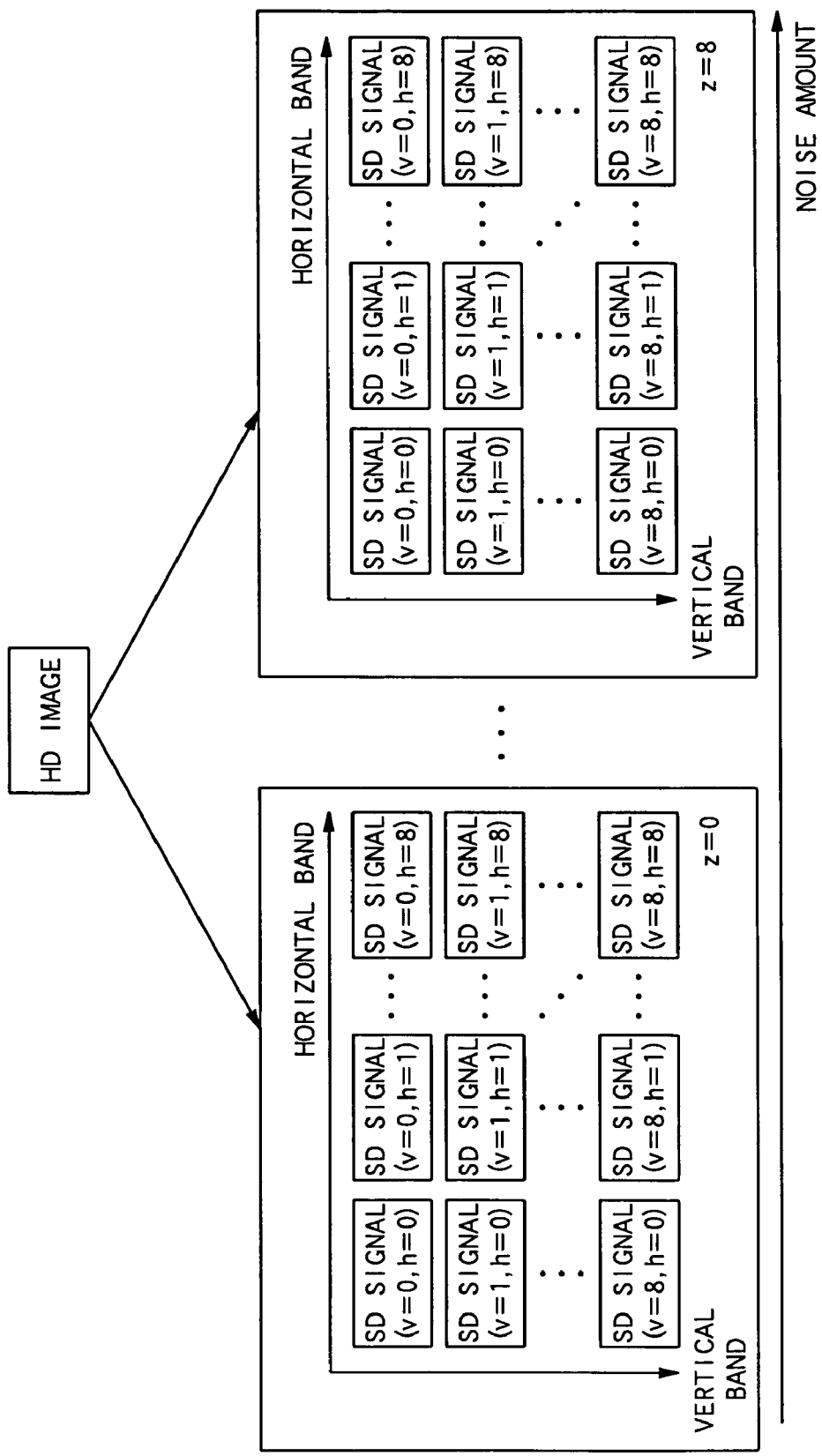
FIG. 44 shows an example generation of SD signal (parameters h, v and z).

FIG. 44 shows an example of the generation of SD signal corresponding to the parameters r, h and z. In this example, each of the parameters h, v and z is varied in nine steps to provide a total of 729 kinds of SD signals. It should be noted that the parameters h, v and z may be varied in more than 9 steps. In this case, the coefficient type data calculated will be improved in accuracy but an increased amount of calculation be required.

Figure 45:
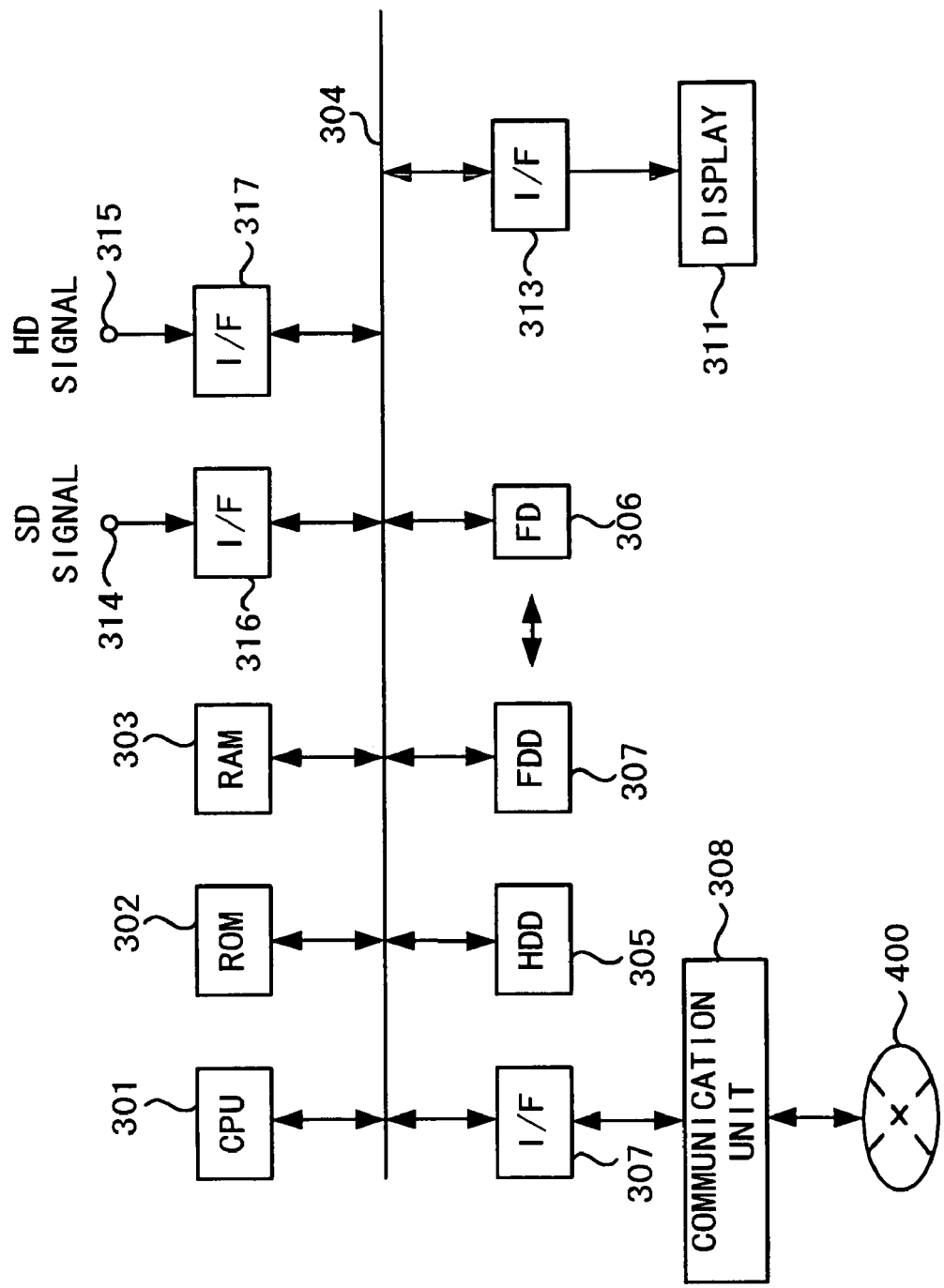
FIG. 45 is a block diagram of a video signal processor as a software, showing the construction of the video signal processor.

Note that the operations made in the processing unit 66 shown in FIG. 23 can also be implemented by software in a video signal processor 300 shown in FIG. 45 for example.

First, the video signal processor 300 shown in FIG. 45 will be explained. The video signal processor 300 includes a CPU 301 which controls the system operation, ROM (read-only memory) 302 having stored therein operation programs for the CPU 301 and coefficient type data, etc., and a RAM (random access memory) 303 as a work area of the CPU 301. Each of the CPU 301, ROM 302 and RAM 303 is connected to a bus 304.

Also, the video signal processor 300 includes a hard disk drive (HDD) 305 as an external storage unit and a flexible disk drive (FDD) 307 to drive a flexible disk 306. Each of these drives 305 and 307 is connected to the bus 304.

Also, the video signal processor 300 includes a communication unit 308 which connects to a communication network 400 such as the Internet by cable or wirelessly. The communication unit 308 is connected to the bus 304 via an interface 309.

Further, the video signal processor 300 has an input terminal 314 at which SD signal is supplied, and an output terminal 315 from which HD signal is supplied to outside. The input terminal 314 is connected to the bus 304 via an interface 316, and also the output terminal 315 is similarly connected to the bus 304 via an interface 317.

Note that the processing programs, coefficient type data, etc. may not be prestored in the ROM 302 but may be downloaded from the communication network 400 such as the Internet via the communication unit 308 and stored in the hard disk and RAM 303 for use in the video signal processor 300. Also, such processing programs, coefficient type data, etc. may be recorded to the flexible disk 306 for distribution to the users.

Also, SD signal to be processed may not be supplied at the input terminal 314 to the video signal processor 300 but may be prerecorded to the hard disk or downloaded from the communication network 400 such as the Internet via the communication unit 308. Also, HD signal after processed may not be delivered at the output terminal 315 but may be supplied to a display 311 for display on the screen of the latter, stored into the hard disk or sent to the communication network 400 such as the Internet via the communication unit 308, while it is delivered at the output terminal 315.

The video signal processor 300 shown in FIG. 45 generates HD signal from SD signal as will be explained herebelow with reference to a flow chart in FIG. 46.

First in step ST1, the video signal processor 300 starts operating. In step ST2, the video signal processor 300 is supplied with SD pixel data in units of a frame or field. In case the SD pixel data is supplied at the input terminal 314, the video signal processor 300 will provisionally store the SD pixel data into the RAM 303. In case the SD pixel data is recorded in the hard disk, the video signal processor 300 will read the SD pixel data by means of the hard disk drive 307, and store the data into the RAM 303. In step ST3, the video signal processor 300 judges whether all frames or fields of the input SD pixel data have completely been processed. When the processing is over, the video signal processor 300 exits the procedure in step ST4. If the process is not yet over, the video signal processor 300 will got to step ST5.

In step ST5, the video signal processor 300 reads image quality designation values (e.g., parameters h and v, etc.) from the RAM 303 for example. Then, in step ST6, the video signal processor 300 generates additional data Wi in an estimate equation (see the aforementioned equation (4)) for each class by the generation equation (e.g., the equation (5)) with the use of the read image quality designation values and coefficient type data for each class.

Next in step ST7, the video signal processor 300 acquires pixel data in a class tap and prediction tap from SD pixel data supplied in step ST2 correspondingly to each HD pixel data to be generated. Then in step ST8, the video signal processor 300 judges whether the operation for acquisition of HD pixel data has completely been done in areas of the input SD pixel data. When the operation is over, the video signal processor 300 returns to step ST2 where it will shift to an operation for input of SD pixel data in a next frame or field. On the other hand, if the result of judgment is negative, the video signal processor 300 will got to step ST9.

In step ST9, the video signal processor 300 generates a class code CL from SD pixel data in the class tap acquired in step ST7. Then in step ST10, the video signal processor 300 generates HD pixel data by an estimate equation with the use of additional data corresponding to the class code CL and SD pixel data in the prediction tap. Thereafter, the video signal processor 300 returns to step ST7 where it will repeat the aforementioned similar operations.

Figure 46:
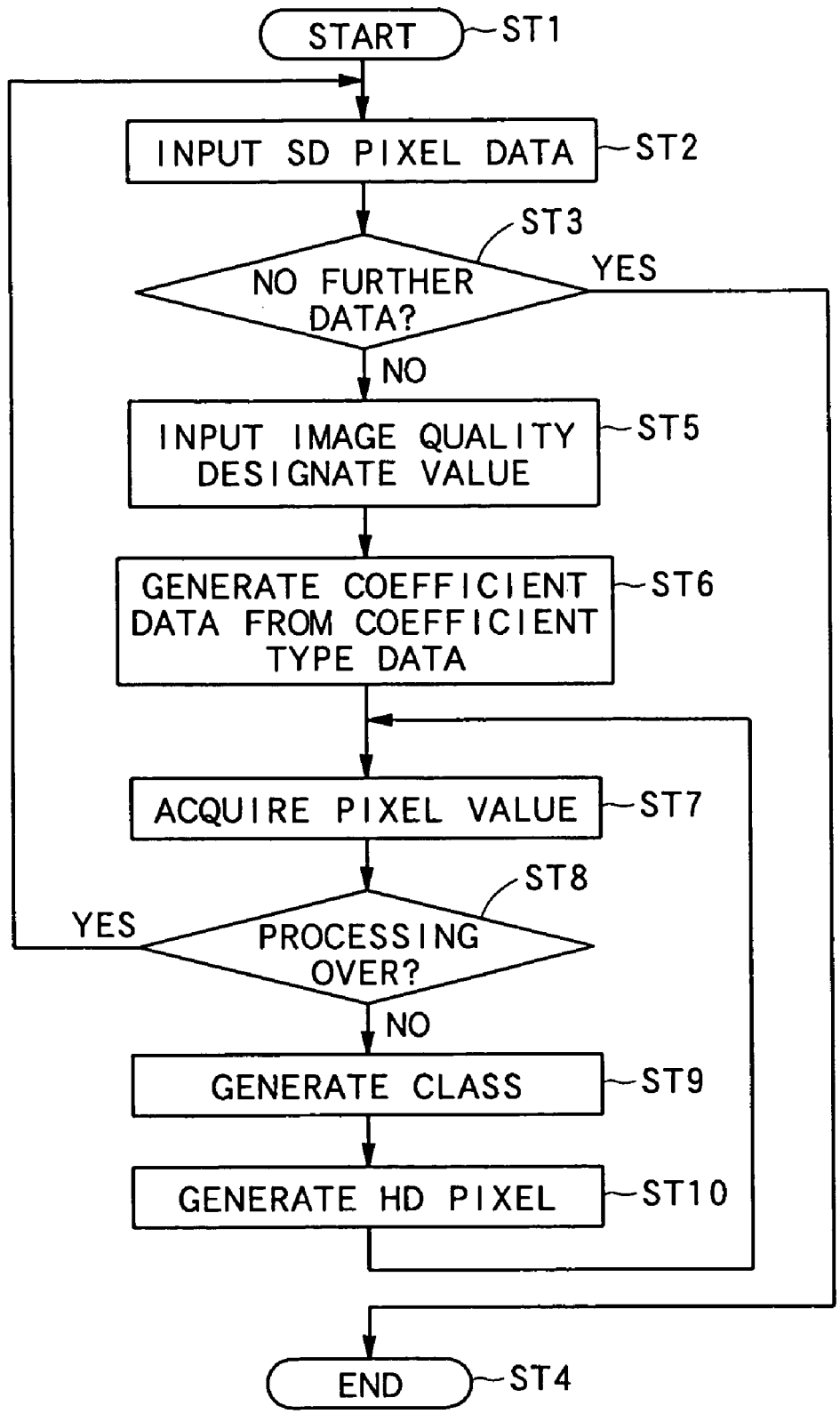
FIG. 46 shows a flow of video signal processing steps.

The video signal processor 300 can process SD pixel data forming input SD signal, as in the flow chart in FIG. 46, to generate HD pixel data forming HD signal. As above, the HD signal thus provided is delivered at the output terminal 315, supplied to the display 311 for display on the screen of the latter or supplied to the hard disk drive 305 where it will be recorded to the hard disk.

The operations in the coefficient type data generation unit 150 shown in FIG. 38 can also be performed by software. The processor is not illustrated.

The procedure for generation of coefficient type data as will be explained below with reference to a flow chart shown in FIG. 47.

First in step ST21, the processor starts the procedure. In step ST22, the processor selects an image quality pattern (identified with parameters h and v, for example) which is to be used in learning. Then in step ST23, the processor judges whether the learning has been completed for all the image quality patterns. If the result of judgment is negative, the processor will go to step ST24.

In step ST24, the processor is supplied with known HD pixel data in units of a frame or field. Then in step ST25, the processor judges whether the processing has completely been done for all the HD pixel data. When the processing is over, the processor will return to step ST22 where it will select a next image quality pattern and repeat the similar operations to the above. On the processor goes to step ST26.

In step ST26, the processor generates SD pixel data from HD pixel data supplied in step ST24 on the basis of an image quality pattern selected in step ST22. Then in step ST27, the processor acquires pixel data in a class tap and prediction tap from SD pixel data generated in step ST26 on the basis of each HD pixel data supplied in step ST24. In step ST28, the processor judges whether learning has completely been done in all areas of the generated SD pixel data. When the learning is over, the processor returns to step ST24 where it will be supplied with a next HD pixel data and repeat the similar operations. On the contrary, if the learning is not yet over, the processor goes to step ST29.

In step ST29, the processor generates a class code CL from SD pixel data in the class tap acquired in step ST27. Then in step ST30, the processor generates a normal equation (see the aforementioned equation (13)). Thereafter, the processor returns to step ST27.

Also, if it is determined in step ST23 that the learning has been completed of all the image quality patterns, the processor goes to step ST31 where it will calculate coefficient type data for each class by solving the normal equation by flushing or the like. In step ST32, the process stores the coefficient type data into the memory. Then in step ST33, the processor exits the procedure.

Figure 47:
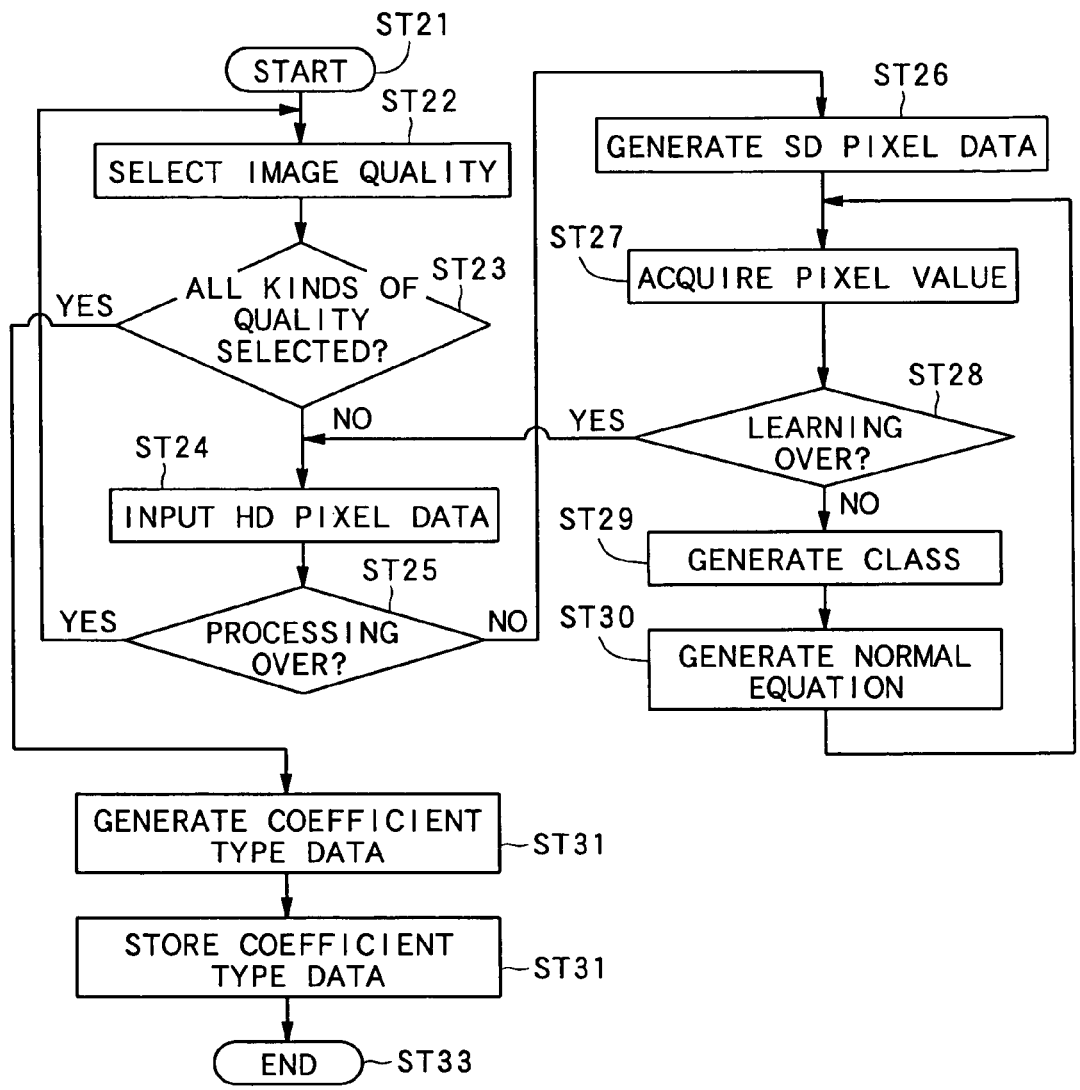
FIG. 47 shows a flow of coefficient type data generation steps (1).

By going through the flow chart in FIG. 47, it is possible to provide coefficient type data for each class as in the coefficient type data generation unit 150 shown in FIG. 38.

The operations in the coefficient type data generation unit 150' shown in FIG. 41 can also be performed by software. The processor is not illustrated.

The procedure for generation of coefficient type data as will be explained below with reference to a flow chart shown in FIG. 48.

First in step ST41, the processor starts the procedure. In step ST42, the processor selects an image quality pattern (identified with parameters h and v, for example) which is to be used in learning. Then in step ST43, the processor judges whether additional data have completely been calculated for all the image quality patterns. If the result of judgment is negative, the processor will go to step ST44.

In step ST44, the processor is supplied with known HD pixel data in units of a frame or field. Then in step ST45, the processor judges whether all the HD pixel data have completely been processed. When the result of judgment is negative, the processor goes to step ST46 where in will generate SD pixel data from the HD pixel data supplied in step ST44 on the basis of the image quality pattern selected in step ST42.

Then in step ST47, the processor acquires pixel data in a class tap and prediction tap from the SD pixel data generated in step ST46 correspondingly to each HD pixel data supplied in step ST44. In step ST48, the processor judges whether learning has completely been done in all areas of the generated SD pixel data. When the learning has been completed, the processor returns to step ST44 where it will be supplied with a next HD pixel data and repeat the similar operations. On the contrary, if the result of judgment is negative, the processor goes to step ST49.

In step ST49, the processor generates a class code CL from SD pixel data in the class tap acquired in step ST47. Then in step ST50, the processor generates a normal equation (see the aforementioned equation (21)) intended for acquisition of additional data. Thereafter, the processor returns to step ST47.

If it is determined in step ST45 that all the HD pixel data have been processed, the processor goes to step ST51 where it will calculate additional data for each class by solving the normal equation generated in step ST50 by flushing or the like. Thereafter, the processor returns to step ST42 where it will select a next image quality pattern and repeat the similar operations to acquire additional data for each class corresponding to the next image quality pattern.

If it is determined in step ST43 that additional data for all image quality patterns have been calculated, the processor goes to step ST52 where it will generate a normal equation (see the aforementioned equation (26)) intended for acquisition of coefficient type data from the additional data for all the image quality patterns.

Then in step ST53, the processor calculates coefficient type data for each class by solving the normal equation generated in step ST52. In step ST54, the processor stores the coefficient type data into the memory. Then in step ST55, the processor exits the procedure.

Figure 48:
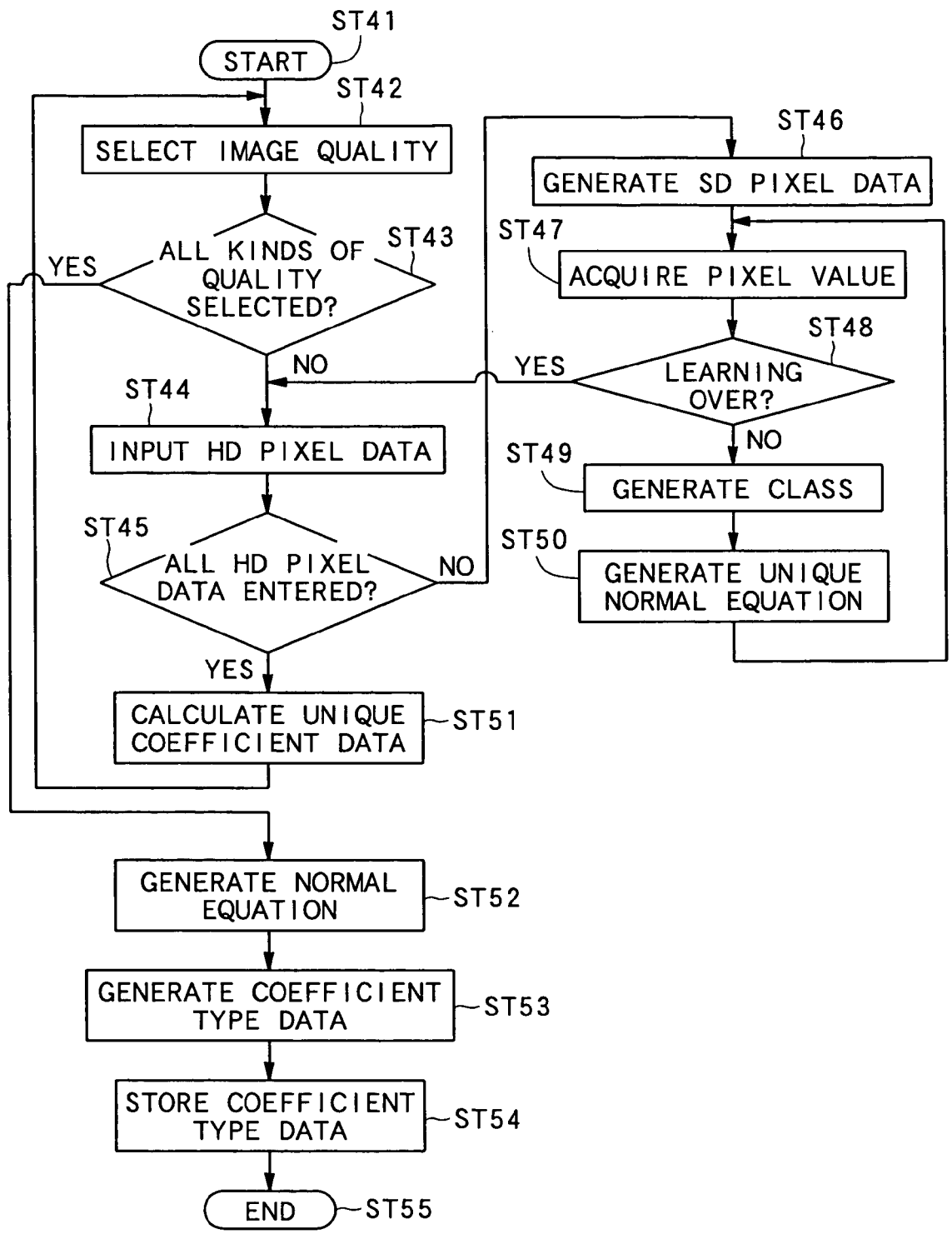
FIG. 48 shows a flow of coefficient type data generation steps (2).

By going through the flow chart in FIG. 48, it is possible to provide coefficient type data for each class as in the coefficient type data generation unit 150' shown in FIG. 41.

In the aforementioned examples, the estimate equation for generation of HD signal is a linear equation, to which however the present invention is not limited. For example, the estimate equation may be a high-degree equation.

Also, in the aforementioned embodiments, SD signal (525i) is converted into HD signal (525p or 1050i). However, the present invention is not limited to this conversion but of course it is similarly applicable to conversion, using an estimate equation, of a first video signal into a second video signal.

Also, in the aforementioned examples, the information signal is video signal. However, the present invention is not limited to any video signal but may be similarly applied to audio signal as the information signal, for example.

With the "classification/adaptation" technique, additional data in an estimate equation used in converting a first information signal into a second information signal is generated using coefficient type data and it is possible to adjust an output quality of the second information signal, for example, the quality of an image, to provide a stepless or smooth image. In this case, since additional data for each class, corresponding to parameters upon which the output quality depends, can be generated at each time with the use of coefficient type data, any memory is required for storage of a large amount of additional data.

Also with the "classification/adaptation" technique, a sum of additional data in an estimate equation, generated from coefficient type data, is calculated and information data on a point of interest, generated using the estimate equation, is normalized by dividing it by the sum, whereby it is made possible to eliminate a variation in level of the information data on the point of interest, caused by a truncation error taking place in acquiring additional data in the estimate equation by a generation equation using the coefficient type data.

Business Model According to the Present Invention

Figure 49:
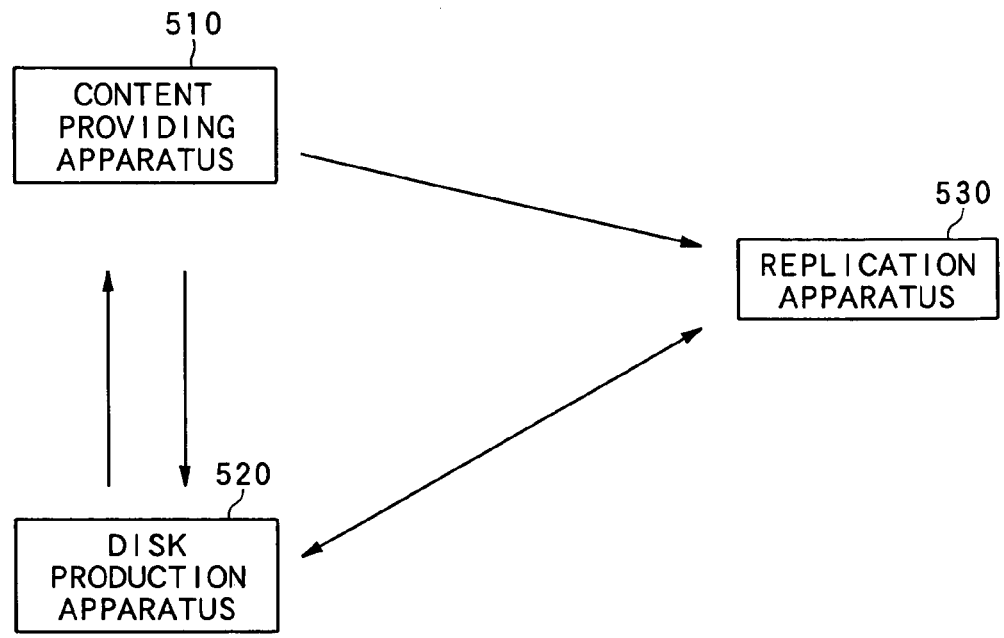
FIG. 49 is a block diagram explaining a business model according to the present invention.

The relation among a content providing apparatus 510, disk production apparatus 520 and replication apparatus 530 in a business model according to the present invention will be discussed herebelow with reference to FIG. 49. The content providing apparatus 510 is to provide information recorded in a recording medium. The disk production apparatus 520 is to produce a disk-shaped recording medium having no information recorded therein. The replication apparatus 530 is to record information provided from the content providing apparatus 510 to the disk-shaped recording medium having no information recorded therein. It is assumed herein that the content providing apparatus 510, disk production apparatus 520 and replication apparatus 530 are owned and operated by different persons.

Figure 50:
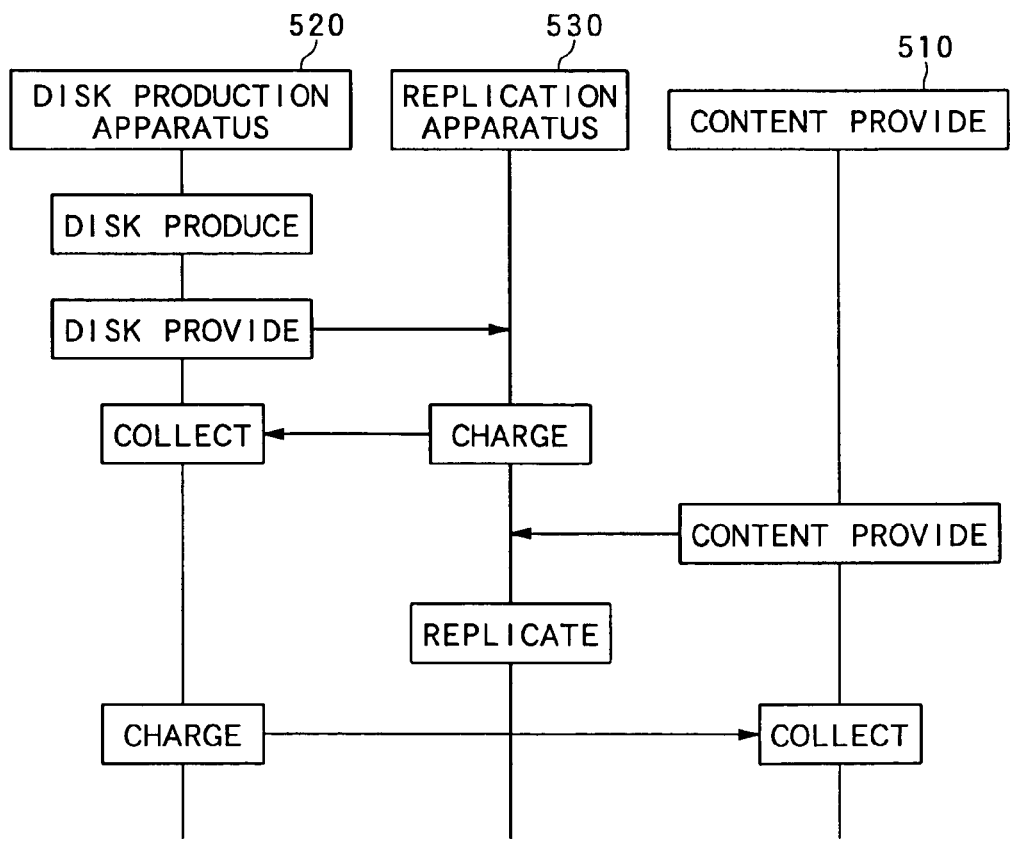
FIG. 50 shows a flow chart explaining the business model.

As shown in FIG. 50, the disk production apparatus (disk producer) 520 produces a disk-shaped recording medium, and provides the disk-shaped recording medium to the replication apparatus (replicating person) 530. At this time, the replication apparatus (replicating person) 530 is charged for the provided disk-shaped recording medium and the disk production apparatus (disk producer) 520 collects the corresponding money. The charged money contains a cost of the disk-shaped recording medium and a fee for a content replication which is to be done later).

The content providing apparatus (content provider) 510 provides information (content) to the replication apparatus (replicating person) 530 for replication of the information. The disk-shaped recording medium thus replicated has basic information and additional information recorded therein according to the present invention having so far been described. At this time, the disk production apparatus (disk producer) 520 is charged for the provided content and the content providing apparatus (content provider) 510 collects the charged money. The charged money contain a fee for content replication.

Thus, the replication apparatus (replicating person) 530 has only to pay a money to the disk production apparatus (disk producer) 520, but the pay contains a due money to the disk production apparatus (disk producer) 320 and a one to the content provision apparatus (content provider) 510.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

In the recording medium and playback apparatus according to the present invention, read information is superior in quality to basic information. So, the read information contains a larger amount of information than the basic information. So, recording of the read information as it is needs a disk-shaped recording medium having a sufficiently large capacity of storage.

That is, the present invention can provide a recording medium and a playback apparatus for the recording medium, in which recorded data is difficult to copy.

The invention claimed is:

1. A non-transitory recording medium comprising: a first recording area where basic data is recorded; a second recording area where a plurality of additional data which is information to be processed with the basic data recorded in the first recording area are recorded, wherein the basic data is processed with respect to each basic data;

the additional data is selected from among the plurality of additional data in accordance with a nature of the each basic data and external selected signal, the external selected signal being external to the first recording area and being external to the second recording area and the selected additional data is processed with the each basic data, wherein the external selected signal comprises bodily information and/or environmental information; and read information, generated by a predetermined processing corresponding to the external selected signal, based on the basic data recorded in the first recording area and additional data recorded in the second recording area, being superior in quality to basic information generated based on the basic data recorded in the first recording area.

2. The non-transitory recording medium as set in claim 1, wherein: the basic information is video information; and the read information is higher quality due to higher in spatial resolution than the basic information.

3. The non-transitory recording medium as set forth in claim 1, wherein: the basic information is video information; and the read information is higher quality because the basic information having oscillation information is added thereto.

4. The non-transitory recording medium as set forth in claim 1, wherein the recording medium is designed as an optical disk from which recorded data is read by an optical pickup head, wherein the second recording area changes the nature of a light beam irradiated from the optical pickup head and reflects the light beam.

5. The non-transitory recording medium as set forth in claim 1, wherein the additional information is generated by a classification/adaptation.

6. A recording medium formed as an optical disk from which data is read by an optical pickup head, the recording medium having:

a first recording area where basic data is recorded;

a second recording area where a plurality of additional data to be processed with the basic data recorded in the first recording area is recorded in a format different from that in the first recording area are recorded, wherein the basic data is processed with respect to each basic data;

the additional data is selected from among the plurality of additional data in accordance with a nature of the each basic data and external selected signal, the external selected signal being external to the first recording area and being external to the second recording area and the selected additional data is processed with the each basic data, wherein the external selected signal comprises bodily information and/or environmental information; and read information generated by a predetermined processing corresponding to the external selected signal, based on the basic data recorded in the first recording area and additional data recorded in the second recording area being superior in quality to basic information generated from the basic data recorded in the first recording area.

7. The recording medium as set in claim 6, wherein:
the basic information is video information; and
the read information is higher quality due to higher spatial resolution than the basic information.

8. The recording medium as set forth in claim 6, wherein:
the basic information is video information; and
the read information is higher quality due to the basic information having oscillation information added thereto.

9. The recording medium as set forth in claim 6, wherein the recording medium is designed as an optical disk from which recorded data is read by an optical pickup head,
wherein the second recording area changes the nature of a light beam irradiated from the optical pickup head and reflects the light beam.

10. The recording medium as set forth in claim 6, wherein the additional information is generated by a classification/adaptation.

11. A playback apparatus for reading information from a recording medium, the recording medium comprising:
a first recording area where basic data is recorded;
a second recording area where a plurality of additional data which is information to be processed with the basic data recorded in the first recording area are recorded,
wherein the basic data is processed with respect to each basic data;
the additional data is selected from among the plurality of additional data in accordance with a nature of the each basic data and external selected signal, the external selected signal being external to the first recording area and being external to the second recording area and the selected additional data is processed with the each basic data, wherein the external selected signal comprises bodily information and/or environmental information; and
read information generated by a predetermined processing corresponding to the external selected signal, based on the basic data recorded in the first recording area and additional data recorded in the second recording area being superior in quality to basic information generated from the basic data recorded in the first recording area,
the playback apparatus comprising:
a first data acquisition means for acquiring the basic data from the first recording area of the recording medium;
a second data acquisition means for acquiring the additional data from the second recording area of the recording medium; and
a playback means for generating the read information on the basis of the basic data and additional data acquired by the first and second data acquisition means, respectively.

12. The playback apparatus as set forth in claim 11, wherein the additional data acquired by the second data acquisition means is generated by a classification/adaptation.

13. The playback apparatus as set in claim 11, wherein:
the basic information is video information; and
the read information is higher quality due to higher spatial resolution than the basic information.

14. The playback apparatus as set forth in claim 11, wherein:
the basic information is video information; and
the read information is higher quality due to the basic information having oscillation information added thereto.

15. The playback apparatus as set forth in claim 11, wherein the recording medium is designed as an optical disk from which recorded data is read by an optical pickup head,
wherein the second recording area changes the nature of a light beam irradiated from the optical pickup head and reflects the light beam.

16. The playback apparatus as set forth in claim 11, wherein the additional information is generated by a classification/adaptation.

17. A playback apparatus in which there is to be loaded a recording medium the recording medium comprising:
a recording layer where basic data is recorded by pits;
a step-like portion formed in a part of each pit in the recording layer, laser light which is to be focused in a position not included in the recording layer being irradiated from the step-like portion and a plurality of additional data to be processed with the basic data being read by detecting a reflected light of the laser light,
wherein the basic data is processed with respect to each basic data;
the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information; and
read information generated by a predetermined processing corresponding to the external selected signal, based on the basic data and additional data being superior in quality to basic information generated from the basic data,
the playback apparatus comprising:
a laser light irradiating means for irradiating laser light to the recording medium;
a reflected light detecting means for detecting a reflected light of the laser light irradiated from the laser light irradiating means from the recording medium;
a focus control means for selecting, based on the result of reflected light detection from the reflected light detecting means, either a first mode in which the laser light irradiated from the laser light irradiating means is focused on the recording layer of the recording medium or a second mode in which the laser light is focused in a position not included in the recording layer of the recording medium;
a tracking control means for guiding the laser light irradiated from the laser light irradiating means to a recording track on the recording medium on the basis of the result of detection of reflected light from the reflected light detecting means;
a first decoding means for decoding the basic information from the basic data on the basis of the result of detection of reflected light from the reflected light detecting means;
a second decoding means for decoding the additional information from the additional data on the basis of the result of detection of reflected light from the reflected light detecting means when the focus control means has selected the second mode; and
a playback means for reading the read information on the basis of the basic and additional data decoded by the first and second decoding means, respectively.

18. The playback apparatus as set forth in claim 17, wherein:
the focus control means generates an astigmatism in a reflected light from the recording medium and detects the magnitude and direction of the astigmatism by a tetrameric photosensor, to generate a focus error signal based on the magnitude of astigmatism; and the second mode is carried out by applying a focus servo so that the focus error signal will have a constant value other than zero.

19. The playback apparatus as set forth in claim 17, wherein:

the recording layer is formed from at least first and second recording layers stacked one on the other, the step-like portion is formed in a part of each bit in the first and second recording layers, the additional data is detected by the laser beam focused in a position between the first and second recording layers; and the second decoding means decodes the additional information from the additional data on the basis of the result of detection of reflected light by the reflected light detection means while the focus control means is focusing the laser light between the first and second recording layers with the second mode being selected.

20. The playback apparatus as set forth in claim 17, wherein the basic and additional data are digital data.

21. The playback apparatus as set forth in claim 17, wherein the basic and additional data are analog data.

22. A playback apparatus in which there is to be loaded a recording medium, the recording medium comprising:

a recording layer where basic data is recorded by pits;

a step-like portion formed in a part of each pit in the recording layer, laser light which is to be focused in a position not included in the recording layer being irradiated from the step-like portion and a plurality of additional data to be processed with the basic data being read by detecting a reflected light of the laser light, wherein the basic data is processed with respect to each basic data;

the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information; and read information generated by a predetermined processing corresponding to the external selected signal, based on the basic data and additional data being superior in quality to basic information generated from the basic data, the playback apparatus comprising:

a laser light irradiating means for irradiating laser light to the recording medium;

detecting a reflected light of the laser light from the recording medium;

selecting, based on the result of detection the reflected light, either a first mode in which the laser light is focused on the recording layer of the recording medium or a second mode in which the laser light is focused in a position not included in the recording layer of the recording medium; decoding the basic information from the basic data on the basis of the result detection of reflected light;

decoding the additional information from the additional data on the basis of the result of detection of reflected light when the second mode is selected.

23. A recording medium production apparatus comprising:

an encoding means for encoding basic information to provide basic data while encoding a plurality of additional information to be processed with the basic data to provide additional data;

wherein the basic data is processed with respect to each basic data;

the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information;

a reflected light calculation means for calculating the shape of pits by which the basic data is recorded to a recording layer of a recording medium, calculating the shape of the step-like portions formed in the recording layer and by which the additional data is recorded and calculating, on the basis of the results of calculation of pit and step-like portion shapes, a reflected light resulted from a laser beam to be focused in a position not included in the recording layer in which the pits and step-like portions are formed is irradiated to the recording layer;

a comparison means for making a comparison between data read from the reflected light calculated by the reflected light calculation means and the additional data;

an additional data control means for controlling the additional data on the basis of the comparison result from the comparison means to correct the step-like portion shape and provide coincidence between the data read from the reflected light calculated by the reflected light calculation means and the additional data;

a synthetic data generating means for generating synthetic data by combining the basic data and the additional data controlled by the additional data control means; and a recording means for forming the pits and step-like portions in a recording layer of a master disk on the basis of the synthetic data generated by the synthetic data generating means.

24. The recording medium production apparatus as set forth in claim 23, wherein:

in the reflected light calculation means, the recording layer is formed from at least first and second recording layers stacked one on the other, the laser beam being calculated on the assumption that it is focused in a position between the first and second recording layers; and the recording means forms the pits and step-like portions formed in the first recording layer in the recording layer of a first master disk, while forming the pits and step-like portions formed in the second recording layer in the recording layer of a second master disk.

25. The recording medium production apparatus as set forth in claim 24 wherein the encoding means is supplied with basic information as digital data, and generates basic data by error-correction encoding of the basic information, EFM modulation of the error-correction coded data and sub-coding the EFM-modulated data.

26. A recording medium production method comprising the steps of:

encoding basic information to provide basic data while encoding a plurality of additional information to be processed with the basic data to provide additional data, wherein the basic data is processed with respect to each basic data;

selecting the additional data from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information;

calculating the shape of pits by which the basic data is recorded to a recording layer of a recording medium, calculating the shape of step-like portions formed in the recording layer and by which the additional data is recorded and calculating, on the basis of the results of calculation of pit and step-like portion shapes, a reflected light resulted from a laser beam to be focused in a position not included in the recording layer in which the pits and step-like portions are formed is irradiated to the recording layer;

comparing data read from the calculated reflected light and the additional data;

controlling the additional data on the basis of the comparison result from the comparison means to correct the step-like portion shape and provide coincidence between the data read from the reflected light calculated in the reflected light calculation step and the additional data;

generating synthetic data by combining the basic data and the controlled additional data; and forming the pits and step-like portions in a recording layer of a master disk on the basis of the generated synthetic data.

27. The recording medium as set forth in claim 1, wherein:

the first recording area is a first recording layer formed from a magnetic material and to which the basic data is recorded as a change of the magnetized direction and from which the basic data is read as a change in polarized direction of the reflected light of the irradiated light beam; and the second recording area is a second recording layer formed in a stacked relation on the first recording area and to which the additional data to be added to the basic data is recorded as a change in transmittance and from which the additional data is read as a change in amount of the reflected light of the irradiated light beam having been transmitted through it, reflected by the first recording area and transmitted through it again.

28. The recording medium as set forth in claim 27, wherein the second recording layer contains crystals which scatter the light beam and the amount of the reflected light is changed according to the density of the crystals.

29. The recording medium as set forth in claim 28, wherein:

the basic data is video data; and the additional data improves the quality of an image reproduced based on the video data.

30. The recording medium as set forth in claim 28, wherein:

the basic data is video data; and the additional data is coefficient data preset for calculation of the video data.

31. The recording medium as set forth in claim 27, wherein the additional information is generated by a classification/adaptation.

32. A recording medium having:

a first recording layer having formed thereon pits corresponding to basic data, where the basic data is recorded by the pits and from which the basic data is read as a change in amount of a reflected light of a light beam irradiated to the first recording layer;

a second recording layer formed on the first recording layer, where a plurality of additional data to be processed with the basic data is recorded as a change in transmittance of the second recording layer and from which the additional data is read as a change in amount of reflected light resulted from the irradiated light beam passing through the second recording layer, being reflected by the first recording layer and passing again through the second recording layer, wherein the basic data is processed with respect to each basic data;

the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information; and read information generated by a predetermined processing corresponding to the external selected signal, based on the basic data and additional data being superior in quality to basic information generated from the basic data.

33. The recording medium as set forth in claim 31, wherein:

the basic data is video data; and the additional data improves the quality of an image reproduced based on the video data.

34. The recording medium as set forth in claim 31, wherein:

the basic data is video data; and the additional data is coefficient data preset for calculation of the video data.

35. A playback apparatus for a recording medium the recording medium comprising:

a first recording layer where basic data is recorded and a second recording layer formed on the first recording layer and where a plurality of information to be processed with the basic data is recorded, wherein the basic data is processed with respect to each basic data;

the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information;

read information generated by a predetermined processing corresponding to the external selected signal, based on the basic data and additional data being superior in quality to basic information generated from the basic data, the playback apparatus comprising:

a laser light irradiating means for irradiating laser light to the recording medium;

a reflected light detecting means for detecting a reflected light of the laser light irradiated from the laser light irradiating means from the recording medium;

a first decoding means for reading the basic data on the basis of the result of detection of reflected light from the reflected light detecting means to decode the basic information from the basic data;

a second decoding means for decoding the additional data on the basis of the result of detecting of reflected light from the reflected light detecting means to decode the additional information from the additional data; and a playback means for reading the read information on the basis of the basic and additional data decoded by the first and second decoding means, respectively.

36. The playback apparatus as set forth in claim 35, wherein:

the additional data is recorded as a change of transmittance to the second recording layer of the recording medium and read, from the second recording layer, as a change in amount of the reflected light of the irradiated light beam having been transmitted through the second recording layer, reflected by the first recording layer and transmitted through the second recording layer again; and the reflected light detecting means detects the amount of the reflected light.

37. The playback apparatus as set forth in claim 36, wherein:

the first recording layer of the recording medium is formed from the magnetic material, the basic data is recorded, to the first recording layer, as a change of the magnetized direction and is read, from the first recording layer, as a change in polarized direction of the reflected light of the irradiated light beam; and the reflected light detecting means detects also the polarized direction of the reflected light.

38. The playback apparatus as set forth in claim 37, wherein the reflected light detecting means includes:

a polarizing beam splitter upon which the reflected light is incident and which splits the reflected light into first and second parts correspondingly to components of the polarized direction of the reflected light;

a first light amount detector to detect the amount of the first reflected light part;

a second light amount detector to detect the amount of the second reflected light part; and a comparator to make a comparison between the results of light amount detection by the first and second light amount detectors; and wherein the polarized direction of the reflected light is detected based on the result of comparison by the comparator.

39. The playback apparatus as set forth in claim 36, wherein the first recording layer of the recording medium has formed therein pits corresponding to the basic data, basic data is recorded as the pits and the basic data is read as a change in amount of the reflected light of the irradiated light beam.

40. The playback apparatus as set forth in claim 35, wherein:

the basic data is video data; and the additional data improves the quality of an image reproduced based on the video data.

41. The playback apparatus as set forth in claim 35, wherein the basic data is video data; and the additional data is coefficient data preset for calculation of the video data.

42. A recording apparatus for a recording medium the recoding medium comprising:

a first recording layer where basic data is recorded; and a second recording layer formed on the first recording layer and where a plurality of additional data to processed with the basic data is to be recorded, wherein the basic data is processed with respect to each basic data;

the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information;

read information generated by a predetermined processing corresponding to the external selected signal, based on the basic data and additional data being superior in quality to basic information generated from the basic data, the recording apparatus comprising:

an encoding means for encoding the basic information to provide the basic data while encoding the additional information to be added to the basic data to provide the additional data;

a first recording means for recording the basic data to the first recording layer of the recording medium by irradiating a light beam to the first recording layer; and a second recording means for recording the additional data to the second recording layer of the recording medium by irradiating a light beam to the second recording layer, wherein the first recording means recording the basic data as digital data having a predetermined length of channel bits along a recording track formed on the first recording layer.

43. The recording apparatus as set forth in claim 42, wherein the second recording means records the additional data as digital data having a shorter predetermined length of channel bits than channel bits in the basic data to the second recording layer along the recording track formed on the second recording layer.

44. The recording apparatus as set forth in claim 42, wherein the first recording means records the basic data to the first recording layer by changing the magnetized direction of the first recording layer.

45. The recording apparatus as set forth in claim 42, wherein the first recording means records the basic data to the first recording layer by forming pits on the first recording layer.

46. The recording apparatus as set forth in claim 42, wherein the encoding means generates additional data by a classification/adaptation.

47. The recording medium as set forth in claim 1, wherein:

the first recording area has recorded therein the basic data as pits;

the second recording area has recorded therein the additional data to be added to the basic data as a change in magnetized direction thereof; and wherein there is formed a recording track having the first and second recording areas.

48. The recording medium as set forth in claim 47, wherein the additional data is recorded as generally circular magneto-optical spots formed on the recording track, the magneto-optical spot including at least two types, one having a first area and the other having a second area smaller than the first area.

49. The recording medium as set forth in claim 47, wherein:
the basic information is video information; and
the read information is higher quality due to higher spatial resolution than the basic information.

50. The recording medium as set forth in claim 47, wherein the additional information is generated by a classification/adaptation.

51. A playback apparatus for a recording medium having a recording track where basic data is recorded by pits and a plurality of additional data, to be processed with the basic data, is to be recorded as a change in direction of magnetization,
wherein the basic data is processed with respect to each basic data;
the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information;
read information generated by a predetermined processing corresponding to the external selected signal, based on the basic data and the additional data being superior in quality to basic information generated from the basic data, the playback apparatus comprising:
a rotation drive means for rotating the recording medium;
a laser light irradiating means for irradiating laser light to the recording medium;
a reflected light detecting means for detecting the intensity and polarized direction of a reflected light of the laser light irradiated from the laser light irradiation means from the recording medium;
a first decoding means for reading the basic data on the basis of the result of detection of reflected light intensity from the reflected light detecting means to detect the basic information from the basic data;
a second decoding means for reading the additional data on the basis of the result of detection of reflected light deflected from the reflected light detecting means to decode the additional information from the additional data; and
a playback means for generating the read information on the basis of the basic information and additional information decoded by the first and second decoding means, respectively.

52. The playback apparatus as set forth in claim 51, wherein the reflected light detecting means includes:
a polarizing beam splitter upon which the reflected light is incident and which splits the reflected light into first and second parts correspondingly to components of the polarized direction of the reflected light;
a first light amount detector to detect the amount of the first reflected light part;
a second light amount detector to detect the amount of the second reflected light part; and
a comparator to make a comparison between the results of light amount detection by the first and second light amount detectors, the polarized direction of the reflected light is detected based on the result of comparison by the comparator.

53. The playback apparatus as set forth in claim 51, wherein:
the additional data is recorded as generally circular magneto-optical spots formed on the recording track on the recording medium, the magneto-optical spot including at least two types, one having a first area and the other having a second area smaller than the first area; the reflected light detecting means includes:
a polarizing beam splitter upon which the reflected light is incident and which splits the reflected light into first and second parts correspondingly to components of the polarized direction of the reflected light;
a first light amount detector to detect the amount of the first reflected light part;
a second light amount detector to detect the amount of the second reflected light part; and
a comparator to make a comparison between the results of light amount detection by the first and second light amount detectors the polarized direction of the reflected light is detected based on the result of comparison by the comparator.

54. The playback apparatus as set forth in claim 53, wherein the detecting means discriminates the area of magneto-optical spots by detecting a ratio between the results of light amount detection by the first and second light amount detectors.

55. The playback apparatus as set forth in claim 51, further comprising an external information input means for reception of external information;
wherein the playback means generating the read information on the basis of the basic data and additional information and also of external information supplied from the external information input means.

56. The playback apparatus as set forth in claim 55, wherein the external information supplied at the external information input means is biological information about the user.

57. The playback apparatus as set forth in claim 55, wherein the external information supplied at the external information input means concerns the ambient environment.

58. The playback apparatus as set forth in claim 51, further comprising a time measuring means for measuring a time and outputting time information,
wherein the playback means generating the read information on the basis of the basic data and additional information as well as of the time information.

59. A recording apparatus for a recording medium having a recording track where basic data is recorded as pits and a plurality of additional data to be processed with the basic data is to be recorded as a change in direction of magnetization,
wherein the basic data is processed with respect to each basic data;
the additional data is selected from among the plurality of additional data in accordance with a nature of the each basic data and external selected signal, the external selected signal being external to a first recording area for recording the basic data and being external to a second recording area for recording the plurality of additional data and the selected additional data is processed with the each basic data, wherein the external selected signal comprises bodily information and/or environmental information;
read information generated by a predetermined processing corresponding to the external selected signal, based on the basic data and additional data being superior in quality to basic information generated from the basic data, the recording apparatus comprising:

an encoding means for encoding the basic information to provide the basic data while encoding the additional information to be added to the basic data to provide the additional data;

a first recording means for recording the basic data as pits to the recording track on the recording medium by irradiating a light beam to the recording track; and a second recording means for recording the additional data by magneto-optical spots to the recording track on the recording medium by irradiating a light beam to the recording track.

60. The recording apparatus as set forth in claim 59, wherein the second recording means records the additional data as magneto-optical spots including at least two kinds different in area from each other.

* * * * *